US010689566B2

(12) United States Patent
Chan et al.

(10) Patent No.: US 10,689,566 B2
(45) Date of Patent: Jun. 23, 2020

(54) COATED PARTICLES AND METHODS OF MAKING AND USING THE SAME

(71) Applicant: Anavo Technologies, LLC, Raleigh, NC (US)

(72) Inventors: Ryan Nicholas Chan, Raleigh, NC (US); Drew Williams, Raleigh, NC (US); Caleb Meredith, Raleigh, NC (US); Charlotte Holt, Raleigh, NC (US); James Charles Bray, Raleigh, NC (US)

(73) Assignee: Anavo Technologies, LLC, Raleigh, NC (US)

(*) Notice: Subject to any disclaimer, the term of this patent is extended or adjusted under 35 U.S.C. 154(b) by 41 days.

(21) Appl. No.: 15/773,136

(22) PCT Filed: Nov. 18, 2016

(86) PCT No.: PCT/US2016/062773
§ 371 (c)(1),
(2) Date: May 2, 2018

(87) PCT Pub. No.: WO2017/091463
PCT Pub. Date: Jun. 1, 2017

(65) Prior Publication Data
US 2018/0371309 A1     Dec. 27, 2018

Related U.S. Application Data

(60) Provisional application No. 62/395,621, filed on Sep. 16, 2016, provisional application No. 62/324,052, (Continued)

(51) Int. Cl.
*C09K 8/80* (2006.01)
*C09K 8/62* (2006.01)
*C09K 8/70* (2006.01)

(52) U.S. Cl.
CPC ............ *C09K 8/805* (2013.01); *C09K 8/62* (2013.01); *C09K 8/70* (2013.01)

(58) Field of Classification Search
None
See application file for complete search history.

(56) References Cited

U.S. PATENT DOCUMENTS

| | | | |
|---|---|---|---|
| 3,884,853 | A | 5/1975 | Zimmerman |
| 3,932,322 | A | 1/1976 | Duchane |

(Continued)

FOREIGN PATENT DOCUMENTS

| | | |
|---|---|---|
| EP | 0 257 338 A2 | 3/1988 |
| EP | 1 390 412 B1 | 2/2004 |

(Continued)

OTHER PUBLICATIONS

Alonso et al. "Cross-linking chitosan into UV-irradiated cellulose fibers for the preparation of antimicrobial-finished textiles" *Carbohydrate Polymers* 77:536-543 (2009).

(Continued)

*Primary Examiner* — John J Figueroa
(74) *Attorney, Agent, or Firm* — Myers Bigel, P.A.

(57) ABSTRACT

Provided herein are coated particles, such as, for example, proppants comprising a coating. A coated particle of the present invention may swell upon contact with a solution having a salinity in a range of about 50 ppm to about 100,000 ppm and/or having a hardness in a range of about 1 ppm to about 150,000 ppm. The amount of swelling may vary by less than 50% over a salinity concentration in a range of about 50 ppm to about 100,000 ppm and/or a hardness concentration in a range of about 1 ppm to about 150,000 ppm. Also provided herein are methods of making coated particles and methods of using the same.

18 Claims, 7 Drawing Sheets

Related U.S. Application Data filed on Apr. 18, 2016, provisional application No. 62/317,244, filed on Apr. 1, 2016, provisional application No. 62/258,976, filed on Nov. 23, 2015.

(56) References Cited

U.S. PATENT DOCUMENTS

| | | |
|---|---|---|
| 4,043,952 A | 8/1977 | Ganslaw et al. |
| 4,060,683 A | 11/1977 | Tessler |
| 4,090,013 A | 5/1978 | Ganslaw et al. |
| 4,098,997 A | 7/1978 | Tessler |
| 4,111,810 A | 9/1978 | Arai et al. |
| 4,127,944 A | 12/1978 | Giacobello |
| 4,129,722 A | 12/1978 | Iovine et al. |
| 4,131,576 A | 12/1978 | Iovine et al. |
| 4,219,646 A | 8/1980 | Rubens |
| 4,256,111 A | 3/1981 | Lassen |
| 4,278,573 A | 7/1981 | Tessler |
| 4,454,055 A | 6/1984 | Richman et al. |
| 4,590,081 A | 5/1986 | Sawada et al. |
| 4,654,039 A | 3/1987 | Brandt et al. |
| 4,725,628 A | 2/1988 | Garvey et al. |
| 4,725,629 A | 2/1988 | Garvey et al. |
| 4,731,391 A | 3/1988 | Garvey |
| 4,820,577 A | 4/1989 | Morman et al. |
| 4,853,168 A | 8/1989 | Eden et al. |
| 4,876,336 A | 10/1989 | Solarek et al. |
| 4,964,953 A | 10/1990 | Solarek et al. |
| 5,079,354 A | 1/1992 | Gross et al. |
| 5,122,231 A | 6/1992 | Anderson |
| 5,130,391 A | 7/1992 | Ahmed et al. |
| 5,176,635 A | 1/1993 | Dittmann |
| 5,190,563 A | 3/1993 | Herron et al. |
| 5,216,098 A | 6/1993 | Ahmed et al. |
| 5,227,481 A | 7/1993 | Tsai et al. |
| 5,252,690 A | 10/1993 | Ahmed et al. |
| 5,286,827 A | 2/1994 | Ahmed |
| 5,314,420 A | 5/1994 | Smith et al. |
| 5,340,853 A | 8/1994 | Chmelir et al. |
| 5,349,089 A | 9/1994 | Tsai et al. |
| 5,422,183 A | 6/1995 | Sinclair et al. |
| 5,422,387 A | 6/1995 | Toms et al. |
| 5,451,613 A | 9/1995 | Smith et al. |
| 5,462,972 A | 10/1995 | Smith et al. |
| 5,470,964 A | 11/1995 | Qin |
| 5,498,705 A | 3/1996 | Oin |
| 5,506,277 A | 4/1996 | Griesbach, III |
| 5,563,179 A | 10/1996 | Stone et al. |
| 5,583,193 A | 12/1996 | Aravindakshan et al. |
| 5,597,784 A | 1/1997 | Sinclair et al. |
| 5,599,916 A | 2/1997 | Dutkiewicz et al. |
| 5,629,416 A | 5/1997 | Neigel et al. |
| 5,663,123 A * | 9/1997 | Goodhue, Jr. ......... C09K 8/035 507/118 |
| 5,711,908 A | 1/1998 | Tiefenbacher et al. |
| 5,721,295 A | 2/1998 | Brüggemann et al. |
| 5,736,595 A | 4/1998 | Günther et al. |
| 5,767,168 A | 6/1998 | Dyer et al. |
| 5,797,984 A | 8/1998 | Billmers et al. |
| 5,847,031 A | 12/1998 | Klimmek et al. |
| 5,849,233 A | 12/1998 | Altieri et al. |
| 5,851,959 A | 12/1998 | Bernu |
| 5,929,437 A | 7/1999 | Elliott et al. |
| 5,958,589 A | 9/1999 | Glenn et al. |
| 6,114,410 A | 9/2000 | Betzold |
| 6,153,305 A | 11/2000 | Uemura et al. |
| 6,193,843 B1 | 2/2001 | Tsai et al. |
| 6,197,951 B1 | 3/2001 | Lenz |
| 6,225,406 B1 | 5/2001 | Wang et al. |
| 6,235,835 B1 | 5/2001 | Niessner et al. |
| 6,294,180 B1 | 9/2001 | Demars et al. |
| 6,299,969 B1 | 10/2001 | Altieri et al. |
| 6,328,105 B1 | 12/2001 | Betzold |
| 6,372,678 B1 | 4/2002 | Youngman et al. |
| 6,380,456 B1 | 4/2002 | Goldman |
| 6,444,653 B1 | 9/2002 | Huppé et al. |
| 6,488,980 B1 | 12/2002 | Jeffcoat et al. |
| 6,500,947 B1 | 12/2002 | West et al. |
| 6,506,873 B1 | 1/2003 | Ryan et al. |
| 6,517,678 B1 | 2/2003 | Shannon et al. |
| 6,585,859 B1 | 7/2003 | Håkansson |
| 6,607,748 B1 | 8/2003 | Lenaerts et al. |
| 6,620,295 B2 | 9/2003 | Shannon et al. |
| 6,670,470 B1 | 12/2003 | Ketola et al. |
| 6,689,934 B2 | 2/2004 | Dodge, II et al. |
| 6,706,944 B2 | 3/2004 | Qin et al. |
| 6,713,460 B2 | 3/2004 | Huppé et al. |
| 6,746,542 B1 | 6/2004 | Lorencak et al. |
| 6,755,915 B1 | 6/2004 | Van Soest et al. |
| 6,765,042 B1 | 7/2004 | Thornton et al. |
| 6,767,430 B1 | 7/2004 | Wielema et al. |
| 6,825,252 B2 | 11/2004 | Helbling et al. |
| 6,844,430 B2 | 1/2005 | Pesce et al. |
| 6,855,434 B2 | 2/2005 | Romasn-Hess et al. |
| 6,867,287 B2 | 3/2005 | Carlucci et al. |
| 6,939,914 B2 | 9/2005 | Qin et al. |
| 6,951,933 B2 | 10/2005 | West et al. |
| 7,009,020 B2 | 3/2006 | Doane et al. |
| 7,101,426 B2 | 9/2006 | Tagge et al. |
| 7,153,354 B2 | 12/2006 | Narayan et al. |
| 7,153,553 B2 | 12/2006 | Tetrault |
| 7,244,492 B2 | 7/2007 | Sinclair et al. |
| 7,285,586 B2 | 10/2007 | Helbling et al. |
| 7,294,343 B2 | 11/2007 | Barresi et al. |
| 7,297,395 B2 | 11/2007 | Kainth et al. |
| 7,365,190 B2 | 4/2008 | Couture et al. |
| 7,419,808 B2 | 9/2008 | Zhang et al. |
| 7,423,090 B2 | 9/2008 | Doane et al. |
| 7,423,106 B2 | 9/2008 | Doane et al. |
| 7,425,595 B2 | 9/2008 | Savich et al. |
| 7,459,501 B2 | 12/2008 | Doane et al. |
| 7,524,379 B2 | 4/2009 | Bailey et al. |
| 7,560,419 B2 | 7/2009 | Fang et al. |
| 7,575,618 B2 | 8/2009 | Miao et al. |
| 7,591,974 B2 | 9/2009 | Savich et al. |
| 7,607,259 B2 | 10/2009 | Savich |
| 7,622,428 B2 | 11/2009 | Huff et al. |
| 7,732,525 B2 | 6/2010 | Branston et al. |
| 7,807,271 B2 | 10/2010 | Branston et al. |
| 7,833,384 B2 | 11/2010 | Weerawarna |
| 7,842,164 B2 | 11/2010 | Rasheed et al. |
| 7,932,378 B2 | 4/2011 | Mikkonen et al. |
| 7,959,762 B2 | 6/2011 | Weerawarna |
| 7,985,742 B2 | 7/2011 | Bergeron |
| 7,985,794 B2 | 7/2011 | Narayan et al. |
| 7,994,384 B2 | 8/2011 | Qin et al. |
| 8,017,249 B2 | 9/2011 | Tippit |
| 8,017,553 B2 | 9/2011 | Doane et al. |
| 8,076,279 B2 | 12/2011 | Brand et al. |
| 8,076,473 B2 | 12/2011 | Berckmans et al. |
| 8,084,391 B2 | 12/2011 | Weerawarna |
| 8,101,543 B2 | 1/2012 | Weerawarna |
| 8,114,809 B2 | 2/2012 | Chevigny et al. |
| 8,163,309 B2 | 4/2012 | Glenn et al. |
| 8,192,660 B2 | 6/2012 | Wang et al. |
| 8,263,163 B2 | 9/2012 | Wang et al. |
| 8,268,989 B2 | 9/2012 | English et al. |
| 8,361,926 B2 | 1/2013 | Tian et al. |
| 8,362,089 B2 | 1/2013 | Hashimoto |
| 8,383,573 B2 | 2/2013 | Dupont et al. |
| 8,431,619 B2 | 4/2013 | Hashimoto |
| 8,434,498 B2 | 5/2013 | Sebastian |
| 8,436,056 B2 | 5/2013 | Barati |
| 8,444,819 B2 | 5/2013 | Anderson et al. |
| 8,461,129 B2 | 6/2013 | Bolduc et al. |
| 8,481,717 B2 | 7/2013 | Trksak |
| 8,486,854 B2 | 7/2013 | Berrada et al. |
| 8,486,855 B2 | 7/2013 | Tian et al. |
| 8,507,666 B2 | 8/2013 | Skuratowicz |
| RE44,519 E | 10/2013 | Anderson et al. |
| 8,545,691 B2 | 10/2013 | Teymour et al. |
| 8,563,466 B2 | 10/2013 | Chevigny et al. |
| 8,580,953 B2 | 11/2013 | Frank et al. |
| 8,613,971 B2 | 12/2013 | Finocchiaro et al. |
| 8,623,341 B2 | 1/2014 | Peffly et al. |

(56) References Cited

U.S. PATENT DOCUMENTS

| | | |
|---|---|---|
| 8,641,869 B2 | 2/2014 | Weerawarna |
| 8,686,132 B2 | 4/2014 | Berckmans et al. |
| 8,703,645 B2 | 4/2014 | Tian et al. |
| 8,710,212 B2 | 4/2014 | Thibodeau et al. |
| 8,759,511 B2 | 6/2014 | English et al. |
| 8,785,417 B2 | 7/2014 | Couffin et al. |
| 8,795,834 B2 | 8/2014 | Tetrault et al. |
| 8,815,008 B2 | 8/2014 | Drake et al. |
| 8,815,135 B2 | 8/2014 | Beecher et al. |
| 8,829,107 B2 | 9/2014 | Furno et al. |
| 8,852,682 B2 | 10/2014 | Sinclair et al. |
| 8,859,758 B2 | 10/2014 | Frank et al. |
| 8,926,794 B2 | 1/2015 | Han et al. |
| 8,951,594 B2 | 2/2015 | Wang et al. |
| 8,962,092 B2 | 2/2015 | Trksak et al. |
| 8,975,387 B1 | 2/2015 | Venditti et al. |
| 8,993,039 B2 | 3/2015 | Harrison et al. |
| 9,011,741 B2 | 4/2015 | Wildi et al. |
| 9,039,924 B2 | 5/2015 | Leavitt et al. |
| 9,078,947 B2 | 7/2015 | MacDonald et al. |
| 9,107,975 B2 | 8/2015 | Godin et al. |
| 9,149,787 B1 | 10/2015 | Godin et al. |
| 9,296,655 B2 | 3/2016 | Mann et al. |
| 9,297,244 B2 | 3/2016 | Mahoney et al. |
| 9,315,721 B2 | 4/2016 | Mahoney et al. |
| 9,932,521 B2 | 4/2018 | Soane et al. |
| 2001/0015267 A1 | 8/2001 | Pauley et al. |
| 2001/0040136 A1 | 11/2001 | Wei et al. |
| 2002/0039869 A1 | 4/2002 | Achille |
| 2002/0110875 A1 | 8/2002 | Bazin et al. |
| 2002/0156048 A1 | 10/2002 | Huppe et al. |
| 2003/0020043 A1 | 1/2003 | Barresi et al. |
| 2003/0027787 A1 | 2/2003 | Couture et al. |
| 2003/0176293 A1 | 9/2003 | Schilling et al. |
| 2003/0202996 A1 | 10/2003 | Bazin et al. |
| 2004/0086541 A1 | 5/2004 | Barresi et al. |
| 2004/0091324 A1 | 5/2004 | Schilling et al. |
| 2004/0091977 A1 | 5/2004 | Teeri et al. |
| 2004/0124013 A1 | 7/2004 | Wiesner et al. |
| 2004/0140584 A1 | 7/2004 | Wang et al. |
| 2005/0214541 A1 | 9/2005 | Berrada et al. |
| 2005/0260316 A1 | 11/2005 | Wang et al. |
| 2006/0018939 A1 | 1/2006 | Bazin et al. |
| 2006/0045912 A1 | 3/2006 | Truog |
| 2006/0062990 A1 | 3/2006 | Gotoh |
| 2006/0172092 A1 | 8/2006 | Tetrault |
| 2006/0182944 A1 | 8/2006 | Leavitt et al. |
| 2006/0276569 A1 | 12/2006 | Hernandez et al. |
| 2007/0042473 A1 | 2/2007 | Bazin et al. |
| 2007/0059432 A1 | 3/2007 | Norman et al. |
| 2007/0089734 A1 | 4/2007 | Stanley et al. |
| 2007/0110962 A1 | 5/2007 | Tien et al. |
| 2007/0179291 A1 | 8/2007 | Thibodeau et al. |
| 2007/0275155 A1 | 11/2007 | Nehmer et al. |
| 2008/0051494 A1 | 2/2008 | Savich et al. |
| 2008/0082067 A1 | 4/2008 | Weerawarna et al. |
| 2008/0110816 A1 | 5/2008 | Leavitt et al. |
| 2008/0177057 A1 | 7/2008 | Bolduc et al. |
| 2008/0207431 A1 | 8/2008 | Townley et al. |
| 2008/0226722 A1 | 9/2008 | Van Tomme et al. |
| 2008/0261807 A1 | 10/2008 | Chevigny et al. |
| 2008/0305950 A1 | 12/2008 | Berrada |
| 2009/0044941 A1 | 2/2009 | De Paiva Cortes et al. |
| 2009/0304835 A1 | 12/2009 | Savich et al. |
| 2010/0032367 A1 | 2/2010 | Leavitt et al. |
| 2010/0036337 A1 | 2/2010 | Couffin et al. |
| 2010/0042063 A1 | 2/2010 | Couffin et al. |
| 2010/0057027 A1 | 3/2010 | Furno et al. |
| 2010/0147515 A1* | 6/2010 | Hughes .......... C09K 8/685 166/271 |
| 2010/0147760 A1 | 6/2010 | Leavitt et al. |
| 2010/0203265 A1 | 8/2010 | Tetrault et al. |
| 2010/0221402 A1 | 9/2010 | Wang et al. |
| 2010/0221406 A1 | 9/2010 | Norman et al. |
| 2010/0252031 A1 | 10/2010 | Stanley et al. |
| 2010/0311687 A1 | 12/2010 | Bosco et al. |
| 2010/0311904 A1 | 12/2010 | Chambers |
| 2011/0095227 A1 | 4/2011 | Herth et al. |
| 2011/0120719 A1 | 5/2011 | Soane et al. |
| 2011/0183380 A1 | 7/2011 | El-Tahlawy et al. |
| 2011/0237468 A1* | 9/2011 | Reichenbach-Klinke .......... C09K 8/5083 507/226 |
| 2012/0065604 A1 | 3/2012 | Chang et al. |
| 2012/0121519 A1 | 5/2012 | Thomaides et al. |
| 2012/0125231 A1 | 5/2012 | Markland et al. |
| 2012/0138848 A1 | 6/2012 | Leavitt et al. |
| 2012/0142525 A1 | 6/2012 | Chevigny et al. |
| 2012/0258811 A1 | 10/2012 | Tetrault et al. |
| 2012/0266869 A1 | 10/2012 | Wang et al. |
| 2012/0328723 A1 | 12/2012 | Savich et al. |
| 2013/0011885 A1 | 1/2013 | Binder et al. |
| 2013/0174993 A1 | 7/2013 | Medhekar et al. |
| 2013/0203983 A1 | 8/2013 | English et al. |
| 2013/0233545 A1 | 9/2013 | Mahoney et al. |
| 2013/0251996 A1 | 9/2013 | Ji et al. |
| 2013/0289267 A1 | 10/2013 | Weisser et al. |
| 2013/0296543 A1 | 11/2013 | Hanna et al. |
| 2013/0303714 A1 | 11/2013 | Chambers |
| 2014/0000891 A1 | 1/2014 | Mahoney et al. |
| 2014/0005280 A1 | 1/2014 | Assaad et al. |
| 2014/0014348 A1 | 1/2014 | Mahoney et al. |
| 2014/0060832 A1 | 3/2014 | Mahoney et al. |
| 2014/0158355 A1 | 6/2014 | Wuthrich et al. |
| 2014/0212589 A1 | 7/2014 | Trksak et al. |
| 2014/0228258 A1* | 8/2014 | Mahoney .......... C09K 8/805 507/219 |
| 2014/0309410 A1 | 10/2014 | Haider et al. |
| 2014/0322459 A1 | 10/2014 | Tetrault et al. |
| 2014/0335040 A1 | 11/2014 | Yu et al. |
| 2015/0114648 A1* | 4/2015 | Mirakyan .......... C09K 8/03 166/305.1 |
| 2015/0201653 A1 | 7/2015 | Yildiz et al. |
| 2015/0252252 A1* | 9/2015 | Soane .......... C09K 8/805 166/280.2 |
| 2015/0252253 A1 | 9/2015 | Soane et al. |
| 2015/0299431 A1 | 10/2015 | Parcq et al. |
| 2016/0137913 A1 | 5/2016 | Mahoney et al. |
| 2016/0200966 A1 | 7/2016 | Mahoney et al. |
| 2016/0200967 A1 | 7/2016 | Mahoney et al. |
| 2016/0298026 A1 | 10/2016 | Aboushabana et al. |
| 2017/0002098 A1 | 1/2017 | Ayoub et al. |
| 2017/0058191 A1 | 3/2017 | Mahoney et al. |
| 2017/0335178 A1 | 11/2017 | Aboushabana et al. |

FOREIGN PATENT DOCUMENTS

| | | |
|---|---|---|
| EP | 1 649 851 A2 | 4/2006 |
| EP | 1 812 477 A2 | 8/2007 |
| EP | 1 897 893 A1 | 3/2008 |
| EP | 1 939 219 A1 | 7/2008 |
| GB | 1183623 | 3/1970 |
| WO | WO 96/23104 A1 | 8/1996 |
| WO | WO 97/46591 A1 | 12/1997 |
| WO | WO 99/12977 A1 | 3/1999 |
| WO | WO 00/49226 A1 | 8/2000 |
| WO | WO 01/79301 A1 | 10/2001 |
| WO | WO 02/02084 A1 | 1/2002 |
| WO | WO 02/074814 A1 | 9/2002 |
| WO | WO 02/087868 A1 | 11/2002 |
| WO | WO 03/033813 A1 | 4/2003 |
| WO | WO 03/040055 A1 | 5/2003 |
| WO | WO 03/074787 A1 | 9/2003 |
| WO | WO 2004/076551 A1 | 9/2004 |
| WO | WO 2004/085481 A1 | 10/2004 |
| WO | WO 2005/113616 A2 | 12/2005 |
| WO | WO 2005/113894 A1 | 12/2005 |
| WO | WO 2006/014416 A1 | 2/2006 |
| WO | WO 2006/023825 A1 | 3/2006 |
| WO | WO 2006/032929 A1 | 3/2006 |
| WO | WO 2006/037157 A1 | 4/2006 |
| WO | WO 2006/042364 A1 | 4/2006 |
| WO | WO 2006/053847 A1 | 5/2006 |

(56) References Cited

FOREIGN PATENT DOCUMENTS

| | | |
|---|---|---|
| WO | WO 2006/055504 A2 | 5/2006 |
| WO | WO 2006/055505 A2 | 5/2006 |
| WO | WO 2006/124871 A1 | 11/2006 |
| WO | WO 2007/035099 A1 | 3/2007 |
| WO | WO 2007/071776 A1 | 6/2007 |
| WO | WO 2007/080539 A2 | 7/2007 |
| WO | WO 2007/086803 A1 | 8/2007 |
| WO | WO 2007/126603 A2 | 11/2007 |
| WO | WO 2008/022127 A2 | 2/2008 |
| WO | WO 2008/081257 A2 | 7/2008 |
| WO | WO 2009/073197 A1 | 6/2009 |
| WO | WO 2009/094421 A1 | 7/2009 |
| WO | WO 2009/143119 A2 | 11/2009 |
| WO | WO 2010/051151 A2 | 5/2010 |
| WO | WO 2010/065750 A1 | 6/2010 |
| WO | WO 2010/148357 A1 | 12/2010 |
| WO | WO 2011/019646 A1 | 2/2011 |
| WO | WO 2011/029518 A1 | 3/2011 |
| WO | WO 2012/064741 A2 | 5/2012 |
| WO | WO 2012/097447 A1 | 7/2012 |
| WO | WO 2012/162845 A1 | 12/2012 |
| WO | WO 2013/033391 A1 | 3/2013 |
| WO | WO 2013/042083 A1 | 3/2013 |
| WO | WO 2013/096891 A1 | 6/2013 |
| WO | WO 2013/116945 A1 | 8/2013 |
| WO | WO 2013/158945 A1 | 10/2013 |
| WO | WO 2013/180643 A1 | 12/2013 |
| WO | WO 2014/029029 A1 | 2/2014 |
| WO | WO 2014/043808 A1 | 3/2014 |
| WO | WO 2015/047116 A1 | 4/2015 |
| WO | WO 2015/130278 A1 | 9/2015 |
| WO | WO 2015/187631 A1 | 12/2015 |

OTHER PUBLICATIONS

Baran et al. "Starch-chitosan hydrogels prepared by reductive alkylation cross-linking" *Journal of Materials Science: Materials in Medicine* 15:759-765 (2004).

Bernabe et al. "Swelling behavior of chitosan/pectin polyelectrolyte complex membranes. Effect of thermal cross-linking" *Polymer Bulletin* 55:367-375 (2005).

Demitri et al. "Novel Superabsorbent Cellulose-Based Hydrogels Crosslinked with Citric Acid" *Journal of Applied Polymer Science* 110:2453-2460 (2008).

Edlund et al. "A Microspheric System: Hemicellulose-based Hydrogels" *Journal of Bioactive and Compatible Polymers* 23:171-186 (2008).

El-Tahlawy et al. "The antimicrobial activity of cotton fabrics treated with different crosslinking agents and chitosan" *Carbohydrate Polymers* 60:421-430 (2005).

El-Tahlawy et al. "Aspects of the preparation of starch microcellular foam particles crosslinked with glutaraldehyde using a solvent exchange technique" *Carbohydrate Polymers* 67(3):319-331 (2007).

Gabrielii et al. "Preparation and Properties of Hydrogels Based on Hemicellulose" *Journal of Applied Polymer Science* 69(8):1661-1667 (1998).

Gabrielii et al. "Separation, characterization and hydrogel-formation of hemicellulose from aspen wood" *Carbohydrate Polymers* 43(4):367-374 (2000).

Gaffar, Mohammed A. "Preparation and Utilization of New Carboxyl Group Containing Cation Exchangers Based on Starch Using a Dry Reaction Method" *Starch* 54:185-192 (2002).

Goldstein et al. "Improve Well Performance by Reducing Formation Damage" *Unconventional Resources Technology Conference* (pp. 2752-2769) (Jul. 20-22, 2015).

Goldstein et al. "Self-Suspending Proppant Transport Technology Increases Stimulated Reservoir Volume and Reduces Proppant Pack and Formation Damage" SPE Annual Technical Conference and Exhibition (16 pages) (Sep. 2015).

Heinze et al. "Starch derivatives of high degree of functionalization 9: carboxymethyl starches" *Cellulose* 11:239-245 (2004).

Helander et al. "Chitosan disrupts the barrier properties of the outer membrane of gram-negative bacteria" *International Journal of Food Microbiology* 71(2):235-244 (2001).

International Preliminary Report on Patentability corresponding to International Patent Application No. PCT/US2016/062773 (8 pages) (dated Jun. 7, 2018).

Jain et al. "Thermoplastic xylan derivatives with propylene oxide" *Cellulose* 7:319-336 (2001).

Kema et al. "Wet-milling/Ammonia Process for the Manufacture of Wheat Starch and Gluten" *Starch* 48:279-285 (1996).

Kiatkamjornwong, Suda "Superabsorbent Polymers and Superabsorbent Polymer Compositions" *ScienceAsia* 33(Supplement 1):39-43 (2007).

Kumar, Majeti N.V. Ravi "A review of chitin and chitosan applications" *Reactive & Functional Polymers* 46:1-27 (2000).

Kumari et al. "Controlled Release of Metformin hydrochloride through crosslinked blends of chitosan-starch" *Advances in Applied Science Research* 2(2):48-54 (2011).

Kuo et al. "Effects of reaction conditions on the physicochemical properties of cationic starch studied by RSM" *Carbohydrate Polymers*, 75(4):627-635 (2009).

Lee et al. "Polyelectrolyte Complexes of Sodium Alginate with Chitosan or Its Derivatives for Microcapsules" *Journal of Applied Polymer Science* 63:425-432 (1997).

Liang et al. "A comprehensive review on proppant technologies" Petroleum, 2:26-39 (2016).

Lim et al. "Application of a fiber-reactive chitosan derivative to cotton fabric as an antimicrobial textile finish" *Carbohydrate Polymers* 56(2):227-234 (2004).

Lim et al. "Synthesis and antimicrobial activity of a water-soluble chitosan derivative with a fiber-reactive group" *Carbohydrate Research* 339(2):313-319 (2004).

Lindblad et al. "New Hemicellulose-Based Hydrogels" *ACS Symposium Series* 864(22):347-359 (2004).

Liu et al. "Antibacterial Action of Chitosan and Carboxymethylated Chitosan" *Journal of Applied Polymer Science* 79:1324-1335 (2001).

Liu et al. "Structural characterization and antimicrobial activity of chitosan/betaine derivative complex" *Carbohydrate Polymers* 55:291-297 (2004).

Liu et al. "Thermal processing of starch-based polymers" *Progress in Polymer Science* 34:1348-1368 (2009).

Liu et al. "A method to evaluate hydraulic fracture using proppant detection" *Applied Radiation and Isotopes*, 105:139-143 (2015).

Lorenz et al. "Starch Hydrolysis Under High Temperatures and Pressures" Cereal Chemistry, 49:616-628 (1972).

Okazaki et al. "Development of Poly(vinyl alcohol) Hydrogel for Waste Water Cleaning. II. Treatment of N,N-Dimethylformamide in Waste Water with Poly(vinyl alcohol) Gel with Immobilized Microorganisms" *Journal of Applied Polymer Science* 58:2243-2249 (1995).

Pelissari et al. "Extrusion parameters related to starch/chitosan active films properties" *International Journal of Food Science & Technology* 46:702-710 (2011).

Petzold et al. "Carboxymethyl xylan—synthesis and detailed structure characterization" *Carbohydrate Polymers* 64(2):292-298 (2006).

Rayford et al. "Crosslinked Cationic and Anionic Starches: Preparation and Use in Heavy Metal Removal" *Starch* 31:361-365 (1979).

Rozie et al. "Crosslinked xylan as an affinity adsorbent for endo-xylanases" *Carbohydrate Polymers* 17(1):19-28 (1992).

Shi et al. "Characterization of citric acid/glycerol co-plasticized thermoplastic starch prepared by melt blending" *Carbohydrate Polymers* 64(4):748-755 (2007).

Steckel et al. "Production of chitosan pellets by extrusion/spheronization" *European Journal of Pharmaceutics and Biopharmaceutics* 57:107-114 (2004).

Sun et al. "Preparation of sugarcane bagasse hemicellulosic succinates using NBS as a catalyst" *Carbohydrate Polymers* 53(4):483-495 (2003).

Thatte, Mrunal R. "Synthesis and Antibacterial Assessment of Water-Soluble Hydrophobic Chitosan Derivatives Bearing Quaternary Ammonium Functionality" *Dissertation* 120 pages (Dec. 2004).

(56) References Cited

OTHER PUBLICATIONS

Umemura et al. "Preparation and Characterization of Maillard Reacted Chitosan Films with Hemicellulose Model Compounds" *Journal of Applied Polymer Science* 108:2481-2487 (2008).
"USGS Water-Quality Information: Water Hardness and Alkalinity" https://water.usgs.gov/owq/hardness-alkalinity.html (3 pages) (2016).
Vaara et al. "Polycations as Outer Membrane-Disorganizing Agents" *Antimicrobial Agents and Chemotherapy* 24(1):114-122 (1983).
Vaca-Garcia et al. "Cellulose Esterification with Fatty Acids and Acetic Anhydride in Lithium Chloride/N,N-Dimethylacetamide Medium" *Journal of the American Oil Chemists' Society* 75:315-319 (1998).
Varma et al. "Metal complexation by chitosan and its derivatives: a review" *Carbohydrate Polymers* 55(1):77-93 (2004).
Wang et al. "Preparation, characterization and antimicrobial activity of chitosan—Zn complex" *Carbohydrate Polymers* 56:21-26 (2004).
Wing, Robert E. "Starch Citrate: Preparation and Ion Exchange Properties" *Starch* 48:275-279 (1996).
Yin et al. "Miscibility studies of the blends of chitosan with some cellulose ethers" *Carbohydrate Polymers* 63(2):238-244 (2006).
Yu et al. "Polymer blends and composites from renewable resources" *Progress in Polymer Science* 31:576-602 (2006).
Zdanowicz et al. "Starch graft copolymers as superabsorbents obtained via reactive extrusion processing" *Polish Journal of Chemical Technology* 12(2):14-17 (2010).
Zhang et al. "Chitosan-acrylamide graft copolymers and flocculation properties" *Xi'an Jiaotong Daxue Xuebao* 36(5):541-544 (2002).
Zhang et al. "Synthesis and characterization of water-soluble O-succinyl-chitosan" *European Polymer Journal* 39(8):1629-1634 (2003).
Zheng et al. "Study on antimicrobial activity of chitosan with different molecular weights" *Carbohydrate Polymers* 54:527-530 (2003).
Bendoraitiene et al. "Peculiarities of Starch Cationization with Glycidyltrimethylammonium Chloride" *Starch*, 58:623-631 (2006).
Extended European Search Report corresponding to European Patent Application No. 16869106.1 (6 pages) (dated Mar. 15, 2019).
Xie et al. "Starch Modification Using Reactive Extrusion" *Starch*, 58:131-139 (2006).
International Preliminary Report on Patentability corresponding to International Patent Application No. PCT/US2017/033753 (7 pages) (dated Mar. 28, 2019).
International Search Report and the Written Opinion of the International Searching Authority corresponding to International Patent Application No. PCT/US16/62773 (11 pages) (dated Feb. 3, 2017).

\* cited by examiner

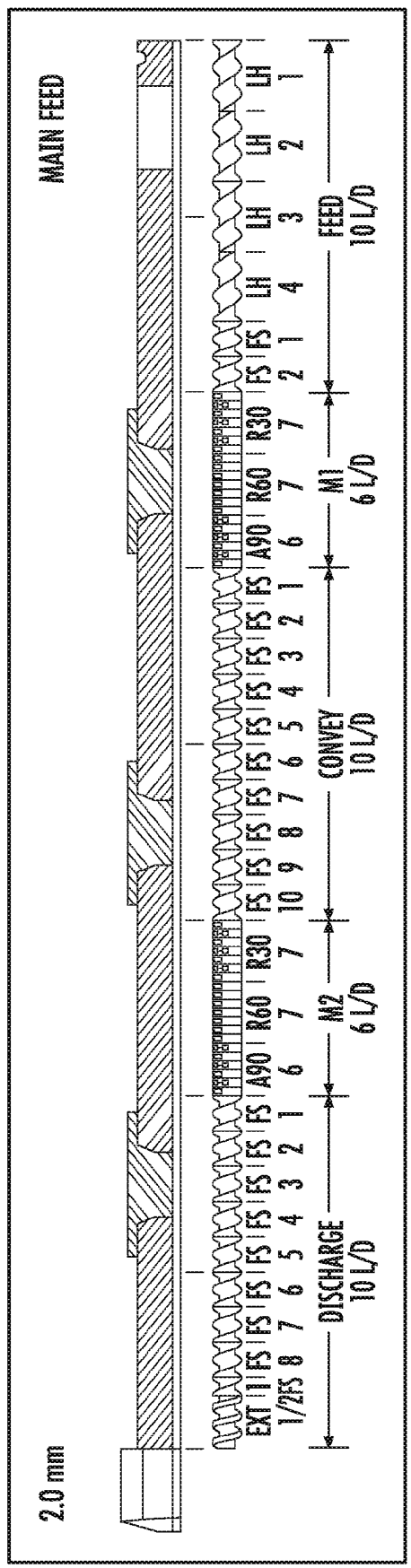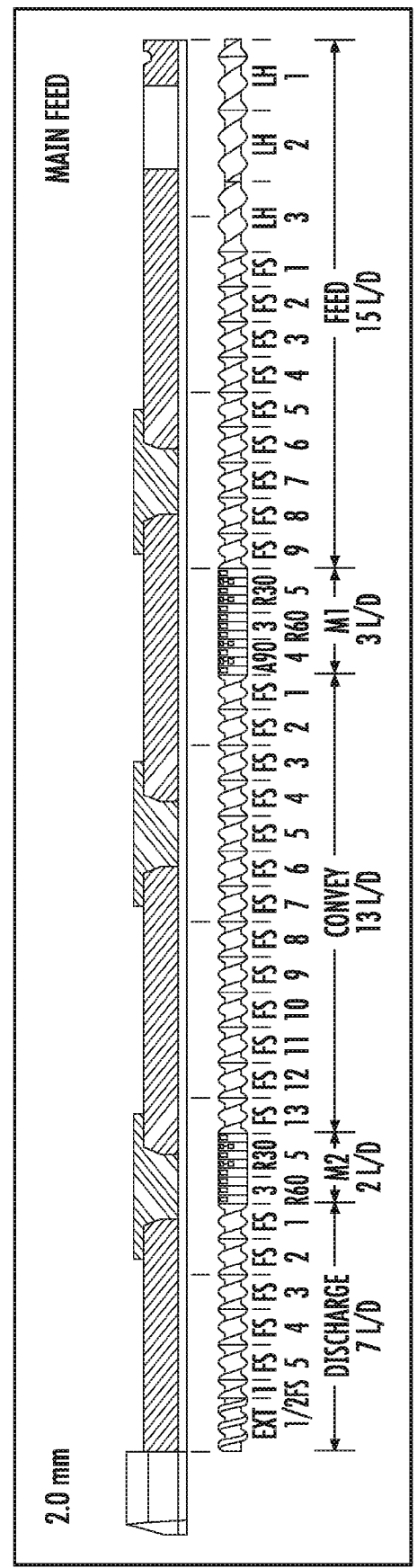

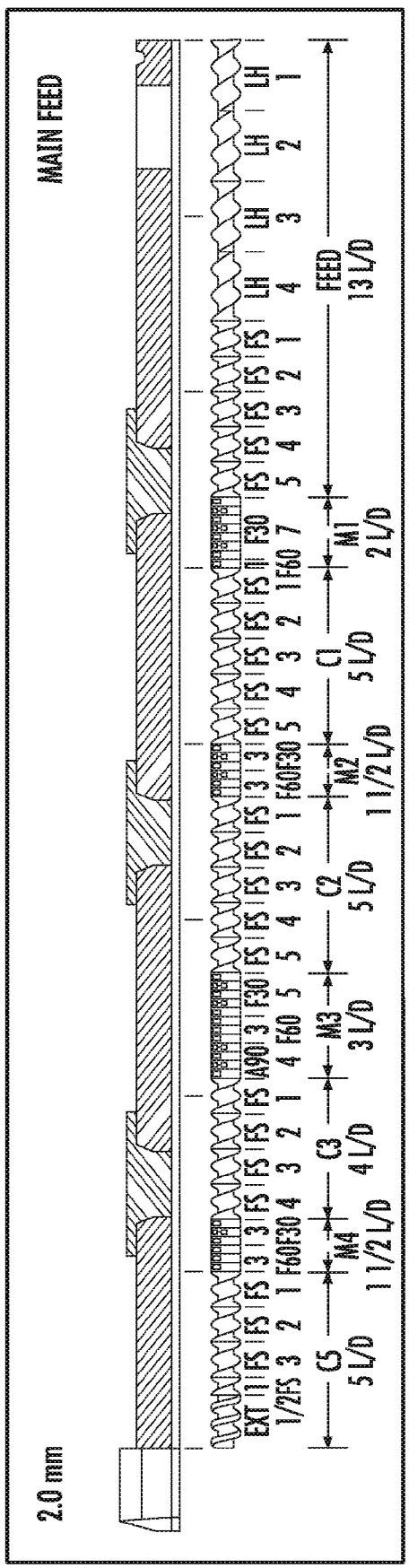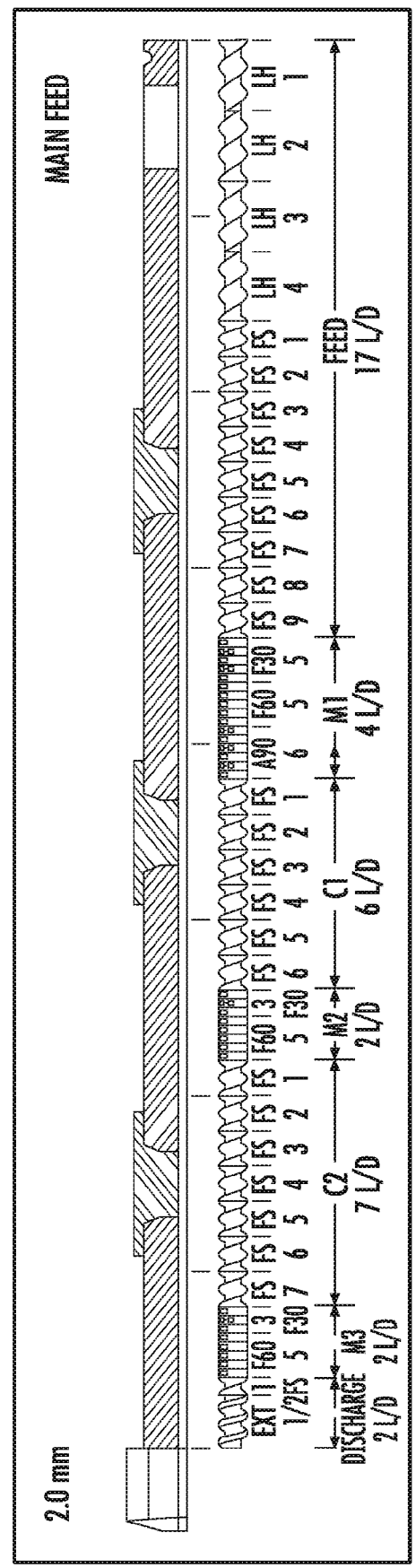

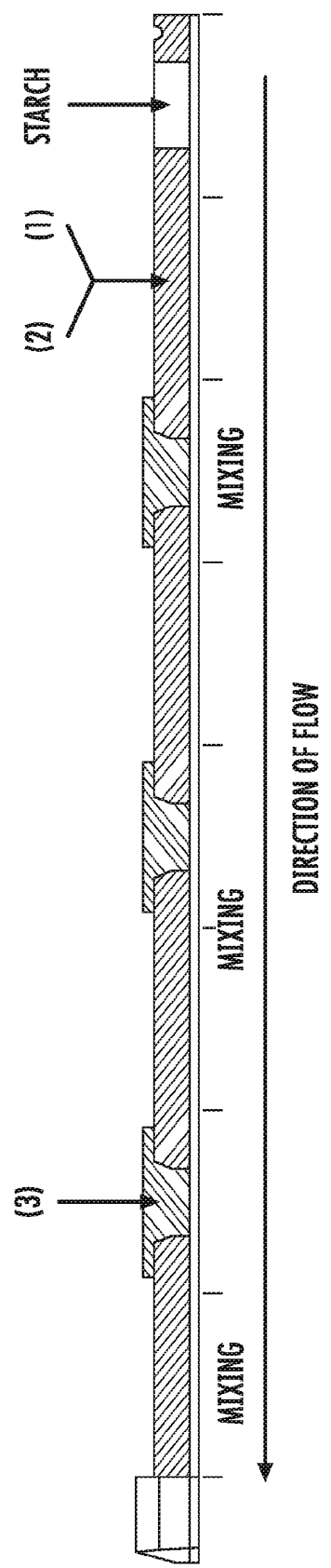

COATED PARTICLES AND METHODS OF MAKING AND USING THE SAME

RELATED APPLICATIONS

This application claims the benefit of and priority to U.S. Provisional Application Ser. No. 62/258,976, filed Nov. 23, 2015, U.S. Provisional Application Ser. No. 62/317,244, filed Apr. 1, 2016, U.S. Provisional Application Ser. No. 62/324,052, filed Apr. 18, 2016, and U.S. Provisional Application Ser. No. 62/395,621, filed Sep. 16, 2016, the disclosure of each of which are hereby incorporated by reference herein in their entirety.

FIELD

The present invention generally relates to coated particles, such as, for example, proppants comprising a coating, and to methods of making and using the same.

BACKGROUND

Conventional proppants are robust particles, such as sand, that are used to effectively "prop" open fractures created in geological formations during oil and gas drilling operations. Due to the fast settling time of sand in fracking fluids, viscosifying agents are used to suspend the sand to allow for effective pumping and improve the degree of proppant penetration into the fracked bed. These viscosifying agents require additional and/or stronger pumps, resulting in increased energy usage and/or higher capital cost, and consequentially, more operating cost. Additionally, the use of viscosifying agents has been found to produce poor (short) fractures in addition to damaging the fracture formation, resulting in decreased conductivity and decreased oil and gas output.

To alleviate issues surrounding the use of viscosifying agents, specialty ceramic and/or light weight proppants have been used. However, the highly engineered nature of these proppants greatly increases cost associated with the operation. Resin coated proppants (RCP) are an additional class of proppants where a polymer coating is used to trap pieces of broken proppant in the event of failure and additionally induce agglomeration of sand particles to prevent flowback.

Polymers used in RCP systems have been synthetic in nature and of the typical classes used for thermoset coatings: epoxies, polyesters, polyurethanes, etc. A recent technology utilized a hydrogel polymer coating of a superabsorbent material to suspend proppants during fracking operations. Superabsorbent materials used in these hydrogel-coated RCPs utilize anionic or neutral charge moieties. However, the performance of these superabsorbents progressively diminishes as the dissolved ion concentration increases. This effect is more pronounced when multivalent ions (e.g., divalent cations) are present such as in hard water conditions, likely due to a cross linking effect of the multivalent cation on the negatively charged sodium polyacrylate superabsorbent and resulting in inhibited swelling capacity. High ionic concentrations and hardness are typical characteristics of water available in fracking locations and as a result, these materials are limited to very specific usage scenarios where relatively pure water is required (tap water or water containing low total dissolved solids (TDS)). Additionally, even in scenarios where water is pure, it is likely that conditions within the well can harden otherwise more pure water and further decrease performance.

SUMMARY OF EXAMPLE EMBODIMENTS

One aspect of the present invention is directed to a particle comprising a core and a coating on, surrounding, and/or adhered to at least a portion of a surface of the core, the coating comprising a biopolymer (e.g., a modified biopolymer).

In some embodiments, the particle is a self-suspending particle when in a solution having a salinity in a range of about 50 ppm to about 100,000 ppm and/or having a hardness in a range of about 1 ppm to about 150,000 ppm.

In some embodiments, the particle and/or coating swells upon contact with a solution having a salinity in a range of about 50 ppm to about 100,000 ppm and/or having a hardness in a range of about 1 ppm to about 150,000 ppm. The amount of swelling may vary by less than 50% over a salinity concentration in a range of about 50 ppm to about 100,000 ppm and/or a hardness concentration in a range of about 1 ppm to about 150,000 ppm.

In some embodiments, the particle is for use in fracking and/or is used in a method of fracturing a well and/or in a method of fracturing a geological formation.

A further aspect of the present invention is directed to a plurality of particles comprising a particle of the present invention. In some embodiments, when about 35 grams of the plurality of particles is mixed with about 85 g of an aqueous solution in a 100 ml container and allowed to sit undisturbed for about 5 minutes, a settled bed height and/or volume of the plurality of particles is achieved that is about 0.5 to about 4 times greater than a settled bed height and/or volume of a plurality of uncoated particles under the same conditions.

Another aspect of the present invention is directed to a method of preparing a cross linked, coated particle, the method comprising combining a biopolymer with a core to form a coating comprising the biopolymer on the core; and cross linking the biopolymer on the core, thereby preparing the cross linked, coated particle.

A further aspect of the present invention is directed to a method of preparing a cross linked, coated particle, the method comprising extruding a melt extrudate comprising a biopolymer into and/or onto a mixture comprising a plurality of cores and a cross linking agent, thereby preparing the cross linked, coated particle.

Another aspect of the present invention is directed to a method of preparing a cross linked, coated particle, the method comprising combining a cross linking agent with a biopolymer to form a mixture (e.g., a melt extrudate); and combining the mixture and a plurality of cores, thereby preparing the cross linked, coated particle.

The foregoing and other aspects of the present invention will now be described in more detail including other embodiments described herein.

BRIEF DESCRIPTION OF THE DRAWINGS

FIG. 4 is an illustration of an extruder screw configuration used in Example 3.

FIG. 5 is an illustration of an extruder screw configuration used in Example 4D.

FIG. 6 is an illustration of an extruder screw configuration used in Example 4E.

FIG. 7 is an illustration of an extruder screw configuration used in Example 5A.

FIG. 11 is an illustration of a reaction scheme in an extruder in which a catalyst and a charge modifier are combined prior to introducing them into an extruder, where (1) refers to the catalyst, (2) refers to the charge modifier, and (3) refers to the crosslinker.

DESCRIPTION OF EXAMPLE EMBODIMENTS

Figure 1:
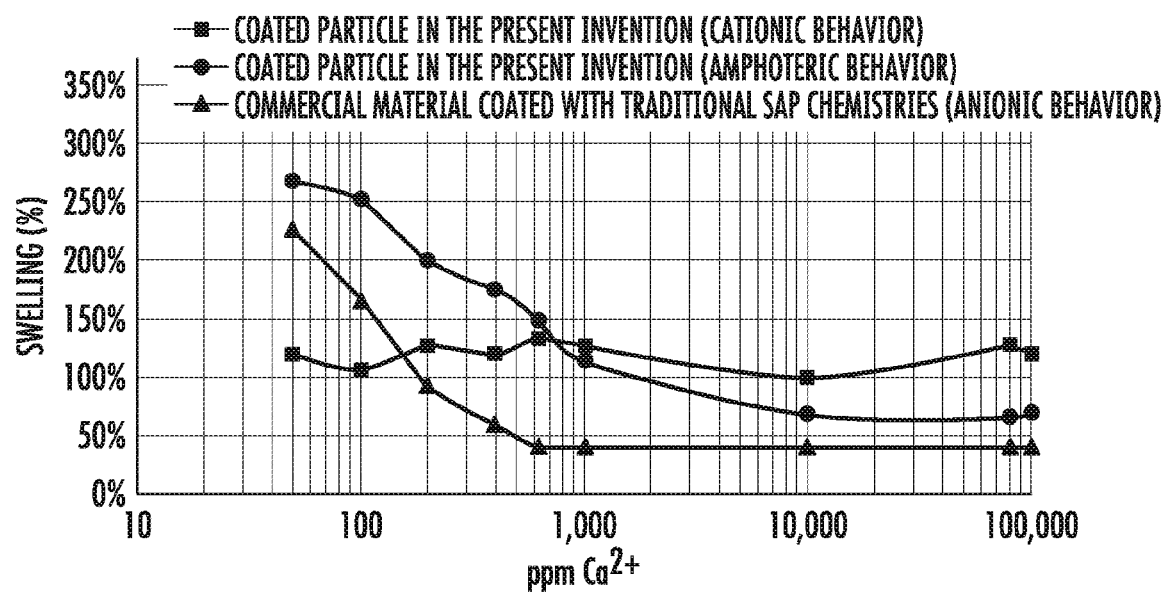
FIG. 1 is a graph of the percent of swelling versus the ion concentration for a cationic biopolymer coated particle according to embodiments of the present invention upon exposure to a solution comprising $CaCl_2$, an amphoteric biopolymer coated particle upon exposure to a solution comprising $CaCl_2$, and a synthetic commercial coated particle upon exposure to a solution comprising $CaCl_2$.

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

It will be understood that when an element or layer is referred to as being "on", "attached to", "connected to", "coupled to", "coupled with" or "contacting" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It will be appreciated by those of skill in the art that a structure referred to as being "directly on," "directly connected to, or "directly coupled to" another structure may partially or completely cover one or more surfaces of the other structure. It will also be appreciated by those of skill in the art that references to a structure or feature that is disposed "adjacent" another structure or feature may have portions that overlap or underlie the adjacent structure or feature.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations off 10%, ±5%, ±1%, +0.5%, or even ±0.1% of X. A range provided herein for a measurable value may include any other range and/or individual value therein.

As used herein, the terms "increase", "improve", and "enhance" (and grammatical variants thereof) refer to an increase in the specified parameter of greater than about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more.

Provided herein are coated particles. A coated particle of the present invention comprises a core and a coating that is on, surrounding, and/or adhered to at least a portion of a surface of the core. In some embodiments, the coating circumferentially overlies the core. The coating comprises a biopolymer (e.g., a modified biopolymer).

In some embodiments, the coating may comprise a hydrogel-forming polymer and/or a superabsorbent polymer (SAP). A hydrogel-forming polymer may be a polymer that forms a hydrogel upon contact with water. Thus, when a coating comprising a hydrogel-forming polymer is in contact with water, the coating may form a hydrogel. A SAP and/or coating comprising a SAP may absorb a fluid in an amount of about 10 times or more (e.g., 15×, 20×, 30×, 40×, 50×, 100×, 150×, 200×, 250×, 300×, etc.) relative to its weight. In some embodiments, a SAP and/or coating comprising a SAP may absorb a 10% saline solution in an amount of about 10 times or more (e.g., 15×, 20×, 25×, 30×, 35×, 40×, 45×, etc.) at room temperature and/or a 10% $CaCl_2$ solution in an amount of about 10 times or more (e.g., 15×, 20×, 25×, 30×, 35×, 40×, 45×, etc.) at room temperature and neutral pH. In some embodiments, a hydrogel-forming polymer may be an SAP The coating and/or coated particle may be biodegradable. In some embodiments, all or a portion of the coating and/or coated particle may undergo structural and/or chemical decomposition when exposed to heat, moisture, light, pH changes, and/or microbial enzymes. In some embodiments, a coated particle of the present invention will swell in solution (e.g., an aqueous solution) to reduce the specific gravity and/or increase the buoyancy of the coated particle, and may do so in a solution having a hardness in which multivalent cations (e.g., divalent cations) are present in a range of about 1 ppm to about 150,000 ppm or greater.

A coated particle of the present invention may have any suitable dimensions. In some embodiments, a coated particle of the present invention may have a diameter, on average, in a range of about 0.01 mm to about 20 mm. In some embodiments, a coated particle of the present invention may have an average diameter of about 0.01, 0.025, 0.05, 0.075, 0.1, 0.25, 0.5, 0.75, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20 mm or more. The coating on a particle of the present invention may have a uniform thickness on and/or surrounding a core. In some embodiments, the coating may have a thickness in a range of about 0.5 microns to about 50 microns, and the thickness may vary by about 20% or less. In some embodiments, a plurality of coated particles may be prepared and the thickness of the coating on and/or surrounding a respective core, on average, may vary by about 20% or less for the plurality of coated particles. The coating on a coated particle of the present invention may have a thickness of about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 microns or more. In some embodiments, a coating may be applied to a particle, on average, in the amount of about 0.1% to about 20% by weight relative to the particle or more. In some embodiments, a coated particle of the present invention may have a coating, on average, of about 0.1%, 0.25%, 0.5%, 0.75%, 1%, 2%, 3%, 4%, 5%, 6%, 7%, 8%, 9%, 10%, 11%, 12%, 13%, 14%, 15%, 16%, 17%, 18%, 19%, 20% or more by weight relative to the particle.

The coating on a coated particle of the present invention may comprise one or more (e.g., 1, 2, 3, 4, 5, 6, 7, or more) layers, which may be the same and/or different. For example, a coated particle may comprise a base coating layer adjacent to a surface of the core. The base coating layer may provide and/or maintain strength (e.g., sand crush strength) and/or may bind to the surface of the core. In some embodiments, the base coating layer may encapsulate fines during fracture and/or pieces of the core that break off, such as, e.g., when the particle is exposed to shear and/or agitation. One or more additional coating layers may overlie (e.g., circumferentially overlie) the base coating layer and/or core. In some embodiments, a base coating layer adjacent to a surface of the core may comprise a resin coating (e.g., an epoxy or vinyl coating). In some embodiments, one or more layers of an anionic coating (e.g., an anionic SAP coating) may be provided on a core and/or base coating layer, followed by one or more layers of a cationic coating (e.g., a cationic SAP coating). In some embodiments, one or more layers of an amphoteric coating (e.g., an amphoteric SAP coating) may be provided on a core and/or base coating layer, followed by one or more layers of a cationic coating (e.g., a cationic SAP coating). A coated particle of the present invention may comprise alternating layers of an anionic and cationic coating.

In some embodiments, a coated particle of the present invention may be a proppant. The proppant may be a self-suspending proppant. A self-suspending proppant may have a specific gravity that is less than the specific gravity of an uncoated proppant and/or the volume of the proppant, upon exposure to water, may be greater than that of a dry and/or uncoated proppant. In some embodiments, a coated particle (e.g., proppant) of the present invention may be used in a fracking application and/or method.

Upon contact with a solution (e.g., an aqueous solution), a coated particle of the present invention may swell greater than 0.5× in volume relative to an uncoated particle, such as, for example, 1×, 1.5×, 2×, 2.5×, 3×, 3.5×, 4×, 4.5×, 5× or more. The solution may have a hardness in a range of 1 ppm to about 150,000 ppm. In some embodiments, swelling of the coated particle as measured by volumetric change upon contact with a solution may represent a surrogate metric for increased proppant volume and/or reduced proppant specific gravity. In some embodiments, a coated particle of the present invention may swell greater than 4× in volume upon contact with a solution. The swelling may be independent of hardness. In some embodiments, the coated particle may swell greater than 0.5× (e.g., 1×, 2×, 3×, etc.) in volume upon contact with a solution having a hardness in a range of 1 ppm to about 150,000 ppm or greater. For example, a solution may comprise one or more dissolved minerals and/or multivalent ions (e.g., calcium and/or magnesium) in an amount of about 1, 10, 100, 500, 1,000, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 120,000, 150,000, ppm or more. In some embodiments, calcium and/or magnesium may be present in a solution in an amount of about 1, 10, 100, 500, 1,000, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 120,000, 150,000, ppm or more.

In some embodiments, the thickness of the coating on a coated particle of the present invention prior to swelling may be about 0.01% to about 20% of the average diameter of the coated particle prior to swelling. Upon contact with a solution and swelling, the coating may have a thickness of about 10% to about 300% of the average diameter of the coated particle prior to swelling.

A coated particle of the present invention may have increased swelling compared to an uncoated core (e.g., uncoated sand) and/or a current commercial coated particle and/or proppant, such as, for example, an acrylate (e.g., polyacrylate) and/or acrylamide (e.g., polyacrylamide) coated particle and/or proppant. An acrylate coated particle and/or proppant may have an anionic charge and an acrylamide coated particle and/or proppant may have a neutral charge and/or anionic charge. In some embodiments, the coated particle may have an amount of swelling that is increased by at least about 10%, 15%, 20%, 25%, 30%, 35%, 40%, 45%, 50%, 55%, 60%, 65%, 70%, 75%, 80%, 85%, 90%, 95%, 100%, 150%, 200%, or more compared to an uncoated core and/or a current commercial coated particle and/or proppant. A coated particle of the present invention may swell at least two times greater (e.g., 2, 3, 4, 5, or more) than an uncoated core and/or a current commercial coated particle and/or proppant. In some embodiments, the coated particle may swell at least two times greater in a solution (e.g., an aqueous solution) having a salinity in a range of about 50 ppm to about 100,000 ppm and/or having a hardness in a range of about 1 ppm to about 150,000 ppm compared to an uncoated core and/or a current commercial coated particle and/or proppant. For example, the solution may have a salinity of about 50, 100, 500, 1,000, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000 ppm or more and/or may comprise one or more dissolved minerals and/or multivalent ions (e.g., calcium and/or magnesium) in an amount of about 1, 10, 100, 500, 1,000, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 120,000, 150,000, ppm or more. In some embodiments, when exposed to an aqueous solution, the coating may form a swollen gel, optionally a hydrogel.

Settled bed height (SBH) may be used as a volumetric measure of swelling for a coated particle of the present invention. SBH may be determined by exposing a given amount of coated particles to a solution, mixing and/or shaking the solution comprising the coated particles, and measuring the bed height of the plurality of particles after a given amount of time. The bed, height of the plurality of coated particles may be compared to the bed height of uncoated particles (e.g., the uncoated core of the coated particles) under the same or similar conditions to provide the percent of swelling.

In some embodiments, a plurality of coated particles of the present invention may swell to provide an increase in settled bed height and/or volume when the plurality of coated particles is exposed to a solution, such as, e.g., an aqueous solution having a salinity in a range of about 50 ppm to about 100,000 ppm and/or a hardness in a range of 1 ppm to about 150,000 ppm, compared to a plurality of uncoated cores and/or a current commercial coated particle and/or proppant under the same or similar conditions. The increase in settled bed height and/or volume may be at least about 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, or more compared to an uncoated core and/or a current commercial coated particle and/or proppant. In some embodiments, when about 35 grams of a plurality of coated particles is mixed with about 85 g of an aqueous solution in a 100 ml container (e.g., a glass jar that may be square), shaken by hand for about 1 minute, and then allowed to sit undisturbed for about 5 minutes, a settled bed height and/or volume may be achieved that is about 0.5 to about 4 times greater than the settled bed height and/or volume of a plurality of uncoated cores (e.g., uncoated cores that are the same as the core used in the coated particle) and/or a plurality of current commercial coated particles and/or proppants under the same or similar conditions. In some embodiments, the settled bed height and/or volume for a plurality of coated particles may show approximately equivalent values/heights when exposed to a range of hardness and/or salinity. For example, a plurality of coated particles may exhibit a 3× change in volume and/or settled bed height in an aqueous solution containing 200 ppm $Ca^{2+}$ and a 3× change in volume in an aqueous solution containing 2000 ppm $Ca^{2+}$. In some embodiments, the degree of swelling for a coated particle of the present invention in an aqueous solution having a hardness in a range of about 150 ppm to about 150,000 ppm may change by less than about 40% (e.g., less than about 35%, 30%, 25%, 20%, 15%, 10%, 5%, etc.) compared to the coated particle in an aqueous solution having a hardness in a range of less than 150 ppm. In some embodiments, the settled bed height and/or volume for a plurality of coated particles of the present invention may change by less than about 40% (e.g., less than about 35%, 30%, 25%, 20%, 15%, 10%, or 5%) after multiple shaking and/or shear cycles. In some embodiments, the settled bed height and/or volume may change by less than about 40% (e.g., less than about 35%, 30%, 25%, 20%, 15%, 10%, or 5%) after exposing the coated particle to shear in a range of about 40 $s^{-1}$ to about 600 $s^{-1}$, such as, e.g., about 40 $s^{-1}$ to about 100 $s^{-1}$ or about 170 $s^{-1}$ to about 550 $s^{-1}$ for about 1 minute to about 1 hour (e.g., about 5, 10, 15, 20, 25, 30, 35, 40, 45, 50, 55, or 60 minutes). Thus, in some embodiments, after exposing a plurality of coated particles of the present invention to shear in a range of about 40 $s^{-1}$ to about 600 $s^{-1}$ for about 1 minute to about 1 hour, the plurality of coated particles may have a settled bed height and/or volume that is about 60% or more (e.g., 65%, 70%, 75%, 80%, 85%, 90%, 95%, 98%, 100%, 110%, 120%, 150%, or more) of the settled bed height and/or volume prior to exposing the particles to shear.

A coated particle of the present invention may have an improved uniformity in swelling performance over a broad range of total dissolved solids (TDS) conditions compared to a current commercial coated particle and/or proppant. In some embodiments, the degree of volumetric swelling for a plurality and/or bed of coated particles of the present invention in distilled water may change by about 50% or less (e.g., about 45%, 40%, 35%, 30%, 25%, 20%, 15%, 10%, 5%, etc.) compared to the degree of volumetric swelling for the plurality and/or bed of coated particles in an aqueous solution having a salinity in a range of about 50 ppm to about 100,000 ppm and/or a hardness in a range of 1 ppm to about 150,000 ppm. The degree of volumetric swelling for a coated particle of the present invention may change by about 50% or less as ion concentration increases. In some embodiments, as the ion concentration increases, the amount of volumetric swelling for the coated particle changes by about 50%, 45%, 40%, 35%, 30%, 25%, 20%, 15%, 10%, 5%, or less. In some embodiments, a coated particle of the present invention may have an increased amount of swelling at a particular ion concentration compared to a current commercial coated particle and/or proppant. For example, as shown in FIG. 1, as tested by measuring volumetric change in settled bed height or modeled, a coated particle according to embodiments of the present invention may have a 1.5×-3× increase in volumetric swelling and/or performance compared to a commercial polyacrylate or polyacrylamide coated particle and/or proppant upon exposure to a solution comprising of NaCl and/or $CaCl_2$ in concentrations greater than 1,000 ppm.

Figure 2:
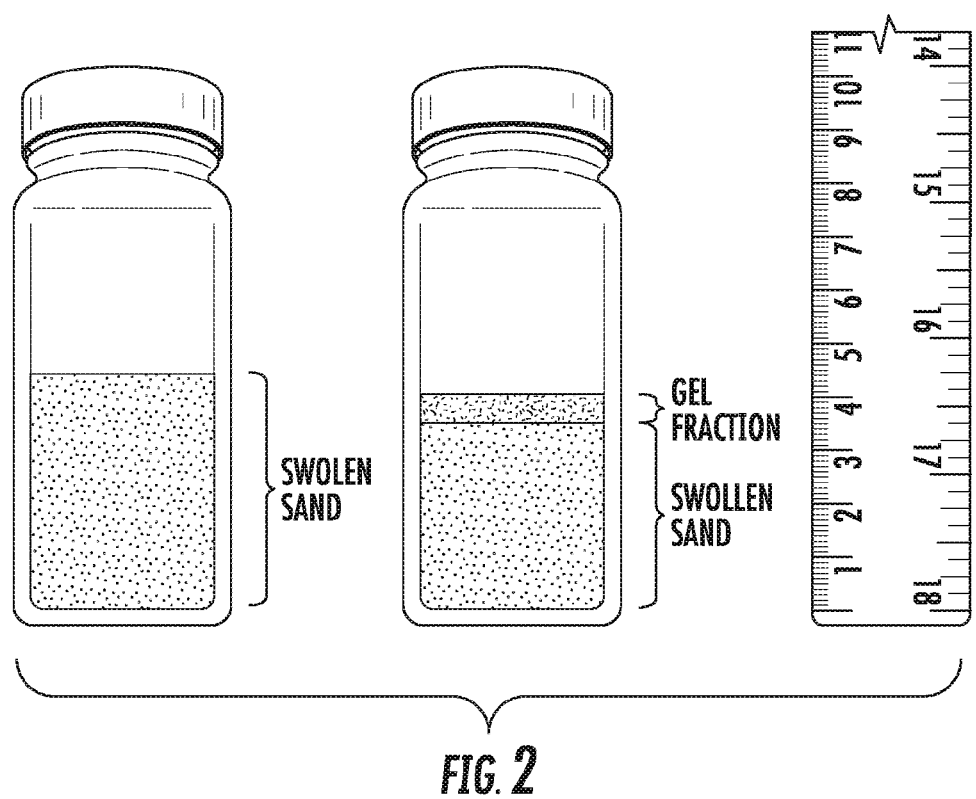
FIG. 2 is a photograph that illustrates how the height of the swollen bed of sand was measured compared to a gel fraction (free of sand).
Figure 3:
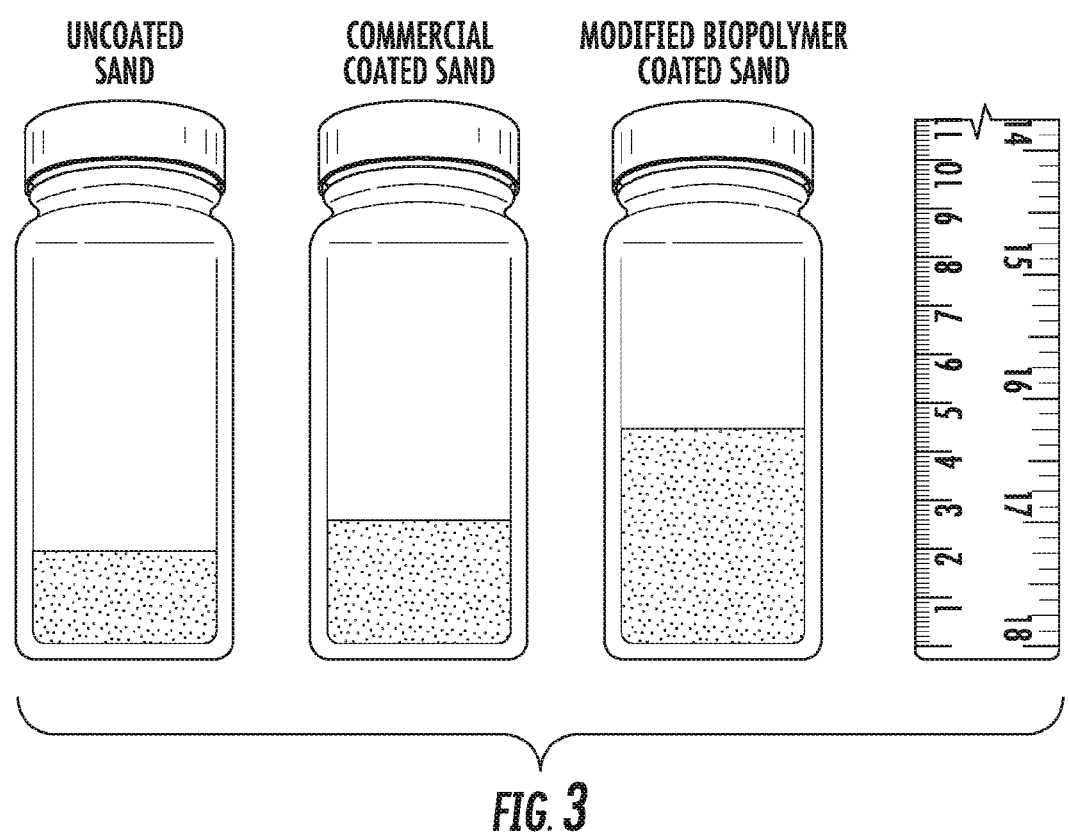
FIG. 3 is a photograph of certain samples as they appeared for measurement of Settled Bed Height (SBH) in 10% $CaCl_2$, which, from left to right, are uncoated sand, synthetic commercial coated particle control, and modified biopolymer coated particle.

In some embodiments, the coating on a coated particle of the present invention and/or a portion of the coating (e.g., 50%, 60%, 70%, 80%, 90% or more) may remain present on, around, and/or adhered to the core (e.g., sand) during and/or after the presence and/or application of shear (e.g., dry and/or wet solution shear such as, for example, seen in shipping and fracking operations) and/or agitation. During and/or after the application of shear and/or agitation, the coated particle may be given sufficient time to settle, and after which the presence of a gel layer may become visible. In some embodiments, volumetric swelling behavior is retained after a relevant degree of shear. A coated particle of the present invention may be a shear stable particle. In some embodiments, a coated particle of the present invention may be resistant to shear inherent to and/or caused by a pumping process, such as, for example, a pumping process used in a fracking operation, such that the coating may remain present on, around, and/or adhered to the core. For example, shear may be induced to and/or experienced by a coated particle of the present invention in solution via shaking vigorously by hand. In some embodiments, a coated particle of the present invention may be exposed to a solution and shaken for about one minute followed by allowing the coated particle to settle for about 5 minutes. The coated particle may be additionally shaken and allowed to settle repeatedly, for example twice, three times, or more, with a less than about 20% change in the degree of swelling compared to initial measurements (FIG. 2).

In some embodiments, the coating on a coated particle of the present invention may remain present on, around, and/or adhered to the core after one or more hours (e.g., 1, 2, 3, 4, 5, 6, or 7 hours) of exposure to and/or contact with an aqueous solution, optionally in the presence of shear and/or agitation. The aqueous solution may have a temperature from about 28° F. to about 350° F. In some embodiments, the aqueous solution may have a temperature of about 30° F., 50° F., 75° F., 100° F., 125° F., 150° F., 175° F., 200° F., 225° F., 250° F., 275° F., 300° F., 325° F., 350° F. or more. The aqueous solution may have a salinity in a range of about 50 ppm to about 100,000 ppm and/or a hardness of about 1 ppm to about 150,000 ppm.

The coating on a coated particle of the present invention may be insoluble in water. The coating on a coated particle of the present invention may be resistant or substantially resistant to water hardness. In some embodiments, the performance of the coating (e.g., a SAP coating) may not be diminished or substantially diminished in hard water. In some embodiments, the gel strength and/or permeability of a swollen plurality and/or bed of particles of the present invention may be controlled by the cross link density of the biopolymer (e.g., modified biopolymer) making up the coating.

In some embodiments, the coating may be "breakable" (i.e., deswelled, unswollen, and/or degraded) in the presence of a breaking agent. Breaking agents can include, for example, oxidizers (e.g., oxidizing agents), acids, and/or enzymes. Examples of primary oxidative breakers include, but are not limited to, persulfates and/or peroxides. Further example breaking agents include, but are not limited to, hydrochloric acid, ammonium persulfate, sodium peroxide, and/or magnesium peroxide. In some embodiments, the breaker or breaking agent can be added in concentrations of about 0.05 to about 20 pounds per thousand gallons (pptg) for time lengths of about 0.1 to about 48 hours at temperatures of in a range of about 25 to about 350° C.

The rate and/or amount of swelling of a coated particle of the present invention may be tuned and/or adjusted according to embodiments of the present invention. In some embodiments, a coated particle of the present invention may swell to a given degree (e.g., a maximum swelling amount) faster than a current commercial coated particle and/or proppant swells to the same or a similar degree. In some embodiments, the coated particle may swell to a given degree faster by about 10%, 15%, 20%, 25%, 30%, 35%, 40%, 45%, 50%, 55%, 60%, 65%, 70%, 75%, 80%, 85%, 90%, 95%, 100%, 150%, 200%, or more compared to a current commercial coated particle and/or proppant to the same or a similar degree. In some embodiments, a coated particle of the present invention may swell to a given degree (e.g., the maximum swelling amount) in about 30 minutes to about 60 minutes. A coated particle of the present invention may swell to a given degree in about 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 minute or less. In some embodiments, a coated particle of the present invention may swell to a given degree (e.g., a maximum swelling amount) in about 10 seconds to about 60 seconds.

Alternatively, a coated particle of the present invention may swell to a given degree (e.g., a maximum swelling amount) slower than a current commercial coated particle and/or proppant to the same or a similar degree. In some embodiments, the coated particle may swell to a given degree slower by about 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500% or more compared to a current commercial coated particle and/or proppant to the same or a similar degree. In some embodiments, a coated particle of the present invention may swell to a given degree in about 1 hour or more, whereas a current commercial coated particle and/or proppant may swell to the same degree in about 30 minutes to 60 minutes. A coated particle of the present invention may swell to a given degree (e.g., a maximum swelling amount) in about 1, 1.5, 2, 2.5, 3, 3.5, 4, 4.5, 5, 5.5, 6, 6.5, 7, 7.5, 8 hours or more. In some embodiments, a coated particle of the present invention may swell to a given degree (e.g., a maximum swelling amount) in about 2 to about 8 hours.

Any suitable substrate and/or material may be used as a core. In some embodiments, at least a portion of a surface of the core is compatible with the coating, such that the coating may adhere to this portion of the surface of the core. Example substrates and/or materials that may be used as the core include, but are not limited to, sand, resin coated sand, bauxites, low density proppants, ceramics, kaolinites, clay, particles formed from fibrous materials, glass materials, nut shells, ground or crushed nut shells, seed shells, ground or crushed seed shells, fruit pit pieces, ground or crushed fruit pits, processed wood, composite particulates prepared from a binder with filler particulate including silica, fumed silica, alumina, fumed carbon, carbon black, graphite, mica, titanium dioxide, meta-silicate, calcium silicate, kaolin, talc, zirconia, boron, fly ash, hollow glass microspheres, solid glass, fibers, textiles (nonwoven and/or woven), seed(s), regenerated cellulosics, synthetic polymers, coal particles, asphalt, cement particles, concrete, calcium carbonate particles, clay particles, titanium dioxide particles, calcined clay particles, metal flakes or particles, and any combination thereof. In some embodiments, the core may comprise a material and/or substrate used as a proppant and/or in a fracking application and/or method. The core may comprise a lightweight proppant and/or the coating around a core may include additives such as, e.g., a traceable and/or slow release material, which may allow for a traceable proppant and/or carrier for viscosifying agent, respectively. In some embodiments, the core comprises sand. In some embodiments, the core comprises one or more (e.g., 2, 3, 4, 5, 6 or more) particles (e.g., sand particles) that may or may not be bound together. The coating, thus, may encapsulate one or more particles to form a larger particle. In some embodiments, the coating encapsulates only one particle (e.g., one grain of sand) to form a coated particle of the present invention.

A coating of the present invention may comprise a biopolymer, such as, for example, a modified biopolymer. A "modified biopolymer" as used herein refers to a biopolymer that is modified chemically and/or physically, such as, for example, charge-modified and/or cross linked, optionally by a method described herein. In some embodiments, the coating comprises a modified biopolymer, such as, but not limited to, a cross-linked, charge-modified biopolymer. A cross-linked, charged-modified biopolymer of the present invention may comprise one biopolymer that has been charge-modified and cross-linked. In some embodiments, the coating of a coated particle of the present invention comprises one biopolymer that has been charge-modified and cross-linked. In some embodiments, the coating of a coated particle of the present invention comprises a biopolymer and the biopolymer consists of a cross-linked, charge-modified biopolymer. In some embodiments, a cross-linked, charged-modified biopolymer of the present invention may comprise two or more different biopolymers that are cross-linked and at least one of the biopolymers has been charge-modified. The two or more different biopolymers may be cross-linked with each other. In some embodiments, a cross-linked, charge-modified biopolymer may comprise two different biopolymers that are cross-linked and both of the biopolymers may be charge-modified. In some embodiments, a coating of the present invention comprises a biopolymer that is plasticized and/or gelatinized. Gelatinization may be determined by measuring the presence of crystallinity qualitatively (e.g., via birefringence) and/or quantitatively (e.g., via x-ray diffraction). In addition to a biopolymer, a coating of the present invention may comprise one or more additives, such as, but not limited to, one or more hydrophobic agents, viscosifying additives, flowability agents, binding agents, surfactants, and/or linker molecules.

In some embodiments, the coating of a coated particle of the present invention may comprise a modified biopolymer (e.g., a charge modified and/or cross linked biopolymer) that has a degree of crystallinity that is and/or has been decreased compared to the biopolymer prior to modification (e.g., prior to a method of the present invention) and/or compared to a modified biopolymer prepared using a conventional method and/or compared to a known coating. For example, in some embodiments, the coating of a coated particle of the present invention may comprise a modified biopolymer that has a degree of crystallinity that is and/or has been decreased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, or more compared to the biopolymer prior to modification (e.g., prior to a method of the present invention) and/or to a modified biopolymer prepared using a conventional method and/or compared to a known coating.

In some embodiments, the coating of a coated particle of the present invention may comprise a modified biopolymer (e.g., a charge modified and/or cross linked biopolymer) that has a glass transition temperature that is and/or has been decreased compared to the biopolymer prior to modification (e.g., prior to a method of the present invention) and/or compared to a modified biopolymer prepared using a conventional method and/or compared to a known coating. For example, in some embodiments, the coating of a coated particle of the present invention may comprise a modified biopolymer that has a glass transition temperature that is and/or has been decreased by at least about 5%, 10%, 15%, 20%, 25%, 30%, 35%, 40%, 45%, 50%, 55%, 60%, 65%, 70%, 75%, 80%, 85%, 90%, 95%, or more compared to the biopolymer prior to modification (e.g., prior to a method of the present invention) and/or to a modified biopolymer prepared using a conventional method and/or compared to a known coating.

A coated particle of the present invention may comprise a modified biopolymer (e.g., a cross linked, charged modified biopolymer) and/or coating that is insoluble in an aqueous solution. In some embodiments, the coating and/or modified biopolymer is insoluble in an aqueous solution having a salinity in a range of about 50 ppm to about 150,000 ppm and/or having a hardness in a range of about 1 ppm to about 150,000 ppm. At least a portion (e.g., about 50%, 55%, 60%, 65%, 70%, 75%, 80%, 85%, 90%, 95%, 98%, or 100%) of the coating and/or modified biopolymer may remain present on, around, and/or adhered to a core for at least about 30, 45, or 60 minutes, or 1.5, 2, 2.5, 3 hours or more when in contact with and/or exposed to an aqueous solution (e.g., an aqueous solution having a salinity in a range of about 50 ppm to about 150,000 ppm and/or having a hardness in a range of about 1 ppm to about 150,000 ppm).

A biopolymer (e.g., a native biopolymer) and/or modified biopolymer may be used to prepare a coating of the present invention. A "biopolymer" as used herein refers to a polymer produced by a living organism or a derivative thereof. In some embodiments, a biopolymer has at least one free amine and/or hydroxyl group present on a majority of the monomeric units of the polymer. In some embodiments, a free amine and/or hydroxyl group may be present on each of the monomeric units of the polymer backbone. Example biopolymers include, but are not limited to, proteins, polyamino acids, and/or polysaccharides. As one of ordinary skill in the art will understand, a biopolymer may be synthetically obtained (e.g., through laboratory synthesis) and/or obtained and/or derived from nature (e.g., from a living or previously living organism). Therefore, the biopolymer may be the same as a polymer found in nature (i.e., a native biopolymer) or may be a derivative thereof. For example, a biopolymer of the present invention may be a derivative of a polymer produced by a living organism, the derivative caused by the synthetic method used to obtain or isolate the biopolymer from nature. In some embodiments, a biopolymer may be a polymer produced by bacteria and/or microbes. The biopolymer may be biorenewable and/or biodegradable.

Further example biopolymers include, but are not limited to, starches (including amylose and/or amylopectin), flours, chitosans, hemicelluloses, lignins, celluloses, chitins, alginates, dextrans, pullanes, polyhydroxyalkanoates, fibrins, cyclodextrins, proteins (e.g., soy protein), polysaccharides (e.g., pectin), poly amino acids (e.g., gamma-polyglutamic acid) and/or polylactic acids.

A biopolymer and/or modified biopolymer used in a method of the present invention may have a moisture content of about 20% by weight or less. In some embodiments, the biopolymer and/or modified biopolymer may have a moisture content of about 20%, 15%, 10%, 5%, or less by weight. In some embodiments, the biopolymer and/or modified biopolymer may have a moisture content in a range of about 5% to about 20% by weight or about 10% to about 15% by weight. In some embodiments, a method of the present invention utilizes a biopolymer, such as, for example, starch, having a moisture content of about 20% by weight or less, and the biopolymer may be in powder form.

A biopolymer and/or modified biopolymer used in a method of the present invention, when soluble, may have a solution viscosity of about 2 cP or more. In some embodiments, a solution comprising the biopolymer and/or modified biopolymer dissolved in the solution in an amount of about 1% by weight of the solution may have a viscosity of about 2 cP to about 5,000 cP or more.

In some embodiments, when only one biopolymer is used to prepare a modified biopolymer of the present invention (e.g., a charge-modified biopolymer and/or a cross-linked, charge-modified biopolymer), the biopolymer may have a molecular weight of greater than about 50,000 Daltons. In some embodiments, when two or more different biopolymers are used to prepare a modified biopolymer of the present invention (e.g., a cross-linked, charge-modified biopolymer), at least one of the two or more different biopolymers may have a molecular weight of about 10,000 Daltons or more, such as, for example, about 20,000; 30,000; 40,000, 50,000 Daltons or more. In certain embodiments, a modified biopolymer of the present invention (e.g., a cross-linked, charge-modified biopolymer) may be prepared using a biopolymer having a molecular weight of greater than about 50,000 Daltons optionally with a second different biopolymer having a molecular weight of greater than about 10,000 Daltons. In some embodiments, the biopolymer and/or modified biopolymer may be polydisperse.

In some embodiments, the biopolymer and/or modified biopolymer used in a method of the present invention may be a starch. Example starches include, but are not limited to, potato starch, wheat starch, tapioca starch, cassava starch, rice starch, corn starch, waxy corn starch, waxy wheat starch, waxy rice starch, waxy sorghum starch, waxy cassava starch, waxy barley starch, and/or waxy potato starch. The starch may have an amylopectin content of about 70% w/w or more and an amylose content of about 30% w/w or less. In some embodiments, the starch may have an amylopectin content of about 70%, 75%, 80%, 85%, 90%, 95% w/w or more and an amylose content of about 30%, 25%, 20%, 15%, 10%, 5% w/w or less. In some embodiments, the starch may have an amylopectin content of less than 90%, such as, for example, about 85%, 80%, 75%, 70%, 65%, 60%, 55%, 50%, 45%, 40%, 35%, 30%, 25%, 20%, 15%, 10%, etc. In some embodiments, starch may have an amylopectin content in a range of about 10% to about 85%, such as, for example, about 25% to about 85% or about 50% to about 80%. In some embodiments, the starch may be dissolvable in water (e.g., pre-gelatinized starch). In some embodiments, the starch may be steam exploded to form a pre-gelatinized starch. In some embodiments, a starch used in a method of the present invention may have a reduced degree of crystallinity compared to a native starch.

In some embodiments, the biopolymer and/or modified biopolymer used in a method of the present invention may be a flour. Example flours include, but are not limited to, potato flour, wheat flour, tapioca flour, cassava flour, rice flour, corn flour, pregelatinized potato flour flour, pregelatinized wheat flour, pregelatinized tapioca flour, pregelatinized cassava flour, and/or pregelatinized rice flour. The flour may have a starch content of about 85% or more. In some embodiments, the flour may have a starch content of about 85%, 90%, or 95%. In some embodiments, the flour may have a protein content of about 15% or less. In some embodiments, the flour may have a protein content of about 1%, 5%, 10%, or 15%. In some embodiments, the starch may be steam exploded to form a pre-gelatinized flour.

In some embodiments, the biopolymer and/or modified biopolymer used in a method of the present invention may be a chitosan. The chitosan may have a degree of deacetylation of about 50% to about 100%. In some embodiments, the chitosan may have a degree of deacetylation of about 50%, 55%, 60%, 65%, 70%, 75%, 80%, 85%, 90%, 95%, or 100%. In some embodiments, the chitosan may have a degree of deacetylation in a range of about 70% to about 100% or greater than about 80%. In some embodiments, the chitosan may have a molecular weight of greater than about 80,000 Daltons.

In some embodiments, the biopolymer and/or modified biopolymer used in a method of the present invention may be a hemicellulose. In some embodiments, the biopolymer and/or modified biopolymer used in a method of the present invention may be a cellulose, hemicellulose, chitosan, lignin, pectin, and any combination thereof.

A biopolymer used in a method of the present invention may be charge-modified according to a method described herein (e.g., by reacting the biopolymer with a charge-modifying agent in a homogeneous reaction blend) to prepare a modified biopolymer. However, as one of skill in the art will recognize, a biopolymer may naturally carry a charge (i.e., the biopolymer may natively be charged in that the charge is present on the biopolymer not through a method of the present invention). Thus, a method of the present invention may change the charge present on a biopolymer (e.g., type and/or amount of charge).

In some embodiments, a charge-modified biopolymer of the present invention may be soluble (e.g., partially or fully soluble) in a polar solvent, such as, for example, water and/or a polar organic solvent at room temperature and/or a nonpolar solvent at room temperature. In some embodiments, a charge-modified biopolymer of the present invention may be at least 70% soluble in a polar and/or nonpolar solvent at room temperature. Solubility may be used as an indication and/or characteristic of the degree of charge modification.

"Charge-modifying agent" as used herein refers to a molecule or compound comprising one moiety that may react with a reactive group of the biopolymer (e.g., an amine and/or hydroxyl group) and a second moiety that may be positively charged or negatively charged under suitable conditions, such as, for example, at a certain pH. "Moiety" as used herein, refers to a portion of a molecule or compound having a particular functional or structural feature. For example, a moiety may comprise a functional group or a reactive portion of a compound. As those of skill in the art recognize, a strong acidic moiety (e.g., —$SO_3H$) or a weak acidic moiety (e.g., —COOH) may form a negatively charged moiety and a strong basic moiety (e.g., —OH) or a weak basic moiety (—$NH^+_4$) may form a positively charged moiety.

The charge-modifying agent may comprise at least one moiety that may be a positively charged group, such as, but not limited to, a primary amine, secondary amine, tertiary amine, quaternary ammonium, sulfonium, and/or phosphonium group. Example charge-modifying agents that can have a positively charged moiety include, but are not limited to, ethylene imine, N-(2-hydroxyethyl) ethylene imine, cyanamide, beta-morpholinoethylchloride, beta-diethyl aminoethylchloride, S-diethyl amino 1,2-epoxypropane dimethyl aminoethyl methacrylate, epoxy 3-methyl ammonium, glycidyltrimethylammonium chloride (e.g., QUAB® 151), N-(2,3-epoxypropyl) trimethyl ammonium chloride, (4-chlorobutene-2) trimethyl ammonium chloride, 2-chloroethyl methyl ethyl sulfonium iodide, and/or Z-chloroethyl tributylphosphonium chloride. In some embodiments, the charge-modifying agent comprises a tertiary amino alkyl group, a hydroxyalkyl group, a quaternary ammonium alkyl group, or a hydroxyalkyl group.

In some embodiments, a positively charged moiety may be introduced into and/or onto a biopolymer by reacting the biopolymer and charge-modifying agent in a homogeneous reaction blend, optionally in the presence of a catalyst. This reaction may be a dry melt process and/or may be an etherification or esterification reaction. In some embodiments, a positively charged moiety may be introduced into and/or onto a biopolymer via reactive extrusion. In some embodiments, a cationic agent may be used such that it is converted into a reactive form via reactive extrusion (e.g. converting reagent in a chlorohydrin form to epoxide form).

The charge-modifying agent may comprise at least one moiety that may be a negatively charged group, such as, but not limited to, a carboxyl, sulfonate, sulfate, and/or a phosphate group (e.g., sodium tripolyphosphate). Example charge-modifying agents that can have a negatively charged moiety include, but are not limited to, acids (e.g., citric acid, glacial acetic acid, ethylenediaminetetraacetic acid (EDTA), and/or diethylene triamine pentaacetic acid (DTPA)); monohalogen substituted fatty acids (e.g., monochloroacetic acid); acetates (e.g., sodium monochloroacetate); anhydrides (e.g., succinic anhydride, maleic anhydride, citraconic anhydride, and/or octenyl succinicanhydride); alkyl esters of acrylic acid, crotonic acid or itaconic acid (e.g., methyl and ethyl esters of acrylic acid, crotonic acid or itaconic acid); acrylonitrile; sodium periodate; sulfones; and/or sulfonic acids (e.g., halo alkane sulfonic acids, chlorooxypropane sulfonic acid, epoxypropane sulfonic acid, chlorooxypropane sulfonic acid, epoxypropane sulfonic acid, ethene sulfonic acid, and/or salts thereof).

In some embodiments, a negatively charged moiety may be introduced into a biopolymer by reacting the biopolymer and charge-modifying agent in a homogeneous reaction blend in the presence an alkaline catalyst. In some embodiments, the charge-modifying agent may be acrylonitrile and the reaction of the biopolymer and acrylonitrile in the presence of an alkaline catalyst may be followed by hydrolysis of the cyanoethyl groups. When the charge-modifying agent is sodium periodate, the reaction with the biopolymer may be followed by a treatment to transform the carbonyl groups into carboxyl groups, such as, but not limited to, by treating with sodium chlorite, and/or by a treatment with sodium bisulfite and/or potassium bisulfite. In certain embodiments, both carboxyl and sulfonate groups may be introduced into a biopolymer by reacting the biopolymer with an anhydride of an unsaturated acid (e.g., maleic acid) and a bisulfite. The bisulfite may be reacted with the unsaturated bond of the polysaccharide half ester.

In some embodiments, the charge-modifying agent may react with an amine and/or hydroxyl group of a biopolymer to provide a charge-modified biopolymer. The charge-modified biopolymer may be cationic (i.e., have a net positive charge) or may be anionic (i.e., have a net negative charge). In some embodiments, the charge-modified biopolymer may contain both positively and negatively charged moieties.

A biopolymer and/or modified biopolymer used in a method of the present invention may be cross-linked by reacting a cross-linking agent with the biopolymer and/or modified biopolymer and optionally with at least one different biopolymer that may optionally be charge-modified. In some embodiments, a cross-linking agent may be reacted with at least one charge-modified biopolymer. "Cross-linking agent" as used herein refers to a compound that links two or more biopolymer chains and/or portions of the biopolymer together, the biopolymer optionally being charge-modified. The linkage may be achieved via a covalent bond or an ionic bond. In some embodiments, the linkage may be through a moiety or group of the biopolymer or different biopolymers.

Example cross-linking agents include, but are not limited to, epichlorohydrin, glutaraldehyde, citric acid, oxalic acid, malonic acid, succinic acid, glutaric acid, adipic acid, pimelic acid, fumaric acid, maleic acid, malic acid, tartaric acid, sodium trimetaphosphate, sodium tripolyphosphate, ionic cross-linkers (e.g., calcium chloride, calcium hydroxide, etc.), ethylene glycol diglycidyl ether (EDGE), poly (ethylene glycol) diglycidyl ether (PEGDE), poly(propylene glycol) diglycidyl ether (PPGDE), and/or an anhydride, such as, for example, succinic anhydride and maleic anhydride. In some embodiments, the cross-linking agent is non-toxic.

In some embodiments, a cross-linked, charge-modified biopolymer may have a net positive charge (i.e., is cationic) or a net negative charge (i.e., is anionic), when exposed to a solution. In certain embodiments, a cross-linked, charge-modified biopolymer) is a polyampholyte. In some embodiments, the cross-linked, charge-modified biopolymer may be a polyelectrolyte, which may be hydrophilic (e.g., due to the number of ionizable groups present on the modified biopolymer). In some embodiments, a cross-linked, charge-modified biopolymer may be a superabsorbent. In some embodiments, a cross-linked, charge-modified biopolymer of the present invention is charge-modified and/or cross-linked in an extruder. Some embodiments of the present invention may provide a cross-linked, charge-modified biopolymer in a one step extrusion process.

In some embodiments, a method of the present invention may provide a cross-linked, charge-modified biopolymer and/or charge-modified biopolymer having the charge modification substantially uniformly distributed throughout the bulk of the modified biopolymer. Thus, the cross-linked, charge-modified biopolymer and/or charge-modified biopolymer may have a substantially uniform charge density. In some embodiments, the uniformity of the charge density of a modified biopolymer of the present invention may be determined by evaluating the presence of insoluble materials after exposure of the modified biopolymer to a solvent, such as, for example water. Observation of particles (such as, for example, 1-10 μm particles) may indicate the lack of charge modification within the particles and/or modified biopolymer. In some embodiments, charge density distribution on a modified biopolymer may be determined and/or evaluated using one or more spectrographic analytical techniques such as, but not limited to, EDS, EPS, and/or TOF-SIMS of the charged moiety's counter ion. In some embodiments, an uneven distribution of counter ions and/or the presence of particles (e.g., 1-10 μm particles) lacking the counter ion indicates non-uniformity and/or inhomogeneity in regard to the distribution of the charge on the modified biopolymer.

In some embodiments, a cross-linked, charge-modified biopolymer and/or charge-modified biopolymer of the present invention may have an increased charge density and/or degree of cross-linking compared to a modified biopolymer (e.g., a cross-linked, charge-modified biopolymer) prepared using a conventional method and/or compared to a known coating. "Conventional method" as used herein in reference to a method for preparing a modified biopolymer refers to a method for preparing a modified biopolymer in which the biopolymer is a solid (e.g., a particulate) and a reaction of the biopolymer with at least one reactant in the method occurs at a solid interface of the biopolymer. In some embodiments, a conventional method may be a method that does not involve forming a homogeneous reaction blend and/or that does not involve a melt extrusion process, such as a reactive extrusion process. In some embodiments, a conventional method may be a semi-dry process, a multi-phase process, a process having a liquid interface with a solid material, and/or a heterogeneous process. In certain embodiments, a conventional method may be a heterogeneous wet chemistry method and/or a multi-phase process.

A modified biopolymer of the present invention may have a charge density and/or degree of cross-linking that is increased by at least about 5% or more compared to a modified biopolymer prepared using a conventional method and/or compared to a known coating. In some embodiments, the modified biopolymer may have a charge density and/or degree of cross-linking that is increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, or more compared to a modified biopolymer prepared using a conventional method and/or compared to a known coating. A modified biopolymer of the present invention may be prepared and/or formed in less time compared to the time to prepare and/or form a modified biopolymer using a conventional method. In some embodiments, the modified biopolymer may be prepared and/or formed in about 60 minutes or less, such as, e.g., 45, 30, 20, 10, 5, 4, 3, 2, 1 minutes or less compared to multiple hours, such as, e.g., in conventional, solution-based methods.

In some embodiments, the degree or amount of cross-linking present in a cross-linked, charge-modified biopolymer may provide mechanical rigidity to the modified biopolymer and/or correlate with the degree of mechanical rigidity in the modified biopolymer.

In some embodiments, a modified biopolymer of the present invention (e.g., a cross-linked, charge-modified biopolymer) may have a degree of substitution (DS) of about 0.01 or more, such as, for example, in a range of about 0.01 to about 0.3. For example, in some embodiments, the modified biopolymer may have a degree of substitution of about 0.01, 0.02, 0.03, 0.04, 0.05, 0.06, 0.07, 0.08, 0.09, 0.1, 0.15, 0.2, 0.25, 0.3, or more. In some embodiments, a modified biopolymer may have a degree of substitution in a range of about 0.09 to about 0.3 or about 0.1 to about 0.25. In some embodiments, the degree of substitution may be measured by nitrogen content and/or titration.

According to some embodiments, a coating of the present invention may comprise a chemically and/or physically modified biopolymer, such as, for example, a chemically and/or physically modified starch and/or hemicellulose. The chemically and/or physically modified biopolymer (e.g., chemically and/or physically modified starch) may be used as a coating to prepare a coated particle of the present invention.

In some embodiments, a modified biopolymer that is used to prepare a coated particle of the present invention may be prepared as described in U.S. Pat. No. 8,975,387 and/or U.S. application Ser. No. 14/728,240, the contents of each of which are incorporated herein by reference in their entirety.

In some embodiments, a method of preparing a modified biopolymer and/or coating of the present invention includes preparing a homogeneous reaction blend. A homogeneous reaction blend is a melted blend of all the components in a single phase. In some embodiments, a homogeneous reaction blend may be obtained using an extruder. In some embodiments, a homogeneous reaction blend may be obtained using a reactive extrusion process in an extruder. The homogeneous reaction blend may be in the form of a single liquid phase. A homogeneous reaction blend may provide a uniform distribution of the components or reactants as compared to a conventional method. In some embodiments, a method of the present invention may provide a chemical reaction that occurs more uniformly and/or completely due to the formation of a homogeneous reaction blend as compared to a conventional method. In some embodiments, the biopolymer in the homogeneous reaction blend may be a melted thermoplastic. A biopolymer may react thermo-mechanically and/or chemically with one or more reagents to form a modified biopolymer of the present invention, which may be thermoplastic and/or a viscoelastic material. In some embodiments, a method of the present invention removes hydrogen bonding and/or crystalline domains present in a biopolymer. This may allow for all or substantially all portions of the biopolymer to be available for chemical reaction, such as, for example, charge-modification and/or cross-linking.

In some embodiments, a homogeneous reaction blend may contain a plasticized biopolymer, which may allow for greater access to moieties throughout the biopolymer. In contrast, in a heterogeneous phase reaction (for example, in which modified biopolymers are synthesized by a coating process, in a diluted suspension, or with a concentrated gel solution) there is a limited amount of moieties (e.g., free hydroxyls) exposed to the reagent as the surface moieties are exposed to the reagent, but the interior moieties are not exposed. The reaction thus may be carried out on the surface of the solid granule, such as, for example, by direct conversion of either the semi-crystalline granules in aqueous suspension or as a dry process. In some embodiments, a biopolymer, in the presence of a plasticizer, may be plasticized in a homogeneous phase reaction to obtain thermoplastic behavior. Under the action of thermo-mechanical energy, the biopolymer granule will melt. The plasticizer may be adsorbed to the biopolymer by heating the mixture and destruction of the granule structure of the biopolymer may occur with the introduction of mechanical and heat energy. In the presence of a plasticizer, biopolymer granules may be transferred to a continuous phase and moieties (e.g., hydroxyl free groups) may be available to react with the reagent. In some embodiments, a homogeneous reaction blend may aid in distributing a modification (e.g. a charge-modification) along a biopolymer chain and/or more uniformly throughout a biopolymer in contrast to a conventional method, such as, for example, one in which the modification is only achieved at the surface (e.g. at the surface of a solid biopolymer granule).

In some embodiments, the coating of a coated particle of the present invention comprises a charge-modified biopolymer that is cross linked. The coating of a coated particle of the present invention may be covalently cross linked, which may "lock" the coating onto and/or around the core even though the modified biopolymer may not be chemically bonded onto the core. The coating may be cationic, anionic, or a polyampholyte. In some embodiments, the coating of a coated particle of the present invention comprises a cationic biopolymer. In some embodiments, the coating of a coated particle of the present invention comprises a covalently cross linked cationic hydrogel upon contact with an aqueous solution (e.g., in a solution having a salinity in a range of about 50 ppm to about 100,000 ppm and/or a hardness of about 1 ppm to about 150,000 ppm). According to some embodiments, the coating may comprise a charged-modified biopolymer, a cross linker and/or a catalyst.

According to further embodiments, described herein are methods of making and/or using coated particles (e.g., proppants) of the present invention. In some embodiments, a method of the present invention may provide a cross linked, charge-modified biopolymer (e.g., cross linked, cationic starch) in the form of a coating on a core, such as, e.g., sand. In some embodiments, a method of the present invention may be a solution based process and/or a melt based process. In some embodiments, a method of the present invention may comprise a reactive extrusion process and/or step, such as, e.g., as described in U.S. application Ser. No. 14/728,240, which is incorporated herein by reference in its entirety. A reactive extrusion process and/or step may be performed in line with a step and/or method of the present invention (e.g., a coating operation), which may allow for a continuous process for preparing a coated particle of the present invention, optionally with the coating comprising a cross-linked, charge-modified biopolymer that may be a super absorbent polymer. In some embodiments, a reactive extrusion step and/or process may allow for the use of an inexpensive biopolymer (e.g., a native biopolymer such as native starch and/or a starch flour such as corn flour) as the raw material. The reactive extrusion step and/or process may modify the raw material (e.g., covalently crosslink the biopolymer and may form a hydrogel coating) and may modify the raw material continuously in-line with a proppant coating step and/or process. In some embodiments, a method of the present invention provides a coated particle that is a self-suspending proppant that may perform in high salinity and/or high hardness conditions.

According to some embodiments, a method of the present invention may comprise providing a charge modified biopolymer (e.g., a cationic biopolymer). In some embodiments, a method of the present invention may comprise preparing the charge modified biopolymer. In some embodiments, a charge modified biopolymer may be produced by reacting a biopolymer (e.g., a native biopolymer), a charge modifying agent, catalyst, and/or a plasticizer, optionally in a reactive extrusion process (REX). A plasticizer may be used to facilitate the process. A cross linking agent may be added to and/or combined with the mixture comprising the native biopolymer and/or the modified biopolymer to produce a cross linked, charge modified biopolymer. The cross linked, charge modified biopolymer may form a coating on a core. In some embodiments, a native biopolymer (e.g., starch) may be fed into an extruder adding plasticizer, a cationic charge modifying agent, and/or a catalyst to produce a cationic charged biopolymer in the extruder. An in-line method may be used to produce charge modified biopolymer (e.g., cationic starch), which may be used to produce a melt coating.

In a method of the present invention, a cross linking agent may be added at one or more different times in the method. In some embodiments, a cross linking agent may be combined with a charge-modified biopolymer before, during, and/or after the charge-modified biopolymer is combined with a core. In some embodiments, a cross linking agent may be combined with a composition comprising a core (e.g., uncoated sand) prior to coating with the charge modified biopolymer. In some embodiments, a charge-modified biopolymer (e.g., a cationic starch), plasticizer and/or catalyst may be fed into an extruder and mixed to form an extrusion mixture, and a cross linking agent may be added into the extrusion mixture. Alternatively, or in addition, a cross linking agent may be combined with a composition comprising the core coated with the charge-modified biopolymer.

For example, in some embodiments, a method of the present invention comprises introducing (e.g., injecting and/or adding) a catalyst into an extruder prior to a charge modifier. The introduction (e.g., injection) of the catalyst may allow for the mixing and/or ionization of the biopolymer (e.g., starch) prior to charge modification. The crosslinker may be subsequently introduced following mixing of the at least partially ionized biopolymer with the charge modifier. An illustration of the reaction scheme can be seen in FIG. 9 where (1) refers to the catalyst, (2) refers to the charge modifier, and (3) refers to the crosslinker.

Figure 10:
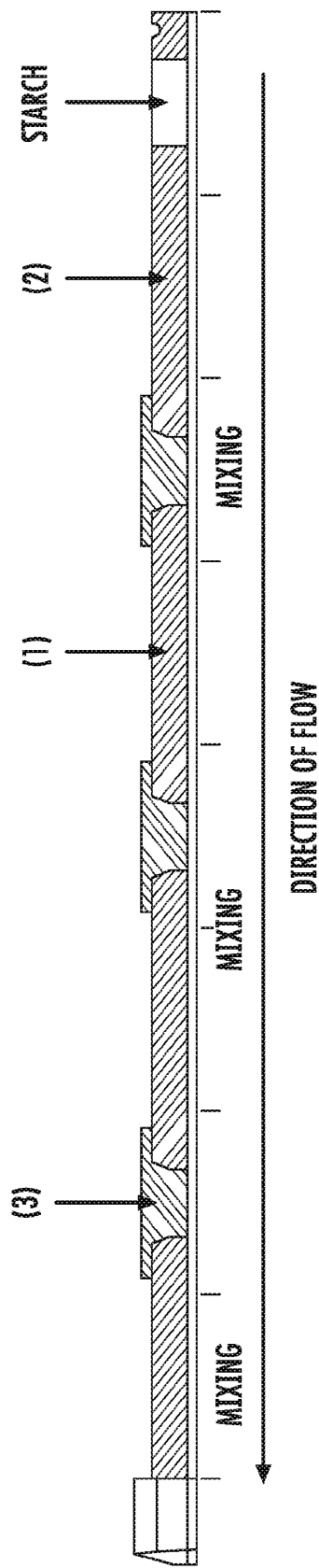
FIG. 10 is an illustration of a reaction scheme in an extruder in which a charge modifier is introduced into an extruder prior to a catalyst, where (1) refers to the catalyst, (2) refers to the charge modifier, and (3) refers to the crosslinker.

In some embodiments, a method of the present invention may comprise introducing a charge modifier into an extruder prior to a catalyst as can be seen in FIG. 10 where (1) refers to the catalyst, (2) refers to the charge modifier, and (3) refers to the crosslinker. In some embodiments, a method of the present invention may comprise combining (e.g., mixing) a catalyst and a charge modifier together prior to introducing them into an extruder as can be seen in FIG. 11 where (1) refers to the catalyst, (2) refers to the charge modifier, and (3) refers to the crosslinker. Combining the catalyst and charge modifier prior into introduction into the extruder may provide the benefit of possessing a greater residence time for charge modification within the extruder. In some embodiments, a method of the present invention may comprise introducing a crosslinker prior to a catalyst and a charge modifier.

Mixing, such as, e.g., mixing in an extruder, may be performed in a method of the present invention at one or more times during the method. In some embodiments, mixing may be performed following the introduction of a catalyst to assist in the ionization and/or gelatinization of the biopolymer. Mixing may be performed in a method of the present invention following a charge modifier and/or crosslinker to promote uniform distribution of the reagents on the biopolymer backbone.

Figure 9:
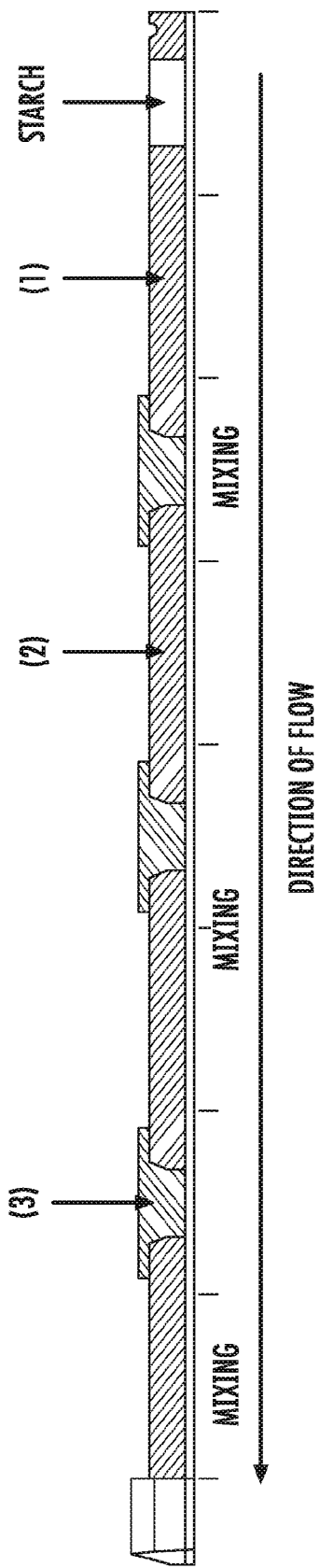
FIG. 9 is an illustration of a reaction scheme in an extruder in which a crosslinker is introduced following mixing of an ionized biopolymer and charge modifier, where (1) refers to the catalyst, (2) refers to the charge modifier, and (3) refers to the crosslinker.

The water content in a method of the present invention may be considered to be the total plasticizer content. For example, the amount of water present in a method and/or composition of the present invention may be the amount within points (1), (2), and (3) as shown in FIGS. 9-11. In some embodiments, the total water content in a method and/or composition of the present invention may be dictated by the minimum water content required for obtaining a melt flow, such as, for example, greater than about 75% by weight relative to a biopolymer (e.g., a charge modified biopolymer). The concentration of water at one or more steps and/or locations (e.g., injection points in an extruder) may be dictated by the pH of the catalyst solution. In some embodiments, the pH is sufficiently high to induce ionization of the biopolymer and to initiate charge modification downstream while low enough to prevent degradation of the biopolymer and low enough to prevent the initiation of side reactions of charge modifier.

A modified biopolymer (e.g., a charge modified biopolymer and/or cross linked, charge-modified biopolymer) may be applied to a core using a solution based coating process. Alternatively or in addition, a modified biopolymer may be applied to a core using a melt from a REX process. In some embodiments, a wetting agent may be added to the composition comprising the modified biopolymer and/or to the composition comprising the uncoated core. A wetting agent may improve the wetting of the core with the modified biopolymer (e.g., a hot extrudate comprising the modified biopolymer) and/or may produce a more uniform coating on the core. In some embodiments, the coating addition level may impact performance whereby increased coating level correlates to increased volumetric swelling. This correlation may hold true up until a coating level where shear stability is no longer present (e.g., the coating of the coated particle begins to fracture off after shearing). In application, there may be a financial and/or performance optimum coating level point where increases in coating content result in a diminished return on increased performance and cost.

The amount of water present in a composition comprising a modified biopolymer and/or core and/or used in a method of the present invention may be adjusted. In some embodiments, the amount of water included in a composition and/or used in a method of the present invention may be reduced and/or minimal compared to conventional coating compositions and/or methods. In some embodiments, the amount of water included in a composition may be greater than the amount of water included in a conventional extrusion method. In some embodiments, the amount of water used in a reactive extrusion method may be greater than the amount of water used in a traditional extrusion method, but less than a conventional coating method (e.g., a solution based coating method). The inventors discovered that by reducing and/or having the minimal amount of water needed to carry out the method, a drying step may be reduced and/or eliminated, which may improve the process economics and/or increase manufacturing process throughput. The inventors further discovered that, in some embodiments, the water level may be adjusted such that the resultant extrudate has a viscosity suitable for a coating process. The inventors further discovered that in some embodiments, the water level may be increased to improve coating uniformity. In some embodiments, the amount of water in a composition and/or used in a method of the present invention may be controlled through raw material feed rates via extrusion. In some embodiments, a viscosity for uniform coating of a core may be determined by measuring melt viscosity of the extrudate inline during extrusion and/or externally using a rheometer.

According to some embodiments, a method of the present invention may comprise applying a coating comprising a modified biopolymer to a core, wherein the modified biopolymer may not be cross linked or may be partially cross linked. In some embodiments, the coating may be applied to a core prior to the modified biopolymer being fully cross linked. The modified biopolymer may be applied to the core directly from an extruder. In some embodiments cross linking of the biopolymer may be completed and/or aided by performing a thermal treatment. The thermal treatment may drive off and/or remove water, such as, for example, water used to plasticize the extrusion mixture.

In some embodiments, prior to applying the coating to a core, a composition comprising a plurality of cores may be heated to a temperature above room temperature, such as, for example, a temperature in a range of about 50° C. to about 200° C. Heating the core prior to coating with the modified biopolymer may prevent premature cooling and/or may improve the uniformity of the coating on the core. In some embodiments, the core may be heated in the presence of a cross linking agent and then a composition comprising the modified biopolymer (e.g., a melt extrudate) may be applied onto the plurality of cores, to form a mixture of coated cores. The mixture of coated cores may be mixed in a mixer (e.g., an orbital mixer). In some embodiments, a cross linking agent may be contacted (e.g., sprayed) onto a plurality of cores at substantially the same time as a melt extrudate is added to the plurality of cores and/or a cross linking agent may be contacted onto the outside of the coated cores. Heating may aid in drying a coated particle and/or in curing the coating of the coated particle.

In some embodiments, a coated particle of the present invention may be "preswollen" during processing and/or a method of the present invention and may not require drying. In some embodiments, a preswollen coated particle may be prepared on site and pumped directly into a formation without drying and/or curing.

In some embodiments, after coating, the coated particles may be heated to a temperature above room temperature, such as, for example, a temperature in a range of about 25° C. to about 200° C. for a period of time, such as, for example, in a range of about 1 minute to about 3 hours. In some embodiments, the coated particles may be heated to a temperature of about 180° C. for about 10 minutes. Thermally treating the coated particles may aid and/or complete the cross linking process and/or the charge modifying process. Heating the coated particles may cure the coating and/or dry the coated particles. In some embodiments, a thermal post-treatment may reduce the amount of residual solvents and/or plasticizers present in the coating and/or coated particle. In some embodiments, a coated particle may be agitated and/or shaken during heating, which may prevent caking and/or agglomeration and/or improve heating efficiency (e.g. through treatment via fluidized bed drying or curing).

Figure 8:
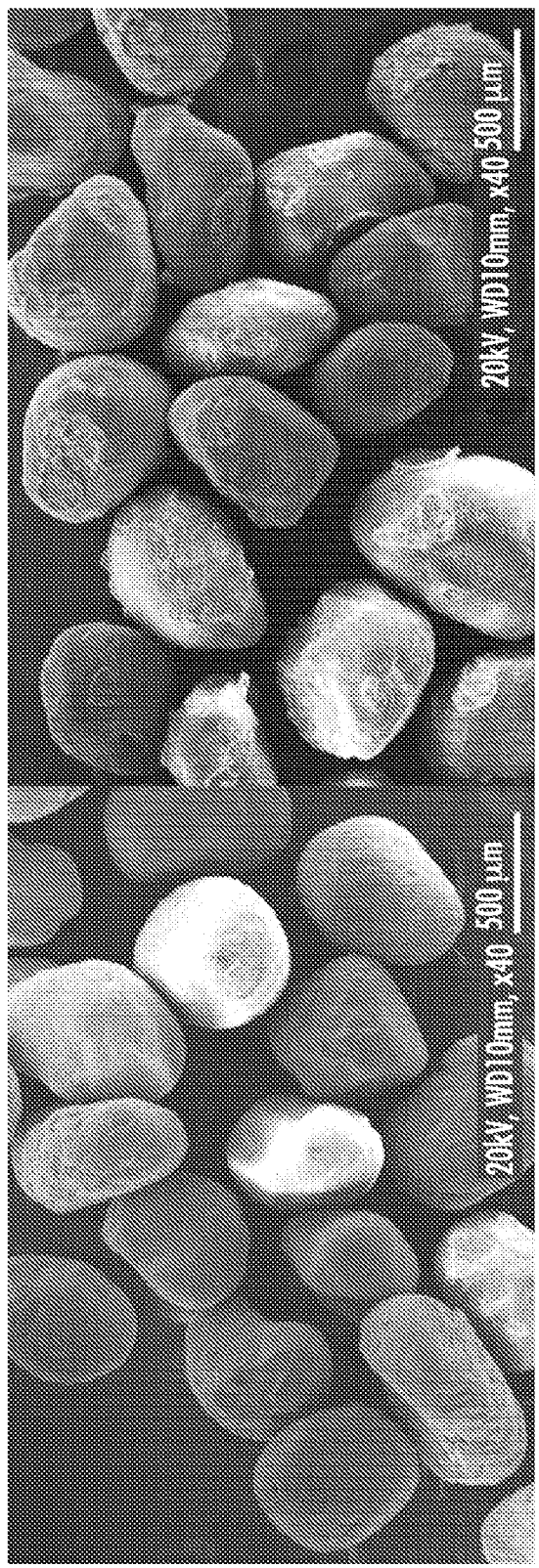
FIG. 8 is a comparison of SEM micrographs showing relative coating uniformity of a coated particle (right) compared to that of uncoated sand (left).

After coating and/or a thermal treatment, the coated particles may be allowed to cool. Agglomerates may be broken up, such as, for example, by agitation, grinding, and/or sifting (e.g., sifting through a sieve), which may provide a mixture of coated particles having a substantially uniform particle size. In some embodiments, the thermal treatment method may maintain a plurality of separate and/or discrete particles during curing such that subsequent size reduction and/or sizing may be minimized and/or eliminated. In some embodiments, the particle size of a plurality of coated particles varies by about 20% or less (e.g., 15%, 10%, 5% or less) (FIG. 8).

A method of the present invention may be referred to as a solution coating method (e.g., a static coating method or a dynamic coating method) or may be referred to as an extrusion coating method (e.g., a melt flow coating method). Example process parameters for these methods may be as provided in Table 1.

TABLE 1

Example processing ranges for Static, Dynamic, and Melt Flow Coating Methods

| Parameter | Static Coating | Dynamic Coating | Melt Flow |
|---|---|---|---|
| Total plasticizer (water) content range relative to biopolymer (e.g., starch) (wt. %) | 500-1500; optionally 750-1000 | 2000-8000; optionally 4000-5000 | 75-300; optionally 100-225 |
| Total catalyst content range relative to biopolymer (e.g., starch) (wt. %) | 0.5-15; optionally 1-5 | 0.5-15; optionally 1-5 | 0.5-15; optionally 1-5 |

TABLE 1-continued

Example processing ranges for Static, Dynamic, and Melt Flow Coating Methods

| Parameter | Static Coating | Dynamic Coating | Melt Flow |
|---|---|---|---|
| Total cross linker content range relative to biopolymer (e.g., starch) (wt. %) | 0.2-10; optionally 0.25-2 | 0.1-10; optionally 0.25-2 | 0.1-10; optionally 0.25-2 |
| Total charged modified biopolymer (e.g., starch) content range relative to sand (wt. %) | 1-15; optionally 3-8 | 1-15; optionally 3-8 | 1-15; optionally 3-8 |
| Applicable DS range of charge modified biopolymer (e.g., starch) | 0.05-0.80; optionally 0.05-0.25 | 0.05-0.80; optionally 0.05-0.25 | 0.05-0.80; optionally 0.05-0.25 |
| Reagent Mixing Temperature Range (° C.) | Room temp. (RT)-160; optionally 50-100 | RT-160; optionally 60-100 | 60-160; optionally 80-120 |
| Reagent Mixing Time Range (min) | 0.5-30; optionally 1-5 | 0.5-60; optionally 15-30 | 0.1-3; optionally 0.1-1.5 |
| Cross linker Thermal Treatment/Activation Temperature Range (° C.) | 15-180; optionally 45-120 | 15-180; optionally 45-120 | 15-180; optionally 45-120 |
| Cross linker Thermal Treatment/Activation Time Range (min) | 0-150; optionally 1-30 | 0-150; optionally 1-30 | 0-150; optionally 1-30 |
| Extrusion Processing RPM range | N/A | N/A | 50-1250; optionally 250-750 |

In a melt flow coating method of the present invention, a charge modified biopolymer may be charge-modified prior to extrusion or during extrusion. Example process parameters for these methods may be as provided in Table 2.

TABLE 2

Melt Flow Coating Method Processing Comparison for Charged Modified Biopolymer Precursor vs. Extrusion Charge Modification.

| Parameter | Melt with charged modified biopolymer precursor | Melt with charge modification during extrusion |
|---|---|---|
| Total plasticizer (water) content range relative to biopolymer (e.g., starch) (wt. %) | 75-500; optionally 75-150 | 75-500; optionally 100-250 |
| Total catalyst content range relative to biopolymer (e.g., starch) (wt. %) | 0.5-50; optionally 1-5 | 0.5-50; optionally 5-20 |
| Total charge modifier content range relative to biopolymer (e.g., starch) (wt. %) | N/A | 1-75; optionally 5-56 |
| Total cross linker content range relative to charge modified biopolymer (e.g., starch) (wt. %) | 0.1-10; optionally 0.25-2 | 0.1-10; optionally 0.25-2 |
| Total charged modified biopolymer (e.g., starch) content range relative to uncoated cores (e.g., sand) (wt. %) | 1-15; optionally 3-8 | 1-15; optionally 3-8 |
| Applicable DS range of charge modified biopolymer (e.g., starch) | 0.05-0.80; optionally 0.05-0.25 | 0.05-0.80; optionally 0.05-0.25 |
| Reagent Mixing Temperature Range (° C.) | 60-160; optionally 80-120 | 60-160; optionally 80-120 |
| Reagent Mixing Time Range (min) | 0.1-3; optionally 0.75 0.1-1.5 | 0.1-3; optionally 0.1-1.5 |
| Cross linker Thermal Treatment/Activation Temperature Range (° C.) | 15-180; optionally 45-120 | 15-180; optionally 45-120 |
| Cross linker Thermal Treatment/Activation Time Range (min) | 0-150; optionally 1-30 | 0-150; optionally 1-30 |
| Extrusion Processing RPM range | 50-1250; optionally 250-750 | 50-1250; optionally 250-750 |

In some embodiments, a coated particle of the present invention may be prepared using a melt flow coating method. A melt flow coating method may comprise adding a biopolymer (e.g., starch or corn flour) into an extruder and adding a catalyst into the extruder. In some embodiments, the biopolymer is a charge modified biopolymer (e.g., cationic starch). The catalyst may be added to the extruder and/or present in a composition of the present invention in an amount of about 0.5%, 1%, 2%, 3%, 4%, 5%, 6%, 7%, 8%, 9%, 10%, 11%, 12%, 13%, 14%, 15%, 16%, 17%, 18%, 19%, 20%, 21% 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% by weight relative to the biopolymer. In some embodiments, the biopolymer may be charged modified during a method of the present invention, and the method may comprise adding a charge modifying agent to the biopolymer and/or catalyst. A charge modifying agent may be added to the extruder and/or present in a composition of the present invention in an amount of about 1%, 5%, 10%, 15%, 20%, 25%, 30%, 35%, 40%, 45%, 50%, 55%, 60%, 65%, 70%, or 75% by weight relative to the biopolymer. A plasticizer may be used in a method of the present invention and/or present in a composition of the present invention. In some embodiments, a plasticizer is present at one or more steps in a method of the present invention. For example, a plasticizer may be added before, during, and/or after a biopolymer, catalyst and/or charge-modifying agent is/are added to an extruder. In some embodiments, the total amount of plasticizer used in a method of the present invention and/or present in a composition of the present invention may be about 75%, 100%, 125%, 150%, 175%, 200%, 225%, 250%, 275%, 300%, 325%, 350%, 375%, 400%, 425%, 450%, 475%, or 500% by weight relative to the biopolymer.

In some embodiments, a method of the present invention may comprise adding a cross linking agent to a composition comprising a charge-modified biopolymer. The composition may be in the form of a melt extrudate. The charge-modified biopolymer may have a degree of substitution in a range of about 0.05, 0.1, 0.15, 0.2, 0.25, 0.3, 0.35, 0.4, 0.45, 0.5, 0.55, 0.6, 0.65, 0.7, 0.75, or 0.8. In some embodiments, the cross linking agent is added to the composition comprising the charge-modified biopolymer prior to, during and/or after contacting the composition comprising the charge-modified biopolymer to a core. The charge-modifying agent may be present in an amount of about 0.1%, 0.5%, 1%, 2%, 3%, 4%, 5%, 6%, 7%, 8%, 9%, or 10% by weight relative to the biopolymer.

The composition comprising the charge-modified biopolymer and optionally a crosslinking agent may be contacted to (e.g., combined, mixed, etc.) a plurality of cores, with the composition being in an amount of about 1%, 2%, 3%, 4%, 5%, 6%, 7%, 8%, 9%, 10%, 11%, 12%, 13%, 14%, or 15% by weight relative to the uncoated cores. In some embodiments, the composition is a melt extrudate. One or more steps in a method of the present invention may each be carried out at a temperature of about 60, 65, 70, 75, 80, 85, 90, 95, 100, 125, 150, or 160° C. In some embodiments, one or more steps in a method of the present invention may each be carried out with a mixing time of about 0.1, 0.2, 0.3, 0.4, 0.5, 0.6, 0.7, 0.8, 0.9, 1, 1.5, 2, 2.5, or 3 minutes. In some embodiments, one or more steps in a method of the present invention may each be carried out in an extruder with a rpm of about 50, 100, 150, 200, 250, 300, 350, 400, 450, 500, 550, 600, 650, 700, 750, 800, 850, 900, 950, 1000, 1050, 1100, 1150, 1200, or 1250. In some embodiments, a step of combining (e.g., mixing) one or more components in an extruder may be carried out at a temperature in a range of about 60° C. to about 160° C. for about 0.1 to about 3 minutes with a rpm of about 50 to about 1250.

In some embodiments, a linker molecule may be present in a coated particle of the present invention. The linker molecule may be added to and/or mixed with a core prior to and/or during mixing of the core with a modified biopolymer. A linker molecule may be bound to reactive moieties on a surface of the core and to residual, unreacted functional groups (e.g., —OH groups) on the charge modified biopolymer to form a chemical bond between the core and modified biopolymer. In some embodiments, a linker molecule may improve the adhesion of the coating to the surface of the core, which may result in increased shear stability of the coated particle compared to a coated particle without a linker molecule.

In some embodiments, one or more binding agents and/or performance enhancing agents may be present in a coated particle of the present invention. A binding agent and/or performance enhancing agent may be added to and/or mixed with a core prior to and/or during mixing of the core with a modified biopolymer. In some embodiments, an organosilane may be present in a coated particle and may be used to promote chemical adhesion between the coating and a core (e.g., a sand substrate). An organosilane may be mixed with water and/or an acid in order to undergo hydrolysis prior to and/or during mixing with a core and then may be heat treated. The organosilane may then undergo condensation to form a linkage with the core and biopolymer (e.g., modified biopolymer). This condensation reaction may be expedited by residual catalyst from the biopolymer and/or by addition of a slightly basic solution. Additional thermal treatment after mixing of the organosilane, core, and biopolymer may aid in the efficiency of the linkage. Without chemical bonding, delamination may be more likely to occur under high shear conditions, surface stress conditions, etc. Improved adhesion may not directly yield a response in settled bed height; however, it may yield a response in shear stability in some cases.

Examples of organosilanes include, but are not limited to, glycidoxypropyltrimethoxysilane, chloropropyltrimethoxysilane, chloropropyltriethoxysilane, and/or methacryloxypropyltrimethoxysilane. In some embodiments, glycidoxypropyltrimethoxysilanes may be used due to the presence of an epoxy organic reactivity group which parallels the functionality of certain cross linking agents, such as, for example poly(ethylene glycol) diglycidyl ethers.

In some embodiments, a surfactant may be added to a composition comprising a biopolymer and/or modified biopolymer prior to, during, and/or after extrusion. A surfactant may be used to improve the mixing of a composition and/or wetting of a melt extrudate on uncoated cores. Thus, a surfactant may improve polymer distribution on a core and/or improve coating uniformity. Other methods of improving uniformity may include reducing melt viscosity and/or increasing shear during mixing. Coating uniformity may be qualitatively shown though SEM analysis. In some embodiments, a hydrophobic surfactant may be used and may increase the rate at with the coating swells when exposed to a solution.

The rate at which a coated particle (e.g., proppant) swells within solution is a parameter that affects operational efficiency. In some embodiments, it may be desirable to have the coated particle reach close to full/maximum swelling in about 12 minutes or less (e.g., about 1, 2, 3, 4, 5, 6, 7, 8, 9, 10, 11, or 12 minutes). A surfactant may be applied to the surface of a coated particle to reduce surface tension amongst particles and/or improve gel bed permeability, which may result in faster swelling rates. Examples of surfactants that may be included include, but are not limited to, siloxanes and silicones such as poly(dimethylsiloxane), functional silanes such as octodecyltrichlorosilane, and/or fatty acids such as lauric acid. In some embodiments, a silane based coupling agents may be used due to their relatively low cost and their ability to form weak links with the biopolymer coating. While not wishing to be bound to any particular theory, it is believed that these weak links enable a solution to fully penetrate into the bed of coated particles and subsequently penetrate into the coating itself (i.e., allow for swelling of the coating).

In some embodiments, a viscosifying agent may be added to a composition and/or used in a method of the present invention. A viscosifying agent may be used in conjunction with a coated particle of the present invention in order to affect settling rate of the coated particle after agitation. Example viscosifying agents include, but are not limited to, guar, carboxymethyl cellulose, charge modified starch, and any combination thereof. A viscosifying agent may be added directly onto a coated particle of the present invention, may be included in an extrudate comprising a biopolymer, and/or may be mixed with a composition comprising the coated particles. In some embodiments, a viscosifying agent may be added to a composition comprising the biopolymer and/or modified biopolymer prior to, during, and/or after extrusion.

Other additives and/or excipients may be added to and/or present in a coated particle and/or composition of the present invention, and/or used in a method of the present invention. For example, charged entities (e.g., anionic and/or amphoteric compounds), anti-clumping agents, and/or anti-caking agents.

The present invention is explained in greater detail in the following non-limiting Examples.

EXAMPLES

Example 1: Extrusion of a Modified Biopolymer Hydrogel and/or SAP

Descriptions below demonstrate methods for preparing modified biopolymers with water swelling properties (biopolymer hydrogels). Descriptions include examples of chemistries and processes that may be utilized to prepare water swelling materials and/or superabsorbent polymer (SAP) materials with a broad variety of swelling properties. Notably, these properties are preserved in hardness conditions, a challenging condition for conventional hydrogel materials. Material properties and process parameters may further be adjusted to allow for inline coating of various substrates, including but not limited to proppant materials. Furthermore, descriptions include further modifications to modified biopolymer coatings for improved use in oil and gas operations. These modifications include improved coating uniformity, polymer-sand adhesion, gel bed permeability, supernatant viscosity, coating breakability, coating biodegradability, and particle flowability.

Here reactive extrusion (REX) was used to produce modified biopolymer hydrogels. REX allows for what are traditionally multiple processes to be combined into a single process step while maintaining very high production throughputs. In a process of the present invention, a charge modifier may be reacted with a biopolymer in the initial zone(s) of an extruder and followed by a cross linking reaction in later zone(s) of the extruder and/or in subsequent mixing steps. Additional reaction and/or physical modification steps may be included along the length of the extruder, such as removal of volatile compounds via vacuum, addition of water for reduced viscosity, size reduction at the output of the extruder, and more. Examples of processes of the present invention are provided below.

Example 1A—Hydrogels from Modification of Commercially-Sourced Anionic Starch Beginning with a commercially-sourced, anionic starch (Chemstar Stardril®, Minneapolis, Minn.), REX may be used to induce a cross linking (XL) reaction so that the output material is a hydrogel and/or SAP. Poly(ethyleneglycol)diglycidylether (PEGDE, Sigma Aldrich: 475696, St. Louis, Mo.) may be used as cross linker, and sodium hydroxide (NaOH, GFS Chemicals: #630, Powell, Ohio) may be used as catalyst to induce cross linking with the anionic starch in the presence of plasticizer (DI water). Here an 11 mm, parallel twin screw extruder (P11 Twin screw extruder, ThermoFisher Scientific, Tewksbury, Mass.), is used to combine reagents and produce materials for characterization as described below. Extrusion composition and process parameters are given in Table 3, and the extruder configuration is shown in FIG. 4.

TABLE 3

Extrusion composition and process parameters for producing an anionic SAP by reacting a commercially-sourced anionic starch, sodium hydroxide (NaOH), water (H$_2$O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | NaOH | N/A | N/A | Cross Linker | N/A | N/A | N/A | N/A |
| Mat. | Anionic Starch | NaOH/H2O | N/A | N/A | PEGDE | N/A | N/A | N/A | N/A |
| Conc. | N/A | 5% | N/A | N/A | 6% | N/A | N/A | N/A | N/A |
| Equipment | Dry Feeder | Pump 1 | N/A | N/A | Pump 2 | N/A | N/A | N/A | N/A |
| Feed Rate (g/min) | 24 | 8 | N/A | N/A | 2.5 | N/A | N/A | N/A | N/A |
| Temp. (° C.) | N/A | 70 | 70 | 80 | 100 | 100 | 100 | 100 | 100 |
| Screw RPM | 200 | — | — | — | — | — | — | — | — |

Following extrusion, materials were heat sealed into polyester mesh, then submerged in DI water to remove residual salts and/or unreacted reagents. Water is replaced every 8-16 hours until the pH of solution reaches neutrality (pH=6-8). Materials were then removed from mesh and dried in a forced air oven at 55° C. for around 48 hours or until moisture content reached <10%. Swelling performance was measured via INDA method 440.0-96 for free swell capacity of a super absorbent polymer. Test solutions were modified to include high saline contents (10% NaCl) and hard water conditions ($CaCl_2$) as shown in Table 7.

Example 1B—Hydrogels from Cross Linking and Anionic Modification of Native Starch Beginning with native starch (Cargill Pearl B Corn Starch, Wayzata, Minn.), REX was used to induce anionic charge grafting to the starch, followed by cross linking so that the output material is a hydrogel and/or SAP. Here, sodium chloroacetate (SCA, Sigma Aldrich: 291773, St. Louis, Mo.) was used as an anionic charge modifying agent. Extrusion composition and process parameters are given in Table 4. Screw configuration is shown in FIG. 4, and post processing and testing follows that described in Example 1A. Swelling performance is provided in Table 7, below.

TABLE 4

Extrusion composition and process parameters for producing an anionic SAP by reacting native starch, sodium chloroacetate (SCA), sodium hydroxide (NaOH), water (H2O), and poly(ethyleneglycol)diglycidylether (PEGDE). Corn starch and SCA were mixed in the dry form and subsequently fed in Zone 1.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | NaOH | N/A | N/A | Cross Linker | N/A | N/A | N/A | N/A |
| Mat. | Native Starch + SCA | NaOH/ H2O | N/A | N/A | PEGDE | N/A | N/A | N/A | N/A |
| Conc. | 72% | 40% | N/A | N/A | 6% | N/A | N/A | N/A | N/A |
| Equipment | Dry Feeder | Pump 1 | N/A | N/A | Pump 2 | N/A | N/A | N/A | N/A |
| Feed Rate (g/min) | 24 | 7.5 | N/A | N/A | 3.3 | N/A | N/A | N/A | N/A |
| Temp. (° C.) | N/A | 70 | 70 | 80 | 80 | 80 | 80 | 80 | 80 |
| Screw RPM | 250 | — | — | — | — | — | — | — | — |

Example 1C—Hydrogels from Modification of Commercially-Sourced Cationic Starch

Beginning with a commercially sourced, cationic starch (Aquasol 330, Rock Hill, S.C.), NaOH, PEGDE, and Glycerol (GFS Chemicals, Item #721, Powell, Ohio) were combined via REX so that the output material is an SAP. Extrusion composition and process parameters are given in Table 5. Screw configuration is shown in FIG. 5 and testing follows that described in Example 1A. Post processing is equivalent to that in Example 1A with an additional thermal treatment of 90 minutes at 120° C. prior to purification (prior to being exposed to water) for curing and drying. Swelling performance is provided in Table 7.

TABLE 5

Extrusion composition and process parameters for producing a cationic SAP by reacting a commercially-sourced cationic starch, sodium hydroxide (NaOH), water (H2O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Plasticizer | N/A | N/A | N/A | N/A | N/A | N/A | N/A |
| Mat. | Cationic Starch + NaOH | Glycerol | N/A | N/A | N/A | N/A | N/A | N/A | N/A |
| Conc. | 92.5 wt % Cationic Starch | N/A | N/A | N/A | N/A | N/A | N/A | N/A | N/A |
| Equipment | Dry Feeder | Pump 1 | N/A | N/A | N/A | N/A | N/A | N/A | N/A |
| Feed Rate (g/min) | 18.8 | 6.3 | N/A | N/A | N/A | N/A | N/A | N/A | N/A |

TABLE 5-continued

Extrusion composition and process parameters for producing a cationic SAP by reacting a commercially-sourced cationic starch, sodium hydroxide (NaOH), water (H2O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Temp. (° C.) | N/A | 70 | 75 | 80 | 100 | 100 | 100 | 100 | 100 |
| Screw RPM | 200 | — | — | — | — | — | — | — | — |

Example 1D—Hydrogels from Cross Linking and Cationic Modification of Native Starch Beginning with native starch, REX was used to induce cationic charge grafting to the starch, followed by cross linking so that the output material is a hydrogel and/or SAP. Here, 3-chloro-2-hydroxypropyltrimethylammonium chloride (Quab 188, Sigma Aldrich: 348287, St. Louis, Mo.) was used as a cationic charge modifying agent. Extrusion composition and process parameters are given in Table 6. Screw configuration is provided in FIG. 6, and post processing and testing follows that described in Example 1A. Swelling performance is provided in Table 7.

TABLE 6

Extrusion composition and process parameters for producing a cationic SAP by reacting native starch, (3-chloro-2-hydroxypropyl)trimethylammonium chloride (Quab 188), sodium hydroxide (NaOH), water (H2O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | XL | N/A | N/A |
| Mat. | Native Starch | NaOH/ H2O | N/A | Quab 188/ H2O | N/A | N/A | PEGDE/ H2O | N/A | N/A |
| Conc. | — | 5.89 wt. % | N/A | 60 wt. % purity | N/A | N/A | 1 wt. % | N/A | N/A |
| Equipment | Dry Feeder | Pump 1 | N/A | Pump 2 | N/A | N/A | Pump 3 | N/A | N/A |
| Feed Rate (g/min) | 15.0 | 26.0 | N/A | 5.74 | N/A | N/A | 7.5 | N/A | N/A |
| Temperature (° C.) | — | 70 | 70 | 80 | 95 | 110 | 120 | 120 | 120 |
| Screw RPM | 500 | — | — | — | — | — | — | — | — |

Test Metrics/Data:

Free Swelling Capacity (FS) data for Examples 1A-1D is shown in Table 7. Swelling performance data is shown in various solutions relevant to a range of applications. DI water corresponds to pure water (ideal conditions for conventional hydrogel materials), 0.9% NaCl corresponds to biological solutions, and 10% $CaCl_2$ corresponds to extreme hardness conditions. Hardness conditions are of particular interest as they relate to oil & gas (e.g. hydraulic fracturing) operations. Additional test metrics for SAP (i.e. CRC, AUL, permeability, etc.) may be conducted but are not included here.

TABLE 7

Swelling performance of samples prepared according to Examples 1A-1D in various solution conditions.

| Example # | Starch Type | FS (g/g) in DI Water | FS (g/g) in 0.9% NaCl | FS (g/g) in 10% $CaCl_2$ |
|---|---|---|---|---|
| 1A | Commercially Sourced Anionic | 154.7 | 38.1 | 6.1 |
| 1B | Native → Anionic | 43.0 | 24.2 | 7.0 |
| 1C | Commercially Sourced Cationic | 49.9 | 23.8 | 18.2 |
| 1D | Native → Cationic | 110.1 | 20.8 | 19.7 |

These experiments demonstrate that a REX process may be used to produce biopolymer hydrogels or SAP. Unlike conventional hydrogel and SAP materials, where swelling behavior in 0.9% NaCl is preferred, these examples, in addition to modifications and combinations thereof show a range of materials properties may be achieved, leading to a broad range of applications. Notable applications include those where multivalent cations (including hardness) are present as shown in Examples 1C and 1D.

Without wishing to be bound to any particular theory, while anionic charged materials typically show reduced performance in divalent solutions ($CaCl_2$), the additional features of a starch backbone (glucose repeat units, presence of hydroxyl groups, etc.) are believed to contribute to a performance that is greater than that of their commercial counterparts (i.e., commercial anionic SAP materials) in divalent solutions.

It is noted that the cost of commercially-available charged starch materials may be prohibitive for many applications. However, Tethex modified SAPs formed using a REX process were prepared in-line with existing extrusion processes (Examples 1B, and 1D), and native starch is a significantly more economical raw material.

As an alternative to REX, other processes such as batch solution processes may be utilized. Although these processes may prove economical at very large economies of scale, they also may utilize large amounts of water and/or solvent (~1000's of % or more relative to polymer), and typically have relatively long reaction/residence times (~hours or more). In contrast, comparative processes for reactive extrusion of biopolymers can utilize as low as ~20% water or solvent and have residence times as low as a few seconds. Furthermore, the scalability and relative low profile of extrusion allows for distributed manufacturing.

Example 2: Methods of Coating Proppant Using Modified Biopolymer Hydrogels and/or SAP The materials described in the example above may be used in a variety of form factors, i.e. as powders, coatings, films, fibers, sheets, etc. and combined with a variety of substrates. Example 2 describes techniques for coating these hydrogel materials on to sand or proppant materials.

Example 2A—Using a Static Method and Modified Biopolymer to Coat Proppants (Cationic Charge)

Commercial cationic starch, water as solvent, NaOH as catalyst, and PEGDE as cross linker were mixed into a slurry/paste and used to coat sand via what may be described as a static coating method. Ingredients were dissolved/suspended into solution at varying concentrations at % solids content (~10+%). Here, polymer, reagents, catalyst, and sand were mixed in a petri dish at desired proportions. In this method, solids contents are maximized to reduce water usage but are limited by starch solubility in solution and viscosity of solution.

In some embodiments, the reagent and catalyst were combined in solution. In other embodiments, separate solutions of one or both components were made and added separately. When all components were combined in the petri dish, the sample is placed in a forced air oven at desired times and temperatures to initiate reactions and dry the material prior to grinding. Resulting material was ground in a mortar and pestle to separate sand particles prior to testing.

The process disperses sand in the slurry at a controlled sand/polymer ratio. Although this demonstrates application of a swelling material on sand substrate, the method inherently yields a non-uniform coating and can generate unbound polymer, relative to methods below. However, this method yields an ability to characterize relative performance and broad trends in a polymer system, quickly. Similar systems to above (i.e. starting from native starch, utilizing anionic systems, alternative cross linkers, wetting agents, etc.) are also feasible via this static coating method.

Here, two solutions were used to coat sand via the static coating method. The first solution (Solution 1) contained polymer and catalyst dissolved into water, whereas the second solution (Solution 2) contained cross linker dissolved into water. Compositions for solutions are shown in Table 8.

TABLE 8

Static coating method components and concentrations used in Example 2A.

| Solution | Component 1 (conc.) | Component 2 (conc.) | Component 3 (conc.) |
|---|---|---|---|
| 1 | H2O (90 wt. %) | Cationic Starch (9 wt. %) | NaOH (1 wt. %) |
| 2 | H2O (99.5 wt. %) | PEGDE (0.5 wt. %) | N/A |

To prepare the coated sand in the static coating method, 5 grams of uncoated sand were added to a petri dish to which 1 g of the cross linker solution was added. The mixture was stirred using a spatula and followed with 4 g of the starch/catalyst solution with additional stirring. The mixture was then placed in a forced air oven (Sheldon Manufacturing Inc., Model SMO5, Cornelius, Oreg.) at 120° C. for 60 minutes, to initiate reaction and simultaneously dry the material. The sample was then removed from the oven, allowed to cool to room temperature, then scraped from the petri dish using a metal spatula.

As a surrogate for swelling, coated proppant materials may by tested for volumetric swelling via a version of a settled bed height test, where 1 g of material was placed in a 15 ml round glass vial with an outer diameter of 20.5 mm. 15 ml of test solution was added to the vial and followed with vigorous shaking for 5 seconds. After 1 hour, the bed height of the swollen sand was measured using digital calipers. Any visible gel layer (translucent layer) was considered free polymer and not counted in the following measurements. This initial measurement is termed "pre shear height". Following measurement, the vial was then shaken vigorously for an additional 5 seconds and allowed to settle for 15 minutes to demonstrate shearing conditions. A second measurement is taken and termed "post shear height". The measurements were used to calculate a percent (%) increase in height over that of 1 g of an uncoated sand material (~4 mm). Initially relevant solutions are: 0.9% NaCl, 10% NaCl, 0.9% $CaCl_2$, 10% $CaCl_2$. Performance for samples coated via the static coating method are shown in Table 13.

Example 2B—Using a Static Method and Modified Biopolymer to Coat Proppants (Anionic Charge)

While Example 2B focuses on the utilization of a cationic hydrogels for proppant coating, the example below demonstrates the variety of modified biopolymers that may be utilized as coatings. Feasibility of using anionic starch to create a hydrogel and/or SAP is demonstrated in the example below. Materials utilized follow those in Example 1. Material preparation and coating methods follow static coating methods described in Example 2A. Compositions and components are shown in Table 9. Performance for samples described here are shown in Table 13, below.

TABLE 9

Static coating method components and concentrations used in Example 2B.

| Solution | Component 1 (conc.) | Component 2 (conc.) | Component 3 (conc.) |
|---|---|---|---|
| 1 | H2O (90 wt. %) | Anionic Starch (9 wt. %) | NaOH (1 wt. %) |
| 2 | H2O (99.5 wt. %) | PEGDE (0.5 wt. %) | N/A |

Performance for samples coated via the melt coating method are shown in Table 13. Due to the reduced performance of anionic SAP coatings in comparison to cationic SAP coatings in divalent solutions, previous examples were focused on cationic starches, but the same methods could be extended for the anionic counterpart.

Example 2C—Using a Dynamic Method and Cationic-Modified Biopolymer to Coat Proppants Alternative methods may be used to demonstrate coating. Here, commercial cationic starch and cross linker may be dissolved in solution and used to coat sand via what may be termed a dynamic coating method. In this method, a dilute solution of polymer, reagent, and catalyst is formed to create a low viscosity solution. In this work, the polymer is dissolved into water at reduced solids content (~10% or less) to allow for a less viscous slurry and for sand grains to remain separated. Substrates are dipped, suspended, and/or otherwise submerged in solution. Following exposure to solution, materials are exposed to a forced air curing and drying step. A particle sizing and separation step may also be included as described in examples, above.

In this method, water usage may be high relative to that of static coating methods, which may result in longer drying times and reduced coating efficiency/yields. However, the low viscosity of the solution can allow sand grains to remain separated during subsequent drying steps, resulting in reduced amounts of unbound polymer and improved coating uniformity. Compositions and components are shown in Table 10.

TABLE 10

Example of compositions for solutions and components for a dynamic coating method

| Solution | Component 1 (conc.) | Component 2 (conc.) | Component 3 (conc.) |
|---|---|---|---|
| 1 | H2O (90.8 wt. %) | Anionic Starch (9.1 wt. %) | NaOH (0.09 wt. %) |
| 2 | H2O (99.9 wt. %) | PEGDE (0.1 wt. %) | N/A |

Here, a 25 ml cross linker solution was made according to parameters in described in Table 10, above. While the solution was stirring, 8 g of sand was suspended into the solution and allowed to stir for 2 minutes. 6.4 g of the polymer/catalyst solution was then added and allowed to stir for an additional 2 minutes. The temperature of the solution was then heated to 60° C. and allowed to mix in an open container for 40 minutes.

Contents of the beaker were then distributed onto a glass petri dish, dried, crushed, and tested according to methods described in Examples 2A and 2B. Performance for samples coated via the dynamic coating method are shown in Table 13.

Example 2D—Using a Polymer Melt Method and Cationic-Modified Biopolymer to Coat Proppants A unique method for coating substrates includes submitting a commercial cationic starch and cross linker to REX where the extrudate is immediately used for coating. This method may be termed a melt coating method. Here, a viscous melt containing all necessary reagents is extruded into a planetary mixer containing heated sand. Through control of extrusion parameters, the melt method may allow for improved process control which may provide more precise manipulations of polymer:reagent:catalyst:sand ratios.

This method may be directly translatable to a continuous, large-scale process where REX may be utilized in line with existing proppant processing equipment. The continuous nature of this process, also for more uniform and shear stable materials compared to that of alternative methods, including static and dynamic coating methods, described above. Additionally, water and solvent requirements are drastically reduced (≥~50% solids) resulting in improved efficiency, and reduced raw materials and capital costs. An example of a melt coating process is described below. Compositions and process configurations used for Example 2D are given in Tables 11 & 12 and the extruder configuration is shown in FIG. 7.

TABLE 11

Extrusion composition and process parameters for producing a cationic proppant coating by reacting a commercially-sourced cationic starch, sodium hydroxide (NaOH), water (H2O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | N/A | N/A | N/A | N/A | N/A | N/A |
| Mat. | Cationic Starch | NaOH | N/A | N/A | N/A | N/A | N/A | N/A | N/A |
| Conc. | N/A | 6.25 wt % | N/A | N/A | N/A | N/A | N/A | N/A | N/A |
| Equipment | Dry Feeder | Pump 1 | N/A | N/A | N/A | N/A | N/A | N/A | N/A |
| Feed Rate (g/min) | 15.0 | 12.0 | N/A | N/A | N/A | N/A | N/A | N/A | N/A |
| Temp. (° C.) | N/A | 70 | 70 | 80 | 100 | 100 | 100 | 100 | 100 |
| Screw RPM | 200 | — | — | — | — | — | — | — | — |

TABLE 12

Cross linking solution parameters for injection into
the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 15.0 wt. % | 1.8 | Before Extrudate |

Here, the specified cross linking solution was mixed with the heated sand in an orbital mixer until a uniform coating/consistency was observed. All other reagents were fed into the extruder according to parameters specified above. Using the dry feed rate for commercial cationic starch, extrudate was applied to sand to achieve a 5 wt. % polymer coating for 500 g of sand. The components were again mixed until a uniform coating/consistency was observed. Samples were then heat treated and tested according to methods described above. Performance for samples coated via the melt coating method are shown in Table 13.

TABLE 13

SBH performance values for Examples 2A-2D.

| EX # | Application Method | Starch Type | Swelling in 0.9% NaCl | Swelling in 10% NaCl | Swelling in 0.9% $CaCl_2$ | Swelling in 10% $CaCl_2$ |
|---|---|---|---|---|---|---|
| 2A | Static | Commercial Cationic | 117.5% | 90.0% | 62.5% | 167.5% |
| 2B | Static | Commercial Anionic | 23.3% | 13.3% | 272.0% | 110.8% |
| 2C | Dynamic | Commercial Cationic | 122.5% | 70.0% | 160.0% | 90.0% |
| 2D | Melt | Commercial Cationic | 62.5% | 60.5% | 58.5% | 57.0% |

The above examples demonstrate that materials, such as those described in Example 1, may be used to coat proppants and that the coating may be performed using different methods. Static method was initially used to demonstrate swelling of a given polymer system when combined with sand. Furthermore, it is demonstrated that SBH performance is maintained by changing coating methods. Without wishing to be bound to any particular theory, properties such as coating uniformity may be improved from static to dynamic methods (Examples 2A-2C) as well as from dynamic to melt-coating methods (Examples 2C to 2D). In addition, while not wishing to be bound to any particular theory, the melt coating method may lend itself better to scaling from both a cost and throughput perspective.

Example 3: Use of REX for Inline Biopolymer Modification and Proppant Coating

A melt coating process utilizing REX is used to demonstrate inline starch modification with a coating process. Example 3 focuses on starch cationization via reactive extrusion, however additional biopolymer modification systems may similarly be used.

Example 3A—Starch Cationization Via REX for Melt Coating (Epoxide Reagent)

A system as described in Example 2D was modified and used to demonstrate inline processing of cationic starch via a melt coating process. Here, glycidyltrimethylammonium chloride, was included to charge modify starch during extrusion. Compositions and process configurations are given in Tables 14 and 15, and the extruder configuration is shown in FIG. 6.

TABLE 14

Extrusion composition and process parameters for producing cationic proppant coating by reacting native starch, sodium hydroxide (NaOH), glycidyltrimethylammonium chloride (Quab 151), and water (H2O) and subsequently reacting the product with PEGDE (Table 15).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch | NaOH | N/A | Quab 151 | N/A | N/A | N/A | N/A | N/A |
| Concentration | N/A | 8.41 wt. % | N/A | 90 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15.0 | 26.4 | N/A | 2.11 | N/A | N/A | N/A | N/A | N/A |
| Temperature (° C.) | N/A | 70 | 70 | 80 | 95 | 110 | 120 | 120 | 120 |
| Screw RPM | 500 | — | — | — | — | — | — | — | — |

TABLE 15

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Cross linking solution was mixed with the heated sand in an orbital mixer until a uniform coating/consistency was observed. Parameters for the cross linking solution are shown in Table 15. Using dry feed rate (starch), extrudate was applied to sand to achieve a 4 wt. % starch coating for 500 g of sand. The components were again mixed until a uniform coating/consistency was observed. Relative to Example 2, the extrusion screw configuration was modified to accommodate for injection of catalyst and charge modifier as shown in FIG. 5. Samples were then heat treated according to methods described in Example 2D. Samples were subsequently crushed and sieved through 25/40 mesh and 35 grams was placed in a 120 mL rectangular bottle with a width and height of 40 mm and 104 mm, respectively. 84 mL of 10% CaCl2 dihydrate was added to bottle and they were immediately shaken for one minute. The bottle was then let to rest for 60 minutes and the SBH was recorded. Volumetric swelling increase was then calculated based off of the original height of uncoated sand in the bottle. Performance for samples made are shown in Table 25.

Example 3B—Starch Cationization Via REX for Melt Coating (Chlorohydrin Reagent)

An alternative cationic reagent may include (3-chloro-2-hyroxypropyl) trimethylammonium chloride (Quab 188, Sigma Aldrich #348287, St. Louis, Mo.), a precursor reagent used in Example 3A. Through the use of catalyst (NaOH), this chlorohydrin form of cationic reagent may be converted to the epoxide form in one or more zones of the extruder. Once the reagent is converted to the epoxide form, reactions may continue as described in Example 3A, above. Compositions and process configurations are given in Tables 16 and 17. The extrusion screw configuration was equivalent to that seen in FIG. 6.

TABLE 16

Extrusion composition and process parameters for producing a cationic proppant coating by reacting native starch, sodium hydroxide (NaOH), (3-chloro-2-hyroxypropyl)trimethylammonium chloride (Quab 188), and water (H2O) to produce a cationic starch and subsequently reacting the cationic starch with PEGDE (Table 17) to produce the cationic SAP.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch | NaOH | N/A | Quab 188 | N/A | N/A | N/A | N/A | N/A |
| Concentration | N/A | 14.65 wt. % | N/A | 60 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 26.4 | N/A | 15.67 | N/A | N/A | N/A | N/A | N/A |
| Temperature (° C.) | 70 | 70 | 80 | 100 | 100 | 100 | 100 | 100 | 100 |
| Screw RPM | 500 | — | — | — | — | — | — | — | — |

TABLE 17

Cross linking solution parameters for injection into
the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Parameters for the cross linking solution are shown in Table 19. Coating, post processing, and testing follow methods in Examples 3A, above. Performance for samples coated via the melt coating method are shown in Table 25.

Example 3C—Starch Cationization Via REX for Melt Coating (Externally-Activated, Chlorohydrin Reagent)

An alternative to Example 3B may be to convert the chlorohydrin form of the cationic reagent to its epoxide form external to REX. In this example, catalyst (sodium hydroxide) is mixed with the (3-chloro-2-hyroxypropyl)trimethylammonium chloride prior to injection. By first converting the chlorohydrin form to epoxide form, reaction efficiency and solubility of the extrudate may be increased due to an increased residence time during REX. Here, the example follows closely with Example 3A. Compositions and process configurations are given in Table 18 and 19. The extrusion screw configuration is equivalent to that seen FIG. 6.

TABLE 19

Cross linking solution parameters for injection into
the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Parameters for the cross linking solution are shown in Table 19. Coating, post processing, and testing follow methods in Examples 3A, above. Performance for samples coated via the melt coating method are shown in Table 25.

Example 3D—Cationic and Anionic Charge Modification of Starch Via REX for Melt Coating The combination of both cationic and anionic charge modifications results is an amphoteric material. With the use of catalyst (sodium hydroxide), sodium chloroacetate (SCA) can modify the backbone of starch to create anionic moieties while an epoxide cationic reagent can simultaneously create cationic moieties. Here, a dry mixture of SCA with starch is injected, followed by subsequent injection of catalyst and further subsequent injection of cationic reagent into one or more zones of the extruder to result in an amphoteric starch. Compositions and process configurations are given in Tables 20 and 21. The extrusion screw configuration is equivalent to that seen in FIG. 6.

TABLE 18

Extrusion composition and process parameters for producing a cationic proppant coating by
reacting native starch, sodium hydroxide (NaOH, (3-chloro-2-hyroxypropyl)trimethylammonium
chloride (Quab 188), and water (H2O) to produce a cationic starch and subsequently reacting
the cationic starch with PEGDE (Table 19) to produce the cationic proppant coating.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Mat. | Corn Starch | NaOH | N/A | Quab 188/ NaOH | N/A | N/A | N/A | N/A | N/A |
| Concentration | N/A | 1.69% | N/A | 60% Quab/ 12.3% NaOH | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 26.5 | N/A | 10.1 | N/A | N/A | N/A | N/A | N/A |
| Temp. (° C.) | 70 | 70 | 80 | 100 | 100 | 100 | 100 | 100 | 100 |
| Screw RPM | 500 | — | — | — | — | — | — | — | — |

TABLE 20

Extrusion composition and process parameters for producing an amphoteric proppant coating by reacting native starch, sodium chloroacetate (SCA), sodium hydroxide (NaOH), glycidyl trimethylammonium chloride (Quab 151), and water (H2O) to produce an amphoteric starch, and subsequently reacted with PEGDE (Table 21) to produce the amphoteric SAP.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch/ SCA | NaOH | N/A | Quab 151 | N/A | N/A | N/A | N/A | N/A |
| Concentration | 91.0 wt % starch | 6.25 wt % | N/A | 90% purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 16.5 | 25.95 | N/A | 4.21 | N/A | N/A | N/A | N/A | N/A |
| Temperature (° C.) | 70 | 70 | 80 | 95 | 110 | 120 | 120 | 120 | 120 |
| Screw RPM | 500 | — | — | — | — | — | — | — | — |

TABLE 21

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Parameters for the cross linking solution are shown in Table 21. Coating, post processing, and testing follow methods in Examples 3A above. Performance for samples coated via the melt coating method are shown in Table 25.

Example 3E—Starch Cationization and Cross Linking Via REX for Melt Coating (Chlorohydrin Reagent)

REX may additionally be utilized to induce cross linking during a melt coating processs. Here, cross linker is injected in the extruder so that the cross linking reaction occurs in the extruder and/or in a thermal post treatment/drying step. With the use of PEGDE as cross linker, a starch, charge modified starch, or otherwise modified starch, may be cross linked in the extruder, resulting in a hydrogel. Here, native starch is injected, followed by subsequent injection of catalyst and further subsequent injection of cationic reagent and cross linker into one or more zones of the extruder to result in a cationic, cross linked starch. Compositions and process configurations are given in Table 22. The extrusion screw configuration is equivalent to that seen in FIG. 4.

TABLE 22

Extrusion composition and process parameters for producing a cationic proppant coating by reacting starch, Quab 188, sodium hydroxide (NaOH), water (H2O), and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Quab 188 | N/A | N/A | Cross linker | N/A | N/A |
| Specific Material | Corn Starch | NaOH | N/A | N/A | N/A | N/A | PEGDE | N/A | N/A |
| Concentration | N/A | 1.43 wt % | N/A | 60 wt. % purity | N/A | N/A | 1.0 wt % | N/A | N/A |
| Equipment | Dry Feeder | Pump 1 | N/A | Pump 2 | N/A | N/A | Pump 3 | N/A | N/A |
| Feed Rate (g/min) | 15.0 | 26.0 | N/A | 5.74 | N/A | N/A | 7.5 | N/A | N/A |
| Temperature (° C.) | N/A | 70 | 70 | 80 | 95 | 110 | 120 | 120 | 120 |
| Screw RPM | 500 | — | — | — | — | — | — | — | — |

Parameters for the cross linking solution are shown in Table 21. Coating and post processing follow methods in Examples 3A, above. Samples were subsequently crushed and sieved through 25/40 mesh and 35 grams was placed in a 120 mL rectangular bottle with a width and height of 40 mm and 104 mm, respectively. 84 mL of 10% CaCl2 dihydrate was added to bottle and they were immediately shaken for one minute. After shaking, the samples were transferred to a 100 mL graduated cylinder with an outer diameter of 27.6 mm and the SBH was recorded. Slight variations in SBH testing protocol (i.e. shake time, container size) were not found to significantly alter final performance values as given by % volumetric swelling. Performance for samples coated via the melt coating method are shown in Table 25.

This process may lead to a more uniform distribution of cross linking and may allow for consolidation of process steps. Although this method consolidates all reaction and reagent injection processes to extrusion, viscosity of resultant extrudate is slightly increased, resulting in reduced coating uniformity.

Example 3F—Corn Flour Cationization and Crosslinking Via REX for Melt Coating (Chlorohydrin Reagent)

Alternative biopolymer feedstocks such as cellulose, hemicellulose, pectin, potato starch, tapioca starch, corn flour, potato flour, and others may similarly be utilized in an REX melt coating process. Here, corn flour is used in place of corn starch as the primary biopolymer for charge modification and crosslinking. Other reagents and process parameters follow those described in Example 3B. Compositions and process configurations are given in Tables 23 and 24. The extrusion screw configuration was equivalent to that seen in FIG. 6.

TABLE 23

Extrusion composition and process parameters for producing a cationic proppant coating by reacting corn flour, sodium hydroxide (NaOH), (3-chloro-2-hyroxypropyl)trimethylammonium chloride (Quab 188), and water (H2O) to produce a cationic starch and subsequently reacting the cationic starch with PEGDE (Table 24) to produce the cationic SAP.

| Zone | Zone 1 | Zone 2 | Zone 3 | Zone 4 | Zone 5 | Zone 6 | Zone 7 | Zone 8 | Die Zone |
| --- | --- | --- | --- | --- | --- | --- | --- | --- | --- |
| Component | Flour | Catalyst | N/A | Charge Modifier | N/A | N/A | N/A | N/A | N/A |
| Specific Material | Corn Flour | NaOH | N/A | Quab 188 | N/A | N/A | N/A | N/A | N/A |
| Concentration | N/A | 6.02 wt. % | N/A | 60 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 25.95 | N/A | 5.88 | N/A | N/A | N/A | N/A | N/A |
| Temperature (° C.) | NA | 70 | 70 | 80 | 95 | 110 | 120 | 120 | 120 |
| Screw RPM | 500 | — | — | — | — | — | — | — | — |

TABLE 24

Cross linking solution parameters for injection into the sand prior to applying the extruded melt.

| Cross linking Reagent | Cross linking Reagent Solution Concentration | Cross linker Concentration Relative to Starch (wt. %) | Injection Point |
| --- | --- | --- | --- |
| PEGDE | 10.0 wt. % | 2.0 | Before Extrudate |

Parameters for the cross linking solution are shown in Table 24. Coating, post processing, and testing are equivalent to that seen in Examples 3E, above. Performance for samples coated via the melt coating method are shown in Table 25.

Test Metrics/Data:

SBH percent swelling increase relative to sand (post shear) of the Examples 3A-E in four solutions, 0.9% & 10% NaCl & $CaCl_2$.

TABLE 25

Performance of Examples 3A-3D in varying solutions

| EX # | Application Method | Starch Modification Type | Swelling in 0.9% NaCl | Swelling in 10% NaCl | Swelling in 0.9% CaCl$_2$ | Swelling in 10% CaCl$_2$ |
|---|---|---|---|---|---|---|
| 3A | Melt | Cationic, Epoxide Form | 110.5% | 85.3% | 103.3% | 105.0% |
| 3B | Melt | Cationic, Chlorohydrin Form | 150.4% | 170.6% | 92.7% | 123.4% |
| 3C | Melt | Cationic, Chlorohydrin Form Ext. Activated | — | — | — | 61.0% |
| 3D | Melt | Amphoteric | — | 131.4% | — | 98.7% |
| 3E | Melt | Cationic starch, & Cross linked | — | — | — | 85.5% |
| 3F | Melt | Cationic flour, & Cross linked | — | — | — | 100.0% |

Example 3 demonstrates a variety of inline starch modification techniques that may be used in conjunction with a melt coating process. Materials shown here demonstrate significant ion tolerance in both NaCl and CaCl$_2$. Various reagents and reaction pathways may be utilized to achieve desired properties. Furthermore, a mixture of anionic and cationic charges (amphoteric nature) is believed to demonstrate tunable ion tolerance for a given condition. Additionally, various raw material inputs may be modified via REX to achieve desired swelling properties.

Example 4: Process Configurations for Coating a Proppant Using a Polymer Melt Various process configurations are shown to demonstrate examples in which a coated particle may be prepared using extrusion and may be implemented into industrially-relevant sand coating operations. Previously, Example 3E demonstrated including cross linking during the REX process. Here, multiple points in which cross linker can be added to the polymer system are described and demonstrated.

Example 4A—Sand and Cross Linker Mixing Prior to Extrudate Melt Coating

Here, cross linker is injected into a mixer with sand prior to the addition of polymer melt. In this scenario, the cross linker is uniformly distributed on the sand in the first stage, then coated by polymer melt in a second stage. Method results in a gradient of cross linker density where polymer closest to the substrate is preferentially cross linked. Compositions and process configurations are shown below in Tables 26 and 27. The extrusion screw configuration is equivalent to that used in Example 3A-D.

TABLE 26

Extrusion composition and process parameters for producing a cationic proppant coating by reacting a commercially-sourced cationic starch, sodium hydroxide (NaOH), and water (H2O), extruding the product and reacting the product with PEGDE (Table 27).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | N/A | N/A | N/A | N/A | N/A | N/A |
| Specific Material | Cationic Starch | NaOH | N/A | N/A | N/A | N/A | N/A | N/A | N/A |
| Concentration | N/A | 1.43 wt % | N/A | N/A | N/A | N/A | N/A | N/A | N/A |
| Equipment | Dry Feeder | Pump 1 | N/A | N/A | N/A | N/A | N/A | N/A | N/A |
| Feed Rate (g/min) | 15.0 | 10.5 | N/A | N/A | N/A | N/A | N/A | N/A | N/A |
| Temperature (° C.) | N/A | 70 | 70 | 80 | 100 | 100 | 100 | 100 | 100 |
| Screw RPM | 200 | — | — | — | — | — | — | — | — |

TABLE 27

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 1.2 | Before Extrudate |

Parameters for the cross linking solution are shown in Table 27. Cross linking solution was mixed with the heated sand in an orbital mixer until a uniform coating/consistency was observed. Using extrusion dry feed rate (cationic starch), extrudate was applied to sand to achieve a 5 wt. % starch coating for 500 g of sand. The components were again mixed until a uniform coating/consistency was observed. Note the extrusion screw configuration is modified here to accommodate for injection of catalyst and shown in FIG. 4 Samples were then heat treated and tested according to methods described in Example 2A. Performance for samples coated via the melt coating method are shown in Table 28.

Test Metrics/Data:

SBH percent swelling increase relative to sand of the examples in four solutions, 0.9% & 10% NaCl & CaCl$_2$, are provided in Table 28.

TABLE 28

Performance metrics as measured via SBH for a cross linked commercial cationic starch.

| Application Method | Starch Type | % Swelling 0.9% NaCl | % Swellling 10% NaCl | % Swelling 0.9% CaCl$_2$ | % Swelling 10% CaCl$_2$ |
|---|---|---|---|---|---|
| Melt Coating | Commercial Cationic | — | 51.5% | 60.8% | 36.5% |

Example 4B—Cross Linker Injection after Extrudate Melt Coating

Melt coating followed by cross linker addition: Here, the polymer melt is extruded to coat the sand, followed by later injection of cross linker. In this scenario, the polymer melt was uniformly distributed on the sand in the first stage then coated with cross linker solution in the second stage. Method results in a gradient of cross linker density where polymer closest to the outer surface of the construct is preferentially cross linked. This scenario may be used in instances where a "shell" is needed to improve shear stability, and the shell may be comprised of a high gel strength SAP. Compositions and process configurations are shown in Tables 29 and 30. The extrusion screw configuration is equivalent to that seen in FIG. 4.

TABLE 29

Extrusion composition and process parameters for producing a cationic proppant coating by reacting a commercially-sourced cationic starch, sodium hydroxide (NaOH), and water (H2O), extruding the product and reacting with PEGDE (Table 30).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | N/A | N/A | N/A | N/A | N/A | N/A |
| Specific Material | Cationic Starch | NaOH | N/A | N/A | N/A | N/A | N/A | N/A | N/A |
| Concentration | N/A | 1.43 wt % | N/A | N/A | N/A | N/A | N/A | N/A | N/A |
| Equipment | Dry Feeder | Pump 1 | N/A | N/A | N/A | N/A | N/A | N/A | N/A |
| Feed Rate (g/min) | 15.0 | 10.5 | N/A | N/A | N/A | N/A | N/A | N/A | N/A |
| Temperature (° C.) | N/A | 70 | 70 | 80 | 100 | 100 | 100 | 100 | 100 |
| Screw RPM | 200 | — | — | — | — | — | — | — | — |

TABLE 30

Cross linking solution parameters for injection into the sand after to applying and mixing the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 1.2 | After Extrudate |

Parameters for the cross linking solution are shown in Table 30. Using extrusion dry feed rate (cationic starch), extrudate was applied to sand to achieve a 5 wt. % starch coating for 500 g of sand. The extrudate was mixed with the sand until a uniform coating/consistency was observed. Cross linking solution was then injected into the extrudate coated sand and subsequently mixed in the orbital mixer until a uniform coating/consistency was observed. Note the extrusion screw configuration is modified here to accommodate for injection of catalyst and shown in FIG. 4. Samples were then heat treated and tested according to methods described in Examples 2A. Performance for samples coated via the melt coating method are shown in Table 31.

Test Metrics/Data:

SBH percent swelling increase relative to sand of the examples in four solutions, 0.9% & 10% NaCl & CaCl$_2$, are provided in Table 31.

TABLE 31

Performance metrics as measured via SBH for a cross linked commercial cationic starch.

| Application Method | Starch Type | % Swelling 0.9% NaCl | % Swellling 10% NaCl | % Swelling 0.9% CaCl$_2$ | % Swelling 10% CaCl$_2$ |
|---|---|---|---|---|---|
| Melt Coating | Commercial Cationic | — | 51.5% | 60.8% | 36.5% |

Example 4C—Inline Biopolymer Modification, Sand Coating, and Well Injection

Although all previous examples employ a 120° C. thermal treatment for 60 minutes, it is likely that an industrial process would reduce both the time and temperature for ease of processing and economics. Reduced secondary processing regimes were consequently investigated. A system as described in Example 3B (native starch based cationic starch (chlorohydrin form)) was used for the creation of the coating melt. Here, a viscous melt containing all necessary reagents was extruded into a planetary mixer containing heated sand. The sand was then thermally treated for varying times and temperatures as seen in Table 34. Compositions and process configurations used for Example 4C are given in Tables 32 and 33 and the extruder configuration is shown in FIG. 6.

TABLE 32

Extrusion composition and process parameters for producing a cationic melt coating by reacting native starch, sodium hydroxide (NaOH), (3-chloro-2-hyroxypropyl)trimethylammonium chloride (Quab 188), and water (H2O) to produce a cationic starch and subsequently reacting the cationic starch with PEGDE.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch | NaOH | N/A | Quab 188 | N/A | N/A | N/A | N/A | N/A |
| Concentration | N/A | 6.02 wt. % | N/A | 60 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 25.95 | N/A | 5.88 | N/A | N/A | N/A | N/A | N/A |
| Temperature (° C.) | — | 70 | 70 | 80 | 95 | 110 | 120 | 120 | 120 |
| Screw RPM | 500 | — | — | — | — | — | — | — | — |

TABLE 33

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Parameters for the cross linking solution are shown in Table 33. Cross linking solution was mixed with the heated sand in an orbital mixer until a uniform coating/consistency was observed. Using dry feed rate (starch), extrudate was applied to sand to achieve a 5 wt. starch % coating for 500 g of sand. The components were again mixed until a uniform coating/consistency was observed. Samples were then heat treated according to conditions provided in Table 34. Samples were subsequently crushed and sieved through 25/40 mesh and 35 grams was placed in a 120 mL rectangular bottle with a width and height of 40 mm and 104 mm, respectively. 84 mL of 10% CaCl$_2$ dihydrate was added to bottle and they were immediately shaken for one minute. After shaking, the samples were transferred to a 100 mL graduated cylinder with an outer diameter of 27.6 mm and the SBH was recorded. Slight variations in SBH testing protocol (i.e. shake time, container size) were found to not significantly alter final performance values as given by % volumetric swelling.

TABLE 34

Thermal treatment variation of 5% cationic coating produced via melt coat method of native starch with the chlorohydrin form cationizing reagent. Percent volumetric swelling increase is given is relative to uncoated sand.

| Sample Number | Temperature (° C.) | Time | % Swelling (10% CaCl2) |
|---|---|---|---|
| 4C-i | Room Temperature | 24 hours | 100% |
| 4C-ii | 120 | 7.5 min | 124% |
| 4C-iii | 120 | 15 min | 120% |
| 4C-iv | 120 | 60 min | 100% |
| 4C-v | 180 | 7.5 min | 129% |
| 4C-vi | 180 | 15 min | 93% |

It can be seen that relative to the standard thermal processing given (120° C. for 60 min), performance as gauged by percent volumetric swelling increase is comparable for reduced treatment times. It should be noted that samples 4C-i, 4C-ii, 4C-iii, and 4C-v still retained water prior to being exposed to the 10% CaCl2 solution and consequently had a reduced packing efficiency relative to fully dried and free flowing proppant. This reduced packing efficiency could attribute to higher volumetric swelling ratios relative to the uncoated sand. Nonetheless, the high throughput/small footprint of extrusion combined with the reduced thermal load required for treatment and curing signifies that the process may be used for on-site proppant coating and modification.

Example 5: Effects of Process and Compositional and Process Parameters

Here, process and compositional parameters are varied to demonstrate the resulting effect on SBH performance. Specifically, degree of coating relative to sand and degree of charge substitution (DS) on the polymer are controlled.

Degree of coating is represented by total amount of polymer relative to sand (in wt. %) as measured by loss on ignition (LOI), also known as ash testing. In this method, materials are placed in a muffle furnace at 575° C. for 5 hours. At this temperature, all organic materials are degraded and the difference in weights prior to and after exposure to temperature may be used to calculate % coating as a percentage of initial sample weight. Furthermore, the % coating as a percentage of applied polymer (dry weight of applied polymer) is termed "coating efficiency".

Theoretical degree of substitution of charge modifier is determined from the concentration of the charge modifying reagent relative to the concentration of starch. In extrusion, this relative ratio of reagent to starch is given by the injection flow rates, density, and purity of reagents and is given by the following equation:

$$DS_{th} = \frac{\rho_r Q_r M_s I_r}{Q_s M_r I_s} \quad (1)$$

Where $\rho_r$ is the density of the charge modifying reagent. $Q_r$ and $Q_s$ are the flow rates of the reagent and starch, respectively. $M_r$ and $M_s$ are the molar mass of reagent and starch, respectively. $I_r$ and $I_s$ are the indices of purity for the reagent and starch, respectively.

The efficiency of the charge modification is dependent upon the extrusion and thermal treatment operating parameters (temperature, residence time, SME) as well as the catalyst concentration. It is consequently necessary to measure the resultant DS. The achieved DS is calculated through elemental analysis, where % N in a polymer sample may be used to calculate DS through the following equation:

$$DS = \frac{162.15 \cdot \% N}{1401 - 151.64 \cdot \% N} \quad (2)$$

Where DS is the measured degree of substitution and % N is the measured nitrogen content. A baseline of 0.002 is subtracted from % N measurements to normalize against native starch. Examples of varied % coating and varied DS are shown in Examples 5A and 5B respectively. All of the samples described in Examples 5 utilize an external cross linker injection prior to extrudate (see Example 4A for reference). Compositions and process configurations are given in Table 35 and the extruder screw configuration is shown in FIG. 6 Here, cross linking solution was mixed with the heated sand in an orbital mixer until a uniform coating/consistency was observed prior to the extrudate melt coating. Using extrusion dry feed rate (starch), extrudate was applied to sand to achieve a desired % coating for 500 g of sand. The components were again mixed until a uniform coating/consistency was observed. Furthermore, catalyst and reagent compositions may be modified to control resulting DS.

TABLE 35

Cross linking solution parameters for injection into the sand prior to applying and mixing the extruded melt. Composition and concentrations are consistent for Examples 5A & 5B.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

Example 5A: Fixed $DS_{TH}$ with Varied % Coating

Extrusion composition and process parameters given in Table 36. Secondary processing (mixing order, thermal treatment) are equivalent to that seen in Example 3A. Performance characterization methods are equivalent to that seen in Example 3A.

TABLE 36

Extrusion composition and process parameters where native starch is charge modified by Quab 151 and subsequently reacted with PEGDE (Table 34) to create cationic proppant coating.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Native Starch | NaOH | N/A | Quab 151 | N/A | N/A | N/A | N/A | N/A |
| Concentration | N/A | 8.41 wt. % | N/A | 90 wt. % (purity) | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15.0 | 26.4 | N/A | 8.42 | N/A | N/A | N/A | N/A | N/A |
| Temperature (° C.) | 70 | 70 | 80 | 100 | 100 | 100 | 100 | 100 | 100 |
| Screw RPM | 500 | — | — | — | — | — | — | — | — |

Cross linking solution was mixed with the heated sand in an orbital mixer until a uniform coating/consistency was observed. Using dry feed rate (starch), extrudate was applied to sand to achieve a 4, 6 and 8 wt. starch % coating, respectively for 500 g of sand. The components were again mixed until a uniform coating/consistency was observed. Samples were then heat treated according to conditions as described in Example 3A.

Example 5B: Fixed % Coating with Varied $DS_{TH}$

Extrusion composition and process parameters given in Table 37. Secondary processing (mixing order, thermal treatment) are equivalent to that seen in Example 3A. Performance characterization methods are equivalent to that seen in Example 3A.

result in significant increases in corresponding SBH for all solutions. Increases in charge modification also result in an increases in SBH for all solutions. It is significant to note that for Examples 5A&B, the coating content is kept constant for the starch rather than for the total material coating (i.e. starch+charge modifier+catalyst).

Example 5C: Variation of Extrusion Parameters

All previous examples employ consistent temperature profiles, screw RPMs, and feed rates in order to minimize the number of manipulated variables. Here, operating conditions of the extruder were accordingly varied for a single

TABLE 37

Extrusion composition and process parameters where native starch is charge modified by Quab 151 and subsequently reacted with PEGDE (Table 35) to create cationic proppant coating.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Native Starch | NaOH | N/A | Quab 151 | N/A | N/A | N/A | N/A | N/A |
| Concentration | N/A | 2.10 wt. % | N/A | 90 wt. % (purity) | N/A | N/A | N/A | N/A | N/A |
| Equipment | Dry Feeder | Pump 1 | N/A | Pump 3 | N/A | N/A | N/A | N/A | N/A |
| Feed Rate (g/min) | 15.0 | 26.4 | N/A | 2.10 | N/A | N/A | N/A | N/A | N/A |
| Temperature (° C.) | 70 | 70 | 80 | 100 | 100 | 100 | 100 | 100 | 100 |
| Screw RPM | 500 | — | — | — | — | — | — | — | — |

Test Metrics/Data for Examples 5A & 5B:

SBH percent swelling increase relative to sand (post shear) of the examples in four solutions, 0.9% & 10% NaCl & $CaCl_2$, and are shown in Table 38.

TABLE 38

SBH data for Examples 6A-6G in varying solutions.

| EX # | App. Method (Starch %, DS) | Swelling in 0.9% NaCl | Swelling in 10% NaCl | Swelling in 0.9% $CaCl_2$ | Swelling in 10% $CaCl_2$ |
|---|---|---|---|---|---|
| 6A | Melt (4, 0.6) | 98.3% | 77.5% | 100.8% | 97.0% |
| 6A | Melt (6, 0.6) | 157.75% | 127.3% | 119.0% | 130.3% |
| 6A | Melt (8, 0.6) | 188.0% | 140.0% | 131.3% | 178.3% |
| 6B | Melt (5, 0.15) | 46.5% | 51.8% | 61.75% | 67.8% |
| 6B | Melt (5, 0.3) | 62.25% | 79.0% | 79.5% | 98.8% |
| 6B | Melt (5, 0.6) | 138.0% | 118.0% | 104.3% | 106.8% |

The primary factor which affects SBH is coating content relative to the proppant. Increases in coating percentage composition (Quab 188 at a fixed DSth) in order to view the process effects on SBH performance as determined by the SBH protocol given in Example 3E. Temperature profiles and screw rotational speeds were varied from 70 to 140° C. and 325 to 750 RPM, respectively, and can be seen in Table 41. The compositions used for all samples seen in Table 41 are given by Tables 39 and 40. Parameters for the crosslinking solution are shown in Table 40. Crosslinking solution was mixed with the heated sand in an orbital mixer until a uniform coating/consistency was observed. Using dry feed rate (starch and charge modifier), extrudate was applied to sand to achieve a 5 wt. % coating for 500 g of sand. The components were again mixed until a uniform coating/consistency was observed. Samples were then heat treated according to conditions provided in Example 3A.

TABLE 39

Extrusion composition and process parameters for producing a cationic melt coating by reacting native starch, sodium hydroxide (NaOH), (3-chloro-2-hyroxypropyl)trimethylammonium chloride (Quab 188), and water (H2O) to produce a cationic starch and subsequently reacting the cationic starch with PEGDE.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch | NaOH | N/A | Quab 188 | N/A | N/A | N/A | N/A | N/A |
| Concentration | N/A | 6.02 wt. % | N/A | 60 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 25.95 | N/A | 5.88 | N/A | N/A | N/A | N/A | N/A |

TABLE 40

Crosslinking solution parameters for injection into the sand prior to applying the extruded melt.

| Crosslinking Reagent | Crosslinking Reagent Solution Concentration | Crosslinker Concentration Relative to Starch (wt. %) | Injection Point |
|---|---|---|---|
| PEGDE | 10.0 wt. % | 2.0 | Before Extrudate |

TABLE 41

Temperature profile and screw RPM variation with corresponding SBH performance.

| | Temperature (° C.)/Zone | | | | | | | | Screw RPM | % Volumetric Swelling (10% CaCl2) |
|---|---|---|---|---|---|---|---|---|---|---|
| Feed | 2 | 3 | 4 | 5 | 6 | 7 | 8 | Die | | |
| N/A | 70 | 70 | 70 | 70 | 70 | 70 | 70 | 70 | 500 | 140% |
| N/A | 70 | 70 | 80 | 90 | 90 | 90 | 90 | 90 | 500 | 150% |
| N/A | 70 | 70 | 80 | 95 | 110 | 120 | 120 | 120 | 325 | 157% |
| N/A | 70 | 70 | 80 | 95 | 110 | 120 | 120 | 120 | 750 | 150% |
| N/A | 70 | 70 | 80 | 140 | 140 | 140 | 140 | 140 | 500 | 153% |
| N/A | 70 | 70 | 80 | 160 | 160 | 160 | 160 | 160 | 500 | 143% |

Performance values show that while screw rotational speed and temperature have a large implication on the reaction efficiency due to changes in material residence time, mixing efficiency, and charge modification reaction kinetics, is possible to achieve the desired swelling performance within a broad range of operating conditions. Results suggest it is possible to vary the operating conditions of the extruder while still maintaining product performance for a given composition and this holds large implications for process stability and additionally, maximizing throughput and efficiency in the final production scheme of the proppant coating.

Example 5D—Impact of Water Purity

Previous examples utilize DI water to allow for improved control of chemical reactions during REX. However, in order to demonstrate scalability of the melt coating process, varying degrees of water quality were utilized and their impact on performance was studied. Here, DI water, carbon filtered water, and tap water were used to make the catalyst and cross linker solutions. Other reagents and process parameters follow those described in Example 3B. Compositions and process configurations are given in Tables 42 and 43. The extrusion screw configuration was equivalent to that seen in FIG. 6.

TABLE 42

Extrusion composition and process parameters for producing a cationic proppant coating by reacting corn flour, sodium hydroxide (NaOH), (3-chloro-2-hyroxypropyl)trimethylammonium chloride (Quab 188), and water (H2O) to produce a cationic starch and subsequently reacting the cationic starch with PEGDE (Table 43) to produce the cationic SAP.

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | N/A | Charge Modifier | N/A | N/A | N/A | N/A | N/A |
| Specific Material | Corn Starch | NaOH | N/A | Quab 188 | N/A | N/A | N/A | N/A | N/A |
| Concentration | N/A | 6.02 wt. % | N/A | 60 wt. % purity | N/A | N/A | N/A | N/A | N/A |
| Equipment | Dry Feeder | Pump 1 | N/A | Pump 2 | N/A | N/A | N/A | N/A | N/A |
| Feed Rate (g/min) | 15 | 25.95 | N/A | 5.88 | N/A | N/A | N/A | N/A | N/A |
| Temperature (° C.) | N/A | 70 | 70 | 80 | 95 | 110 | 120 | 120 | 120 |
| Screw RPM | 500 | — | — | — | — | — | — | — | — |

TABLE 43

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|---|---|---|---|
| PEGDE | 10.0 wt. % | 2.0 | Before Extrudate |

TABLE 44

Cross linking solution parameters for injection into the sand prior to applying the extruded melt.

| Example | Water Source | Water Quality (<μS/cm) | Swelling in 10% CaCl$_2$ |
|---------|--------------|------------------------|--------------------------|
| 5D-i | DI Water | <10 | 100.0% |
| 5D-ii | Carbon Filtered Water | ~200 | 82.9% |
| 5D-iii | Tap Water | ~250 | 51.0% |

Parameters for the cross linking solution are shown in Table 43, above. Coating, post processing, and testing follow methods in Examples 3E. Performance for samples coated via the melt coating method are shown in Table 44. Results show modifications to water quality may contribute to changes in volumetric swelling performance. The cause may be attributed to the presence of ions in lower purity waters interfering with reactions during REX. However less rigorous water purification specifications may be used with cost-performance considerations.

Example 6: Additional Features of Proppants Coated with Modified Biopolymers Additional formulations and methods are shown here incorporating various agents/additives into a coating of a coated particle of the present invention.

Example 6A—Use of a Wetting Agent for Improved Coating Uniformity

A system as described in Example 4A was used with the addition of glycerol to investigate the effects of alternative plasticizers and binding agents. Commercial cationic starch, catalyst, and glycerol was extruded and immediately mixed with sand in an orbital mixer. Cross linker was subsequently injected into the sand/extrudate mixture and mixed again. Compositions and process configurations are given in Tables 45 and 46. The extruder configuration used is given in FIG. 4.

TABLE 46

Cross linking solution parameters for injection into the sand prior to applying the extruded melt.

| Cross linking Reagent | Cross linking Reagent Solution Concentration | Cross linker Concentration Relative to Starch (wt. %) | Injection Point |
|-----------------------|----------------------------------------------|-------------------------------------------------------|-----------------|
| PEGDE | 5.0 wt. % | 3 | After Extrudate |

Parameters for the cross linking solution are shown in Table 46. Using dry feed rate (commercial cationic starch), extrudate was applied to sand to achieve a 5 wt. % coating for 500 g of sand. The components were mixed until a uniform coating/consistency was observed. Samples were then heat treated and tested according to methods described in Example 4A, Performance for samples coated via the melt coating method with the glycerol additive are shown in Table 47.

Test Metrics/Data:

SBH percent swelling increase relative to sand (post shear) of the examples in various solutions, 0.9% & 10% NaCl & CaCl$_2$ are provided in Table 47. Results demonstrate ability to use alternative plasticizers in full or partial place of water while retaining swelling properties. Replacement of water with alternative plasticizers or solvents may allow for downstream process improvements.

TABLE 45

Extrusion composition and process parameters for producing a cationic proppant coating by reacting a commercially-sourced cationic starch, sodium hydroxide (NaOH), glycerol, and poly(ethyleneglycol)diglycidylether (PEGDE).

| Zone | Zone 1 | Zone 2 | Zone 3 | Zone 4 | Zone 5 | Zone 6 | Zone 7 | Zone 8 | Die Zone |
|------|--------|--------|--------|--------|--------|--------|--------|--------|----------|
| Component | Starch | Catalyst | N/A | N/A | N/A | N/A | N/A | N/A | N/A |
| Specific Material | Cationic Starch | NaOH/ Glycerol | N/A | N/A | N/A | N/A | N/A | N/A | N/A |
| Concentration | N/A | 1.43 wt % | N/A | N/A | N/A | N/A | N/A | N/A | N/A |
| Equipment | Dry Feeder | Pump 1 | N/A | N/A | N/A | N/A | N/A | N/A | N/A |
| Feed Rate (g/min) | 15.0 | 10.5 | N/A | N/A | N/A | N/A | N/A | N/A | N/A |
| Temperature (° C.) | N/A | 70 | 70 | 80 | 100 | 100 | 100 | 100 | 100 |
| Screw RPM | 200 | — | — | — | — | — | — | — | — |

TABLE 47

SBH data for Example 6A in various solutions.

| Application Method | Starch Type | Swelling in 0.9% NaCl | Swelling in 10% NaCl | Swelling in 0.9% CaCl$_2$ | Swelling in 10% CaCl$_2$ |
|---|---|---|---|---|---|
| Melt | Commercial Cationic | — | 83.0% | 104.0% | 86.0% |

Example 6B—Demonstration of Breakability for a Modified Biopolymer Coating

Breaking of the proppant coating is a necessary step in order to regain conductivity of the proppant pack [SSP Transport Technology, Goldstein]. In order to demonstrate breakability of the proppant coating, samples were exposed to HCl and amylase. The base coating material was a 5% cationic melt coating and equivalent to that seen in Example 4C with a thermal treatment of 120° C. for 60 minutes. The samples were crushed and sieved through 25/40 mesh and 35 grams was placed into the bottle as described for SBH testing. The samples were shaken for two minutes, allowed to settle for five minutes, and the SBH was subsequently recorded. After recording SBH, the samples received three different breaking conditions:

1. Control: Using a bottle as described in the bottle shake test above (35 g of sample in 84 mL of 10% CaCl$_2$ dihydrate), a control sample was shaken vigorously for two minutes. The same bottle was then heated at 80° C. in a convective oven with no added breaking agent for one hour. After the hour at set temperature, the sample was removed and vigorously shaken for two minutes, allowed to settle for five minutes, and the new SBH was recorded.
2. Acid Breaking: Using a bottle as described in the bottle shake test above (35 g of sample in 84 mL of 10% CaCl2 dihydrate), ~0.5 g of 6 M HCl was slowly pipetted into the bottle to achieve a pH~1. The bottle was shaken vigorously for two minutes and subsequently heat treated according to the same protocol as the control (Example 6C.1). The sample was subsequently shaken vigorously for two minutes, allowed to settle for five minutes, and the new SBH was recorded.
3. Enzymatic Breaking: Using a bottle as described in the bottle shake test above (35 g of sample in 84 mL of 10% CaCl2 dihydrate), 1 M HCl was slowly pipetted into the bottle to achieve a pH~6. One gram of a 0.35% amylase solution (99.65% water) was added directly to the bottle to achieve a 0.2% amylase content relative to the proppant coating. The bottle was then vigorously shaken for two minutes and allowed to sit for 30 minutes. During the 30 minutes, the bottle was lightly shaken every 10 minutes to fully disperse the enzyme in the solution. At the end of the 30 minutes, the bottle was again shaken vigorously for two minutes, allowed to settle for five minutes, and the new SBH was recorded.

SBH data for the volumetric swelling prior to and after breaking are given in Table 48. Both the HCl and amylase cause a drastic reduction in SBH of the proppant. Note that the control with no breaking additive exhibits an increase in swelling over the course of the test due to an increase in time for swelling. This increase in swelling seen with the control signifies that the reduction in proppant SBH can be solely attributed to the introduction of the breaking agent rather than the additional mixing required for introduction of the breaking agent into the container. Results show that a hydrogel produced with a biopolymer backbone allows for use of additional breakers (e.g., HCl or enzymes) compared to that of synthetic hydrogel counterparts.

TABLE 48

Percent volumetric swelling increase relative to uncoated sand prior to and after breaking.

| Breaking Additive | Initial % Swelling (10% CaCl2) | Final % Swelling (10% CaCl2) |
|---|---|---|
| None (Control) | 130.2% | 184.2% |
| HCl | 106.7% | 12.9% |
| Amylase | 89.3% | 17.7% |

Example 6C—Demonstration of Biodegradability for a Modified Biopolymer Coating

As previously described, the biodegradability of the proppant coating is attributed with a structural decomposition of the biopolymer backbone. This decomposition can be seen in the viscosity reduction of a solubilized modified starch before and after treatment with an enzyme. Cationic starch was created from native starch with a chlorohydrin form cationizing reagent. The extrusion composition and operating conditions can be seen in Table 49. The extrusion screw profile can be seen in FIG. 6.

TABLE 49

Extrusion composition and process parameters for producing a cationic starch by reacting native starch, sodium hydroxide (NaOH), (3-chloro-2-hyroxypropyl)trimethylammonium chloride (Quab 188), and water (H2O).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Component | Starch | Catalyst | Charge Modifier | N/A | N/A | N/A | N/A | N/A | N/A |
| Specific Material | Corn Starch | NaOH | Quab 188/ H2O/NaOH | N/A | N/A | N/A | N/A | N/A | N/A |
| Concentration | N/A | 1.93 wt. % | 19.8% Quab/ 75.9% H2O/ 4.24% NaOH | N/A | N/A | N/A | N/A | N/A | N/A |

TABLE 49-continued

Extrusion composition and process parameters for producing a cationic starch by reacting native starch, sodium hydroxide (NaOH), (3-chloro-2-hyroxypropyl)trimethylammonium chloride (Quab 188), and water (H2O).

| Zone | Zone 1 | Zone 2 | Zone 3 | Zone 4 | Zone 5 | Zone 6 | Zone 7 | Zone 8 | Die Zone |
|---|---|---|---|---|---|---|---|---|---|
| Equipment | Dry Feeder | Pump 2 | Pump 1 | N/A | N/A | N/A | N/A | N/A | N/A |
| Feed Rate (g/min) | 10 | 8 | 14.65 | N/A | N/A | N/A | N/A | N/A | N/A |
| Temperature (° C.) | — | 70 | 70 | 75 | 77 | 77 | 77 | 77 | 77 |
| Screw RPM | 300 | — | — | — | — | — | — | — | — |

The described cationic starch was dissolved in water (1% solution) and different levels of enzyme were added. The viscosity of the solution was measured during over time and can be seen in Table 50. Viscosity of solutions are shown to reduce with exposure to enzymes, suggesting enzymatic degradation of the biopolymer hydrogel.

TABLE 50

Effect of enzyme concentration and treatment time on solubilized cationic starch viscosity

| | Enzyme % to starch | | |
|---|---|---|---|
| | 0.05 | 0.1 | 0.2 |
| Time | Viscosity of 1% solution* | | |
| 30 min | 150 cp | 80 cp | 10 cp |
| 60 min | 40 cp | 30 cp | <10 cp |
| 2 hours | 10 cp | <10 cp | |
| 4 hours | <10 cp | | |

*The viscosity of the 1% cationic starch solution without enzyme treatment was 1300 cp Example 6D—Demonstration of Flowability for a Proppant Coated with Modified Biopolymer Given that the described proppant coating is a starch based superabsorbent, the material tends to be hygroscopic. This hygroscopic nature may pose an issue for material handling and transport. Flowability tests were consequently completed for the material with and without anticaking agents. Additionally, uncoated sand was used as a reference measurement. The coating material used is equivalent to that seen in Example 3A with a post treatment temperature of 120° C. and time of 60 minutes. The samples were crushed and sieved through 25/40 mesh. For samples with an anticaking additive, the already crushed and sieved coated proppant was simply hand mixed with the additive until a uniform mixture was observed.

A plastic funnel with a stem inner diameter of 1.0 mm, top diameter of 9.0 mm, height of 10.0 mm, and 30% inclination angle was placed within a ring stand above a 250 mL glass beaker. The funnel was filled with 300 grams of material (sand or coated sand) while the bottom was covered. Upon uncovering, a stopwatch was used to measure the time for the funnel to empty to the nearest hundredth of a second. The test was repeated six times for each sample and the average is reported in Table 51. The coating or additive's effect on flowability can be determined by the relative difference between the coated and uncoated sample.

TABLE 51

Flowability for uncoated proppant, coated proppant, and coated proppant with an anticaking agent, sodium trisilicate (NaSilicate).

| Trial #: | Uncoated 20/40 Sand | 5% Coated Sand | 5% Coated Sand + 0.5% NaSilicate | 5% Coated Sand + 1.0% NaSilicate |
|---|---|---|---|---|
| 1 | 11.4 | 15.6 | 15.1 | 14.3 |
| 2 | 11.3 | 15.3 | 15.0 | 14.3 |
| 3 | 11.2 | 15.6 | 14.7 | 14.4 |
| 4 | 11.2 | 15.8 | 14.9 | 14.3 |
| 5 | 11.2 | 15.7 | 14.8 | 14.2 |
| 6 | 11.1 | 15.5 | 14.8 | 14.3 |
| Average (seconds) | 11.2 | 15.6 | 14.9 | 14.3 |
| Percent Std. Dev. (%) | 0.9 | 0.9 | 0.9 | 0.6 |
| Flow rate (g/sec) | 26.7 | 19.3 | 20.2 | 21.0 |

Additional results (not shown here) suggest commercial hydrogel-coated sand with near zero flow rate in these conditions. Therefore results show flowability is not significantly altered with modified starch coatings, relative to that of uncoated sand and may be improved with use of flowability additives (sodium silicate).

Example 6E—Demonstration of Use of Hydrophobic Additives for Improved Gel Permeability and Swelling Rate Here, hydrophobic agent additives were utilized to improve gel bed permeability and swelling rate. Coated sand materials as described in Example 4C were used as starting points for additional processing. Polydimethylsiloxane (PDMS), was used as the hydrophobic reagent where three solutions of PDMS and deionized water were prepared and used to coat the materials as described in Table 52, below.

TABLE 52

Amount of hydrophobic coating (PDMS) added to coated proppant sample.

| Sample | PDMS Solution Concentration (wt %) | PDMS Concentration Added to Sample (wt %) |
|---|---|---|
| 6E-i | N/A | N/A |
| 6E-ii | 5% | 0.25% |
| 6E-iii | 5% | 0.5% |
| 6E-iv | 10% | 1.0% |

To prepare the coatings, the solutions were mixed with the coated sand materials using an orbital mixer. Samples were then dried overnight in a forced air oven at 55° C. Samples were tested according to a modified SBH procedure where height measurements are recorded at designated times using the same bottle described in Example 3A. Here, the SBH was recorded every 30 seconds for up to 5 minutes following the initial 1 minute of shearing to the testing vials. The samples were all tested in 10% $CaCl_2$. Results are outlined in Table 53.

TABLE 53

Swelling rates in PDMS coated samples compared to control sample with no PDMS coating.

| Time Following Shear (seconds) | SBH (mm) in 10% $CaCl_2$ | | | |
|---|---|---|---|---|
| | 6E-i | 6E-ii | 6E-iii | 6E-iv |
| 30 | 26.3 | 30.1 | 29.4 | 31.0 |
| 60 | 26.6 | 31.4 | 29.9 | 31.2 |
| 90 | 27.6 | 31.5 | 31.0 | 31.1 |
| 120 | 27.9 | 31.8 | 30.1 | 31.5 |
| 150 | 28.4 | 31.8 | 31.2 | 30.6 |
| 180 | 29.1 | 32.3 | 31.2 | 30.6 |
| 210 | 29.1 | 33.0 | 32.1 | 31.9 |
| 240 | 28.9 | 33.0 | 32.9 | 31.9 |
| 270 | 28.3 | 33.6 | 34.0 | 34.0 |
| 300 | 28.3 | 34.1 | 34.0 | 34.3 |

Results indicate improvement to swelling behavior for samples utilizing a hydrophobic additive. Results indicate a 5-6 mm improvement in bed height over that of materials without hydrophobic coatings. Improved performance is attributed to reduction of gel blocking effect during swelling. Alternatively, the additives may be included in line with the melt coating process whereby the PDMS solutions may be coated on to sand following polymer coating and preceding heat treating. Samples were then heat treated and tested according to Example 3E, above. PDMS concentrations are shown in Table 54 and performance is listed in Table 55, below.

TABLE 54

Concentration of hydrophobic coating added to base coated material.

| Sample | PDMS Concentration on Base Material (wt %) |
|---|---|
| 6E-v | 0.05% |
| 6E-vi | 0.125% |
| 6E-vii | 0.375% |

TABLE 55

Hydrophobic Sample Performance in High Concentration Hardness Solution.

| Sample | Settled Bed Height in 10% $CaCl_2$ (mm) | Percent Increased Swelling from Raw Sand Settled Bed Height |
|---|---|---|
| Control (No PDMS) | 41 | 100% |
| 6E-v | 46 | 124% |
| 6E-vi | 45 | 120% |
| 6E-vii | 44.5 | 117% |

Results demonstrate feasibility of including hydrophobic additives with melt coating processes. SBH is increased by allowing for greater penetration of a given solution into a gel bed, suggesting improved gel bed permeability due to inclusion of hydrophobic agents.

Example 6F—Demonstration of Use of Viscosifying Agents for Modified Supernatant Viscosity Additives such as viscosifying agents may be utilized to include additional features on a coated particle. Coated sand materials as described in Example 3C were used as starting base materials for additional processing. Here, guar is included as a viscosifying agent via a secondary coating, in line with a melt coating process. Process conditions are shown in Table 56 and performance is listed in Table 57, below.

TABLE 56

Process parameters for guar coating

| Guar Mixture | Concentration of Guar in Gel Mixture (wt %) | Used for Proppant Sample | Concentration of Guar on Coated Base Material (wt %) |
|---|---|---|---|
| 1 | 6.5% | Low Guar | 0.9% |
| 2 | 2.0% | High Guar | 2.7% |

To apply the secondary coating, 500 g of the dry base material was mixed with the desired amount of guar in an orbital mixer. The mixture was then dried in a forced air oven at 80° C. for 90 minutes. Once the drying step was complete, the particles were broken apart, by hand, and sieved to a desired particle size. Materials are tested according to a SBH test then, supernatant viscosity is measured using an Ostwald viscometer. Results are listed in Table 57, below.

TABLE 57

Results from viscosity tests.

| SBH | SBH Conditions | | | | | | |
|---|---|---|---|---|---|---|---|
| | No Shake | 1-Minute Shake Time: Lower Shear Applied | | | 3-Minute Shake Time: Higher Shear Applied | | |
| Test Solutions | Test Solutions Blank (cp) | Base Sample (cp) | 0.9% Guar (cp) | 2.7% Guar (cp) | Base Sample (cp) | 0.9% Guar (cp) | 2.7% Guar (cp) |
| DI Water | 1.22 | 1.25 | 1.37 | 1.38 | 1.17 | 192.5 | >1000.0 |
| 10.0 wt % $CaCl_2$ | 1.46 | 1.44 | 1.59 | 1.74 | 1.41 | 85.8 | 174.2 |
| 10.0 wt % NaCl | 1.35 | 1.39 | 1.43 | 1.5 | 1.3 | 75.7 | 57.6 |
| 0.1 wt % $CaCl_2$ | 1.21 | 1.18 | 1.51 | — | — | — | — |
| 0.1 wt % NaCl | 1.12 | 1.21 | 1.37 | — | — | — | — |

Results show increased supernatant viscosity for materials with guar additives, demonstrating ability to modify settling rate for coated particles. By controlling agent additive and degree of shear, viscosity may be modified up to multiple orders of magnitude. Including additives in a proppant coating may allow for reduction in use of viscosifying agents on site.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A particle comprising a core and a coating on at least a portion of a surface of the core, the coating comprising a cross-linked, charge-modified biopolymer, wherein the cross-linked, charge-modified biopolymer is cationic starch, and wherein the coating is affixed on the core through cross-linking.

2. The particle of claim 1, wherein the particle comprises the cross-linked, charge-modified biopolymer in an amount in a range of about 1% to about 15% by weight of the core.

3. The particle of claim 1, wherein the cross-linked, charge-modified biopolymer absorbs a 10% saline solution, at room temperature, in an amount of at least 10 times the weight of the cross-linked, charge-modified biopolymer.

4. The particle of claim 1, wherein the core comprises sand.

5. The particle of claim 1, wherein the particle is a proppant.

6. The particle of claim 1, wherein the coating is insoluble in an aqueous solution.

7. The particle of claim 1, wherein the particle has a specific gravity that is less than the specific gravity of an uncoated core and/or the volume of the particle, upon exposure to water, is greater than that of a dry and/or uncoated core.

8. The particle of claim 1, wherein the cross-linked, charge-modified biopolymer has a degree of substitution in a range of about 0.05 to about 0.8.

9. The particle of claim 1, wherein the particle and/or coating swells upon contact with a solution having a salinity in a range of about 50 ppm to about 150,000 ppm and/or having a hardness in a range of about 1 ppm to about 150,000 ppm.

10. The particle of claim 1, wherein the particle in a first aqueous solution having a hardness in a range of about 150 ppm to about 150,000 ppm has a degree of swelling that changes by less than about 40% compared to the particle in a second aqueous solution having a hardness in a range of less than 150 ppm.

11. The particle of claim 1, wherein the cross-linked, charge-modified biopolymer is covalently cross-linked.

12. The particle of claim 1, wherein, responsive to the application of shear on the particle, at least a portion of the coating remains present on, around, and/or adhered to the core.

13. The particle of claim 1, wherein the coating is breakable in the presence of a breaking agent.

14. A plurality of particles comprising a particle of claim 1.

15. The plurality of particles of claim 14, wherein when about 35 grams of the plurality of particles is mixed with about 85 g of an aqueous solution in a 100 ml container and allowed to sit undisturbed for about 5 minutes, a settled bed height and/or volume of the plurality of particles is achieved that is about 0.5 to about 4 times greater than a settled bed height and/or volume of a plurality of uncoated particles under the same conditions.

16. The plurality of particles of claim 14, wherein, after exposing the plurality of coated particles to shear in a range of about 40 $s^{-1}$ to about 600 $s^{-1}$ for about 1 minute to about 1 hour, the plurality of coated particles has a settled bed height and/or volume that is at least about 80% of the settled bed height and/or volume prior to exposing the plurality of coated particles to shear.

17. The particle of claim 1, wherein the cross-linked, charge-modified biopolymer comprises a primary amine, secondary amine, tertiary amine, quaternary ammonium, sulfonium, and/or phosphonium group.

18. The particle of claim 17, wherein the cross-linked, charge-modified biopolymer is covalently cross-linked.

* * * * *